United States Patent [19]
Dickens, Jr. et al.

[11] Patent Number: 5,173,206
[45] Date of Patent: * Dec. 22, 1992

[54] PASSIVATED RARE EARTH MAGNET OR MAGNETIC MATERIAL COMPOSITIONS

[75] Inventors: E. Douglas Dickens, Jr., Richfield; Anthony M. Mazany, Akron, both of Ohio

[73] Assignee: The B. F. Goodrich Company, Brecksville, Ohio

[*] Notice: The portion of the term of this patent subsequent to Jan. 29, 2008 has been disclaimed.

[21] Appl. No.: 645,426

[22] Filed: Jan. 24, 1991

Related U.S. Application Data

[60] Continuation-in-part of Ser. No. 409,538, Sep. 19, 1989, Pat. No. 4,988,755, which is a continuation-in-part of Ser. No. 132,890, Dec. 14, 1987, Pat. No. 4,876,305, which is a continuation-in-part of Ser. No. 313,662, Feb. 21, 1989, Pat. No. 4,869,964, which is a division of Ser. No. 132,890.

[51] Int. Cl.$^5$ .......................... C04B 35/04; C08K 3/00
[52] U.S. Cl. .................... 252/62.54; 524/401; 524/434; 524/435; 524/403; 428/418; 428/413
[58] Field of Search .................... 252/62.54; 524/401, 524/434, 435, 403, 431; 428/418, 413

[56] References Cited

U.S. PATENT DOCUMENTS

| | | | |
|---|---|---|---|
| 4,241,116 | 12/1980 | Taniyama et al. | 427/386 |
| 4,497,722 | 2/1985 | Tsuchida et al. | 252/62.54 |
| 4,558,077 | 12/1986 | Gray | 523/458 |
| 4,802,931 | 2/1989 | Croat | 148/302 |
| 4,869,964 | 9/1991 | Mazany | 428/418 |
| 4,988,755 | 1/1991 | Dickens, Jr. et al. | 252/62.54 |

FOREIGN PATENT DOCUMENTS

| | | | |
|---|---|---|---|
| 0166597 | 1/1986 | European Pat. Off. | 252/62.54 |
| 0260870 | 3/1988 | European Pat. Off. | |
| 0016698 | 2/1979 | Japan | 252/62.54 |
| 0015226 | 2/1980 | Japan | 252/62.54 |
| 0066103 | 4/1984 | Japan | 252/62.54 |
| 8494433 | 5/1984 | Japan | |

OTHER PUBLICATIONS

Article "Effects of Surface Treatment for Thermoplastic Magnet," Satoh et al., IEEE Translation Journal on Magnetics in Japan, vol. TJMJ No. 3, Jun. 1985, pp. 387-388.
Article "Thermoplastic Magnet Having Highly Improved Heat-Resistance," Satoh et al., IEEE Translation Journal on Magnetics in Japan, vol. TJMJ-1, No. 8 Nov. 1985, pp. 994-995.
Article "Treating Plastic Surfaces with Cold Gas Plasmas," Peter W. Rose and Edward M. Liston, *Plastics Engineering*, Oct. 1985, p. 41.
Article "Corrosion Protection of Copper Metal Surfaces by Plasma Polymerization," Jan A. Vanlier and Robert E. Ray, Jr., *Polymeric Materials Science and Engineering*, Proceedings of the ACS Div of Polymeric Materials: Science and Engineering, vol. 56, ACS, p. 603, 1987.
*Fundamentals of Plasma Chemistry and Technology*, by Herman V. Boenig, Techynomic Publishing, 1988. Disclosed But Not Furnished!

Primary Examiner—William R. Dixon, Jr.
Assistant Examiner—Paul Marcantoni
Attorney, Agent, or Firm—Samuel B. Lafferty; Daniel J. Hudak; Nestor W. Shust

[57] ABSTRACT

Oxidation of fully dense rare earth magnets is reduced when a passivating agent such as an oxidation resistant composition or corrosion inhibitor or combinations thereof, is coated thereon. The oxidation resistant composition is a binary or a ternary composition made from (a) at least one amino containing silane compound such as an aminosilane or a polyaminosilane, or (b) at least one epoxy resin, or (c) an epoxy silane compound, or all three such compounds. The oxidation resistant composition, the corrosion inhibitor, or combinations thereof, passivate the surface of the fully dense rare earth magnets and generally form a highly concentrated coating on the surface thereof. Antidegradants are optionally utilized to improve the performance of the fully dense rare earth magnets with regard to improved oxidation resistant properties and generally include organic phosphorus compounds and/or alcohols. One or more layers of the passivating agent and/or one or more layers of the antidegradant are applied to the fully dense magnet which can be in the form of an end product, an article, or any element or component thereof, and which is desirably substantially free of a binder. Such protective fully dense magnets have excellent high temperature oxidation resistance, corrosion resistance, degradation resistance, and the like.

78 Claims, 1 Drawing Sheet

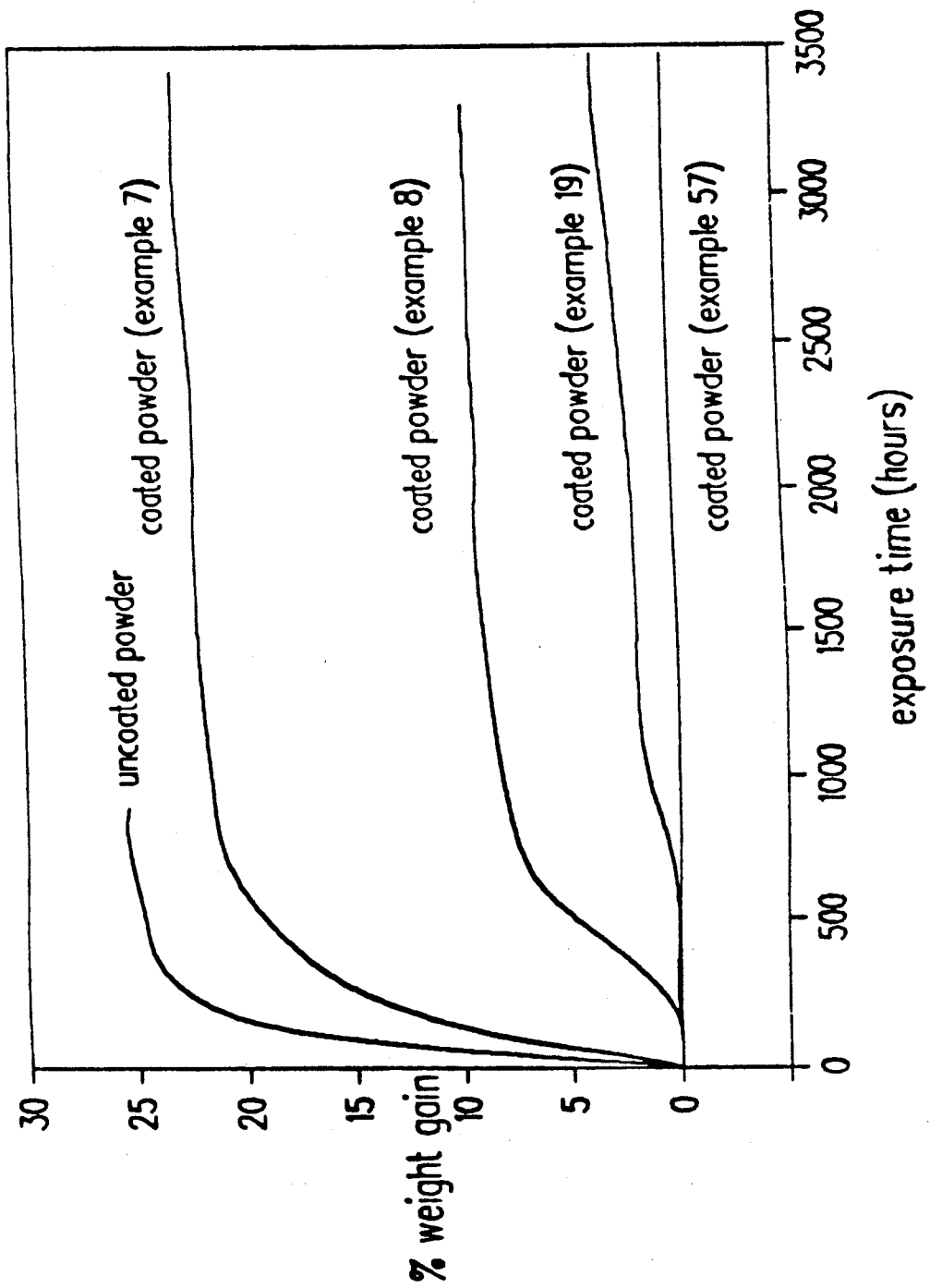

PASSIVATED RARE EARTH MAGNET OR MAGNETIC MATERIAL COMPOSITIONS

CROSS-REFERENCE

This application is a continuation-in-part of U.S. Ser. No. 07/409,538, now U.S. Pat. No. 4,988,755 filed Sep. 19, 1989, which in turn is a continuation-in-part of U.S. patent application Ser. No. 07/132,890, filed Dec. 14, 1987, for "Oxidation Resistant Compositions for Use With Rare Earth Magnets." U.S. Ser. No. 07/409,538, now U.S. Pat. No. 4,988,755 is also a continuation-in-part of U.S. patent application Ser. No. 07/313,662, now U.S. Pat. No. 4,869,964, filed Feb. 21, 1989, for "Oxidation Resistant Compositions for Use With Rare Earth Magnets," which in turn is a division of the aforementioned U.S. patent application Ser. No. 07/132,890, now U.S. Pat. No. 4,876,305 filed Dec. 14, 1987.

FIELD OF THE INVENTION

The present invention relates generally to fully dense rare earth magnet articles or products, or any element or component thereof, which is substantially free of a binder and is coated with a passivating agent, or an antidegradant, or combinations thereof.

BACKGROUND ART

Rare earth magnets and magnet powders are used extensively in electromechanical devices such as motors and actuators. It is known that rare earth magnets and especially rare earth magnet powders are highly reactive toward oxygen, moisture and other chemical agents such as chloride ions. The use of such reactive rare earth magnet powders in bonded magnets limits their application frequently to temperatures under 100° C. Inasmuch as rare earth magnets and rare earth magnet powders have been known for approximately 15 years, a need has existed with regard to their oxidative and corrosive stability, a need which has been heightened with the introduction of the iron-based rare earth magnet alloys.

An article "Effects of Surface Treatment for Thermoplastic Magnet" by Satoh, et al, IEEE Translation Journal on Magnetics in Japan, Volume TJMJ-1, No. 3, June 1985, page 387,388, disclosed the use of various coupling agents which are used to increase the loading of magnetic alloy powder and to improve the processing of the same material.

The article "Thermoplastic Magnet Having Highly Improved Heat-Resistance" by Satoh, et al, IEEE Translation Journal on Magnetics in Japan, Volume TJMJ-1, No. 8, November 1985, relates to the use of a heat resistant coupling agent which was utilized to coat $SmCo_5$ powders.

Both of the above articles have graphs indicating dramatic drop off in magnetic properties at temperatures in excess of 100° C. and essentially nonexistent magnetic properties at 200° C.

European Patent Application 260,870 relates to corrosion resistant magnetic powders provided by treating magnetic particles with a solution containing chromate or dichromate ions and polymeric magnets containing the powder.

Japanese Patent Application 84/94433 filed May 14, 1984, relates to an anti-corrosive coating for metals containing ethylene vinylacetate polymers, acrylic polymers, or polyvinyl acetals; amino silanes; and epoxides. The compound forms a weather-resistant anti-corrosive coating for metals.

U.S. Pat. No. 4,241,116 to Taniyama et al relates to a method of treating the surface of a shaped polycarbonate resin. A first treating layer contains a bisphenol type epoxy resin. The article is then subsequently coated with a composition containing three different types of compounds, the first compound being the reaction mixture of an aminoalkylalkoxy silane with an epoxyalkylalkoxy silane, the second compound is a mixture of an alkyl-modified methylol melamine with an alkyl resin and the third compound is an acrylic acid derivative.

U.S. Pat. No. 4,558,077 to Gray relates to high glass transition temperature epoxy resins, that is polyglycidyl ethers of polyphenol alkanes, which are utilized to bond rare earth-iron alloy magnets.

U.S. Pat. No. 4,497,722 to Tsuchida relates to a plastic magnet composition utilizing a thermoplastic resin as a binder and a phosphorus containing compound having at least one phosphorus-to-oxygen linkage which is coated on the particle surface.

U.S Pat. No. 4,802,931 to Croat relates to magnetically hard compositions having high values of coercivity, remanence and energy product which contain rare earth elements, transition metal elements and boron in suitable proportions. The preferred rare earth-elements are neodymium and praseodymium, and the preferred transition metal element is iron. The magnetic alloys have characteristic very finely crystalline microstructures.

DRAWINGS

FIG. 1 is a graph showing comparative results of various examples.

SUMMARY OF THE INVENTION

Rare earth magnets or magnet materials are made into articles or end products, or any element or component thereof, according to generally known methods, such as by sintering, alignment and sintering, compression, die-upset, and the like. Such rare earth articles, elements, and the like are essentially free of binders and are generally referred to as fully dense magnets. According to various aspects of the present invention, such articles, elements, etc., are coated, covered, or the like, with passivating agents, or antidegradants, or both. Many numerous types of laminates or coatings can thus be formed wherein the localized concentration, layer, or the like, of the passivating agent and/or the antidegradant are applied thereto. The end result is a fully dense rare earth magnet article, element, or the like, which has good oxidation resistance, especially at high temperatures, as well as antidegradant properties. The passivating agent is generally an oxidation-resistant composition, a corrosion inhibitor, or combinations thereof, with the oxidation-resistant composition being an aminosilane compound and at least one of the following two compounds, an epoxy silane and/or an epoxy resin. The corrosion inhibitor compound can be an oxymetallate, a zinc salt, or combinations thereof. The fully dense rare earth material is known to the art and to the literature and often contains neodymium, samarium, praseodymium, iron, cobalt, and other alloying elements such as aluminum, boron, carbon, chromium, copper, gallium, hafnium, manganese, niobium, tantalum, titanium, vanadium, zirconium, and the like.

The antidegradant is generally an organophosphorus compound.

DETAILED DESCRIPTION

Generally, any conventional rare earth magnet or magnetic material including alloys and mixtures thereof including magnetizable compounds can be utilized in the present invention as well as those known to the art and to the literature. By the term "rare earth magnet or magnetic material," it is meant any magnetic material or magnetizable material which contains at least one rare earth element therein, that is an element having an atomic number of from 57 to 71. Such elements can be contained in either minor or major amounts. Such rare earth magnets can contain minor or major amounts of non-rare earth elements such as iron, cobalt, nickel, boron, and the like. Another definition of rare earth magnetic materials are compositions, that is alloys and/or mixtures, containing one or more rare earth elements which generally have good magnetic properties, that is magnetic properties such as generating a magnetic force which is greater than that obtained utilizing conventional non-rare earth magnets such as alloys of nickel, iron, and cobalt. Often times the residual induction value ($B_r$) of the rare earth magnets is 25 percent greater than that generated by conventional non-rare earth magnet materials such as barium ferrite.

Rare earth magnets are described in various articles and especially in patents such as U.S. Pat. No. 4,496,395 to Croat, U.S. Pat. No. 4,558,077 to Gray, U.S. Pat. No. 4,597,938 to Matsuura et al, U.S. Pat. No. 4,601,875 to Yamamoto et al, U.S. Pat. No. 4,684,406 to Matsuura et al, U.S. Pat. No. 4,802,931 to Croat, European Patent Application 108,474 to General Motors, and European Patent Application Nos. 106,948 and 134,304 to Sumitomo Special Metals Company Ltd., all of which are hereby fully incorporated by reference with regard to the rare earth magnet compositions, methods of preparation, and the like disclosed therein.

For example, a preferred type of rare earth magnet can contain alloys of neodymium or praseodymium in combination with iron and boron, as in elementary ratios of 2 moles of neodymium to 14 moles of iron to 1 mole of boron, all as described in U. S. Pat. No. 4,558,077, as well as in U.S. Pat. No. 4,802,931. More specifically, the primary phase of magnetic alloys is believed to have the composition $RE_2Fe_{14}B$ with a preferred composition being in the range of $RE_{0.12-0.15}B_{0.04-0.09}Fe_{bal}$ (atomic-fractions). RE is a rare earth element, preferably neodymium or praseodymium. Die upset oriented alloys of the above-noted neodymium, iron, boron, and optional cobalt alloys can also be utilized and such magnets or powders thereof are generally well known to the art and to the literature and are commercially available. Alloys of the same containing small amounts of other compounds such as aluminum, gallium, copper, iron, zirconium, titanium, cobalt, carbon, palladium, and the like, can also be utilized.

Another preferred type of rare earth magnet is an alloy of samarium and cobalt as in a mole ratio of approximately 1 to 17. Typical formulations include $SmCo_5$ type magnets, $Sm_2(Co,Cu)_{17}$, and the like. A description of such samarium-cobalt magnets are described in *Science*, Volume 28, May 23, 1980, pages 880-894; K. J. Strnat, J. Magn., Magn. Mater, 7 (1978), 351; A. Menth, H. Nagel, R. S. Perkins, Ann. Rev. Mater. Sci. 8 (1978), 21; and J. D. Livingston "General Electric—Technical Info. Series," Report No. 80, CRD 139, July 1980, all of which are fully incorporated by reference. Other suitable rare earth magnets are made from alloys of samarium, cobalt, and iron wherein the iron is generally present in small amounts. Still other rare earth magnet alloys contain dysprosium and cobalt.

A large class of rare earth magnet or magnetic materials are various alloys of iron, boron, at least one rare earth element, and optionally cobalt. In the three component system, the amount of boron is generally from about 2 percent to about 28 percent by weight, the amount of the one or more rare earth elements is from about 8 percent to about 30 percent by weight, with the remaining balance being iron. When cobalt is utilized, the amount of the one or more rare earth elements is from about 8 to about 30 percent by weight, the amount of boron is from about 2 to about 28 percent by weight, cobalt is utilized in an amount of from about 0.1 to about 50 percent by weight, and the balance is iron.

Other rare earth magnet compositions are set forth in "Rare Earth Permanent Magnets," E. A. Nesbitt and J. H. Wernick, Academic Press, New York 1973, which is hereby fully incorporated by reference.

A problem with existing rare earth magnets or magnetic materials is that they are readily oxidized, especially at high temperatures, as for example, at temperatures above 125° C. or 150° C. However, unexpectedly good magnetic retention is obtained with rare earth magnets when treated with the passivated compositions of the present invention, even at high temperatures such as above 150° C. For example, irreversible losses of less than 10 percent of residual induction or coercive force are achieved by the passivating compositions of the present invention when the coated magnets or magnetic materials are subjected to temperatures of approximately 300° C. for about two hours. In other words, an oxidation-resistant composition or a corrosion inhibitor, or mixtures thereof, are utilized to passivate, that is to neutralize or to substantially abate the reactivity of the rare earth magnets which tend to be highly reactive. While it is not fully understood, it is generally thought that a reaction occurs between the oxidation-resistant composition and/or the corrosion inhibitor with the surface of the rare earth magnet whereby the oxidation-resistant composition or corrosion inhibitor is actually attached, adhered, or anchored to the surface of the particle as in the form of a layer, strata, or coating. Such a layer, coating, etc. is generally substantial and, encapsulates, surrounds, envelopes, etc. one or more individual particles, and desirably completely covers said particles. The passivating agents are generally added separately to the rare earth magnets which may be in the form of particles or powders and mixed therewith as soon as possible after the rare earth magnet materials are reduced in size. That is, the rare earth magnet materials initially exist as large particles and are reduced in size as through grinding, according to any conventional method, whereupon effective amounts of the oxidation-resistant composition and/or corrosion inhibitor are added so that upon shearing, breaking, etc., of the particles, the passivating material is immediately applied thereto before any considerable oxidation or corrosion can occur. The improvement in long-term oxidation is generally quite considerable as is the corrosion resistance.

According to the concepts of the present invention, various binary or ternary systems, that is oxidation resistant compositions are formed by combining (1) an aminosilane compound and (2) either an epoxy silane and/or an epoxy resin compound.

Considering the amino containing silane compounds, these are generally of two types, an aminosilane compound or a polyaminosilane compound.

The aminosilanes and polyaminosilanes generally have the formula:

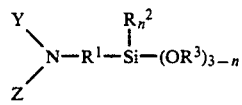

wherein $R^1$ is generally a hydrocarbon group having from 1 to about 30 carbon atoms. The divalent $R^1$ moiety can be an aliphatic, aromatic, or combinations thereof, e.g., an alkyl group, an aromatic group, an alkylalkoxy group, an alkylalkenyl group or an alkylaryl group. When $R^1$ is aliphatic, an alkyl group is preferred. When $R^1$ is aliphatic, it can contain 1 to 20 carbon atoms, desirably from 1 to 11 carbon atoms, and preferably 3 to 4 carbon atoms. Hence, propyl and butyl groups are preferred. When $R^1$ is aromatic or alkylaryl, it generally contains from 6 to 30 carbon atoms, desirably from 7 to 16 carbon atoms, and preferably from 7 to 9 carbon atoms. The $R^2$ and $R^3$ moieties are univalent hydrocarbon groups where n is equal to 1 or preferably 0. That is, when n is 0, $R^2$ is non-existent. $R^2$ and $R^3$, independently represent hydrocarbon groups containing from 1 to 20 carbon atoms, e.g., aliphatic, aromatic, or combinations thereof, desirably from 1 to 11 carbon atoms such as an alkyl, and preferably an alkyl having from 1 to 2 carbon atoms. Hence, methyl and ethyl groups are preferred. Y and Z independently represent a hydrogen atom, an aminoalkyl group, a polyaminoalkyl group, an aryl group, an alkylalkoxysilane group or an aminoalkylalkoxysilane group wherein the alkyl group has from 1 to 12 carbon atoms and the alkoxy group has from 1 to 6 carbon atoms. Since Y and Z represent independent groups, the groups can be the same or different. Y is generally a hydrogen atom or an aminoalkyl group. When Y is an aminoalkyl group, it should contain at least one secondary or primary amine moiety. Generalized examples of Y and Z groups include $-(CH_2)_pNH_2$; $-[(CH_2)_2NH]_qH$, $-C_6H_5$, $-(CH_2)_pSi(OR)_3$, and $-[(CH_2)_2NH]_q(CH_2)_pSi(OR)_3$, where q is 1 to 10,000, preferably 1 to 1,000 (polymeric) and wherein p is 1 to 12. The alkoxy groups, $-OR^3$ which are attached to the silicon atom of the aminosilane or polyaminosilane compound are easily hydrolyzed to silanol groups, other easily hydrolyzed groups may be substituted for the alkoxy groups. Examples of suitable hydrolyzable groups which can be substituted for the preferred alkoxy groups include acyloxy, amine or chloride. Examples of suitable aminosilane and polyaminosilane compounds of the present invention include:

4-aminobutyltriethoxysilane
(aminoethylaminomethyl)phenethyltrimethoxysilane
N-(2-aminoethyl)-3-aminopropylmethyldimethoxysilane
3-aminopropyltriethoxysilane
3-aminopropyltrimethoxysilane
N-2-aminoethyl-3-aminopropyltrimethoxysilane
N-2-aminoethyl-3-aminopropyltris(2-ethylhexoxy)silane
6-(aminohexylaminopropyl)trimethoxysilane
3-aminophenyltrimethoxysilane
3-aminopropylmethyldiethoxysilane
bis[3-(trimethoxysilyl)propyl]ethylenediamine
n-phenylaminopropyltrimethoxysilane
trimethoxysilylpropyldiethylenetriamine-aminoundecyltrimethoxysilane
bis[3-(triethoxysilyl)propyl]amine
dimethoxymethylsilylpropyl(polyethyleneimine) trimethoxysilylpropyl(polyethylenimine). Highly preferred aminosilane compounds of the present invention include 3-aminopropyltriethoxysilane, 3-aminopropyltrimethoxysilane and N-2-aminoethyl-3-aminopropyltrimethoxysilane.

A suitable aminosilane compound can be utilized either separately or in combination with one or more aminosilanes in the present invention. Typically, an aminosilane is utilized separately and the amount thereof is generally from about 5 parts to about 70 parts by weight, desirably from about 20 parts to about 60 parts by weight and preferably from about 35 parts to about 50 parts by weight based upon each 100 parts by weight of the total oxidation resistant composition, such as a coating.

Substitution in part of the aminosilane component by any of a number of commercial amine curing agents can be accomplished within the scope of the present invention. An example of a suitable compound would be diethylenetriamine, $H_2NCH_2CH_2NHCH_2CH_2NH_2$ or triethylenetetramine, $H_2NCH_2CH_2NHCH_2CH_2NHCH_2CH_2NH_2$. It is furthermore noted that substitution in total or in part of the aminosilane component by aluminum, titanium, zirconium or similarly based amine compounds are within the scope of the present invention. A similar proviso can be made with regard to the epoxy silane component.

The epoxy silane compound can be any compound which contains at least one epoxy group and one silane group therein. Desirably, such a compound can be a glycidoxysilane or an epoxycyclohexylsilane compound. Considering the epoxy silane compound, it generally has the formula:

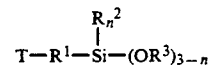

wherein $R^1$ is generally a hydrocarbon group having from 1 to about 30 carbon atoms. The divalent $R^1$ moiety can be an aliphatic, aromatic, or combinations thereof, e.g., an alkyl group, an aromatic group, an alkylalkoxy group, an alkylalkenyl group or an alkylaryl group. When $R^1$ is aliphatic, an alkyl group is preferred. When $R^1$ is aliphatic, it can contain 1 to 20 carbon atoms, desirably from 1 to 11 carbon atoms, and preferably 2 or 3 carbon atoms. Hence, an ethyl or a propyl group is preferred. When $R^1$ is aromatic or alkylaryl, it generally ally contains from 6 to 30 carbon atoms, desirably from 7 to 16 carbon atoms, and preferably from 7 to 9 carbon atoms. Considering the silane substituted groups, that is $R^2$, and $R^3$, these groups are as set forth hereinabove with regard to the description of the aminosilanes and are thus hereby fully incorporated by reference. T represents an epoxycyclohexyl group or a glycidoxy group, or alkyl derivatives thereof.

Examples of suitable epoxy silane compounds of the present invention include:
(3-glycidoxypropyl)methyldiethoxysilane
(3-glycidoxypropyl)trimethoxysilane 2-(3,4-epoxycyclohexyl)ethylmethyldimethoxysilane
2-(3,4-epoxycyclohexyl)ethyltrimethoxysilane and
[2-(3,4-epoxy-4-methylcyclohexyl)propyl]methyldiethoxy silane. A highly preferred epoxy silane is (3-glycidoxypropyl)trimethoxysilane.

The amount of the epoxy silane compound is from about 5 to about 70 parts by weight, desirably from about 10 to about 55 parts by weight, and preferably from about 15 to about 40 parts by weight being preferred for each 100 parts by weight of the total oxidation resistant composition or coating.

The epoxy resin can be any conventional epoxy compound as well as those known to the art and to the literature. Thus, various epoxies can be utilized as set forth in "Handbook of Epoxy Resins," H. Lee and K. Neville, McGraw-Hill, New York (1967), "Epoxide Resins," W. G. Potter, Springer-Verlag, New York (1970), and "Epoxy Resin Chemistry and Technology," C. A. May and Y. Tanaka (editors) Marcel Dekker, New York (1973), all of which are hereby fully incorporated by reference. The classical example of an epoxy resin is the reaction product of bisphenol A and epichlorohydrin. Other hydroxyl containing compounds including resorcinol, hydroquinone, glycols, glycerol, and the like, can replace bisphenol A as is known to those skilled in the art and to the literature. Of course, numerous other epoxy resins can be utilized as well as epoxy-siloxane compositions such as bis(3-glycidoxypropyl)tetramethyldisiloxane). Included within the definition of epoxy resins are epoxy novolacs and the like as well as epoxy resins containing 3 or more functional groups, that is epoxy groups therein, and the like.

The epoxy resin is generally utilized in amounts of from about 5 parts to about 90 parts by weight, desirably from about 10 parts to about 50 parts by weight, and preferably from about 20 parts to about 40 parts by weight, for each 100 parts by weight of total oxidation resistant composition or coating.

As noted above, various binary systems can be utilized. Thus, the binary systems include a mixture of the epoxy resin and the aminosilane, or an aminosilane and the epoxysilane compound. Thus, regardless of which binary system is utilized, each system has at least one epoxy compound therein and at least one aminosilane-containing compound therein. Whenever a binary system is utilized, the amount of one of the components is from about 20 to about 80 parts by weight and preferably from 30 to 70 parts by weight, with the amount of the remaining component being from about 80 to about 20 parts by weight. Preferably, however, the ternary system exists, that is the oxidation resistant composition contains the epoxy resin, the aminosilane compound, be it a polyamino and/or a monoaminosilane compound, and the epoxysilane compound.

In forming the oxidation resistant composition or coating, a premixture of the epoxy resin and the epoxy silane compound is usually formed. The aminosilane and/or the polyaminosilane compounds are then added to the premixture and blended or mixed therewith. The mixing procedure with the rare earth magnet or magnetic material which desirably is in the form of a metallic powder is generally carried out in a solvent system. A solvent system is desirably utilized in that it is an effective manner to apply a thin oxidation resistant coating to the various above-noted rare earth magnet materials. The solvents are generally any organic solvent which is effective in dissolving the oxidation resistant composition and includes alcohols having from 1 to 8 carbon atoms, various aromatic compounds such as toluene, benzene, xylene, and the like. Various ketones containing a total of from about 3 to about 10 carbon atoms can be utilized such as methyl ethyl ketone. It is an important aspect of the present invention that the water content within the solvent be generally less than 5 percent by weight based upon the total weight of the solvent in order to limit hydrolysis.

As noted above, the corrosion inhibitors can be added either by themselves, that is no oxidation-resistant composition is contained on the magnetic materials, or in combination with the oxidation-resistant composition, i.e., a physical mixture thereof, or as a separate layer(s) in any order, that is either as a first layer coating the magnetic materials or as a second layer residing on and attached to a first layer which is an oxidation-resistant composition, etc. In other words, the addition of the oxidation resistant composition and/or corrosion inhibitors is in such a manner to the surface of one or more particles such that a highly localized concentration of the passivating agent is contained on or in proximity of the particle (s) surface whereas the overall magnetic composition has a low concentration thereof.

The rare earth magnetic materials generally have an average particle size of from about 1 to about 700 microns, desirably from 1 to about 100 microns, and preferably from about 10 to about 75 microns. Powders of the rare earth magnets are generally utilized inasmuch as they can be molded to form any desired shape, size, or form for a suitable end use or application as in motors, sealing strips, and the like.

The oxidation resistant composition is generally applied in a suitable solvent known to the art and to the literature so that a thin film, layer, or coating is later formed on the rare earth magnets or magnetic materials. Suitable solvents include water and/or alcohols having from 1 to 8 carbon atoms such as methanol, ethanol, propanol, and the like. A coating, film, layer, etc. substantially, if not completely, covers the various individual particles or small agglomerations thereof and provides good oxidation resistant protection. Another aspect of the present invention is that upon evaporation of the solvent, the various epoxy compounds generally cure the composition by crosslinking the various amine containing silane compounds. Cure can take place at room temperature or heat can be utilized to increase the cure rate. Generally some mixing is desired during cure to be sure that the particles are coated and to prevent large chunks, agglomerations, and the like from forming. It is furthermore thought that the oxidation resistant composition or coating generally reacts with the rare earth magnet or magnet materials, i.e. with the surface thereof. The treated materials can be heated up to 150° C. in vacuo and generally less than 130° C. in vacuo in order to complete the hydrolysis reaction and remove any volatile components. The application of the oxidation resistant composition to the rare earth magnets or magnetic materials unexpectedly provides good oxidation resistance when only a small amount and hence a very thin layer, coating, etc. is formed. The dramatic retention of magnetic properties for extended periods of time after subjecting the treated rare earth magnet powders to an extremely harsh oxidizing environment was unexpected for such thin coatings.

The corrosion inhibitors can also be applied with the oxidation resistant compound utilizing a solvent as set forth hereinabove when a mixture, etc., thereof, is desired. Alternatively, the corrosion inhibitor can be added separately to form a separate layer, strata, coating, or the like. As previously noted, corrosion inhibitor can be applied before or after the oxidation resistant material. Suitable solvents for the corrosion inhibitor can be the same as for the oxidation resistant material and are known to the art and to the literature and generally include water, and/or various alcohols having from 1 to 8 carbon atoms such as methanol, ethanol, and the like.

The application or method of application of the corrosion inhibitors has been found to be important inasmuch as different corrosion and oxidation resistance results are obtained. For example, the pH of the oxymetallate solution can greatly influence the degree of corrosion and oxidation resistance imparted to the treated rare earth magnet or magnetic powder. Application of neat oxymetallate and/or zinc salt composition to the magnetic materials, etc., may result in improved corrosion resistance but is not nearly as good as a solution application. However, since the oxymetallates tend to have low solubility in alcohol and alcohol-water mixtures, low molarity solutions are utilized. For example, a 2 percent by weight of a 0.05 molarity solution of chromate in water can be utilized in association with 98 percent by weight of a solvent such as methanol. It should be apparent that the molarity of the oxymetallate, e.g. chromate, as well as the amount of the solvent utilized can vary greatly within the teachings of the present invention. The corrosion treatments, such as rinsing the final coated product with an oxymetallate solution, negligibly changes the weight percentage coating, but they typically reduce the loss of magnetic properties due to salt corrosion in a humidity-controlled environment by as much as 90 percent and reduce the corresponding weight gain of the metallic powder due to corrosion also by 90 percent, and even 99 percent or more after 3,500 hours.

Application of the passivating agent solution can be by spraying, dipping, brushing, etc. Once the magnet or magnetic material has been treated, the solvent is allowed to evaporate therefrom. The amount of the passivating agent utilized will generally vary with the surface area of the magnet or particles to be treated.

One class of suitable corrosion inhibitors are the various water-soluble oxymetallate compounds such as the various phosphates, for example $NaH_2PO_4$, $Na_2HPO_4$, $Na_3PO_4$, $KH_2PO_4$, $K_2HPO_4$, $K_3PO_4$; the various molybdates such as $Na_2MoO_4$, $K_2MoO_4$; the various polymolybdates; the various chromates; the various dichromates; the various silicates, such as $Na_2SiO_3$, and the like, as well as combination thereof. $M_2Cr_2O_7$ and $M_2CrO_4$ are generally preferred, where M represents H, Li, Na, K, and the like. Another suitable class of corrosion inhibitors are the various zinc salts such as zinc sulfate, zinc nitrate, and the like. Such zinc salts are well known to the art as well as to the literature and can also be utilized in combination with the various oxymetallate compounds.

The passivating agent, that is, the oxidation resistant composition and/or the corrosion inhibitor, has been found to passivate or generally render inert the surface of the magnetic particles or agglomerations thereof. That is, generally individual particles are covered, although often times two or three or a small number of particles, that is small agglomerations, tend to clump or cling together and the same, as a whole, is generally surrounded by a layer, coating, or strata of the passivating agent. A highly concentrated or localized layer, strata, coating, etc. of the passivating agent is thus formed in the general vicinity of the rare earth magnet particle surface, although the overall concentration of the passivating agent of the rare earth composition which also includes the various binders set forth hereinbelow, and optionally various antidegradants, is low. In other words, the overall amount of the passivating agent based upon the total rare earth magnetic composition is low, although the concentration thereof in the vicinity of the rare earth magnetic particle surface is high. Thus, the amount of the oxidation resistant composition is generally 10 percent or less by weight, desirably 2 percent or less by weight, and preferably 0.5 percent or less by weight based upon the total weight of the rare earth magnets or magnetic materials and said oxidation-resistant composition. Similarly, the amount of the corrosion inhibitors is generally 10 percent or less by weight, desirably 2 percent or less by weight, and preferably 0.5 percent or less by weight based upon the total weight of the rare earth magnets or magnetic materials and said corrosion inhibitor. In fact, all that is required is an amount which will result in a single monomolecular layer about the rare earth particle. Desirably, both the oxidation resistant composition and the corrosion inhibitor are utilized to coat, encapsulate, etc. the rare earth magnet or magnetic material.

The rare earth magnetic compositions of the present invention can optionally contain various additives therein such as catalyst and hardeners. Catalysts are generally desired since they increase the reaction cure rate as well as result in some reaction of the epoxysilane with the epoxy resin. Various known conventional catalyst systems can be utilized such as 2-methylimidazole and tertiary amines such as triethylamine, benzyldimethylamine, and the like. The amount of the catalyst is generally small as from about 0.1 parts to about 5 parts by weight for every 100 parts by weight of oxidation resistant composition or coating.

Hardeners are utilized to impart heat resistance as well as chemical resistance to the oxidation resistant composition. Various conventional hardeners can be utilized such as polyamides, anhydrides, and polyamines. Examples of suitable polyamines include diethylenetriamine, methylenedianiline, DETA modified with liquid epoxy resin, and the like. The amount of hardeners is also small as from about 0.1 to about 5 parts by weight, and desirably from about 1 part to about 3 parts by weight for every 100 parts by weight of the oxidation resistant composition or coating.

Whenever the rare earth magnetic materials are formed into an end product such as a magnet for a motor, etc., various binders are desirably utilized to form a composite. An important criterion or choice in the selection of binder depends upon the ability of the binder to accept large volume loadings of magnet powders. Generally, the larger the amount of magnetic material contained in the binder without detrimental properties such as the binder losing its bonding ability to maintain a cohesive mass, etc., the better. Thus, the amount of binder is generally from about 2 percent to about 60 percent by volume and preferably from about 10 percent to about 40 percent by volume based upon the total volume of the binder, the oxidation resistant composition and/or corrosion inhibitor, and the rare earth magnet or magnet material. Another important aspect in the selection of a binder is its ability to be readily processed or utilized in a specific polymer processing type operation to form a finished bonded magnet, magnet end product, article, or the like. Such polymer processing systems or techniques generally include extrusion, injection molding, calendering, compression molding, and the like. Inasmuch as different processes can tolerate a higher viscosity of the rare earth magnet composition, that is, the blend of the rare earth magnets, the oxidation resistant materials, the corrosion inhibitors, the binders, the antidegradants, and the like, the viscosity of the composition can vary. Generally, the viscosity rapidly increases as the volume loading of the magnet material approaches the critical pigment volume limit.

As previously noted, the overall amount of the passivating agent is low. That is, the amount of the passivating agent by weight based upon the total amount by weight of the binder, the rare earth magnet or magnetic material, and the passivating agent is generally 5 percent or less by weight, desirably 1 percent or less by weight, and preferably 0.1 percent or less by weight. While such overall amount of passivating agent is low, it is effectively concentrated in the vicinity of the surface of the rare earth magnet or magnetic material.

Because of the demands placed upon the type of polymer concerning the use of different polymer processing techniques and as a rough rule of thumb, generally extrusion and calendering processes utilize elastomeric binders, injection molding processes utilize thermoplastic binders, and compression molding techniques generally utilize thermoset binders. Of course, exceptions can be found with regard to the use of specific polymers. The actual choice of the processing technique utilized in turn generally depends upon several criteria, such as the magnetic performance required or desired, acceptable tolerances of parts, the end temperature use range, the environment seen by the magnet, the manufacturing method utilized for the finished product, the total cost, and the like. The following description of each of the different polymer processing techniques which can be utilized generally will serve as a guideline for the selection of a proper binder polymer although other criteria at times can be utilized.

With regard to bonded magnets made by the extrusion process, the magnet articles or products tend to be profiles. The cross-sections of the profiles can be complex, the MGOe can generally be four or greater, application development cost is low, and specific major applications include permanent magnet motors.

With regard to magnet articles or products made by a calendering process, the products tend to be sheet or strip products, the products can be large sheets of variable gauge, the products can also be punched or strips. The magnetic properties generally include MGOe of four or greater, the application development cost is generally low, and major applications include sensors, molding devices, thin profile motor magnets, and the like.

Magnet articles or products made by injection molding processes generally include products which have three-dimensional shapes and magnetic properties can be obtained by applying an external magnetic field while the binder or magnetic particles are in a somewhat fluid state so that they can be aligned. The magnetic properties are generally of about 3.0 or greater MGOe, application development costs are generally high in that a prototype mold must be developed, and major applications include sensors, computer peripheral motors, and the like.

Magnet articles or products made by compression molding products tend to be products which have simple or elementary three-dimensional shapes such as rings, disks, and the like. High magnetic properties can be obtained inasmuch as large volume loading of rare earth magnetic materials can be achieved beyond that possible in the other noted polymer processing techniques, although good compaction generally requires very large presses. The magnetic properties achieved are generally from about 6.0 or greater MGOe and the application development costs are moderate Major applications include permanent magnet motors, sensor, and the like.

Magnet articles or products made by reactive injection molding processes generally include products which have three-dimensional shapes. Magnet properties can be obtained by applying an external magnet field while the binder and magnet particles are in a somewhat fluid state so that they can be aligned. The magnet properties are generally about 3.0 or greater or MGOe, applications costs are generally high and major applications include computer motors, sensors, and the like. The advantage of reaction injection molding over normal injection molding is low mold cost and the ability to handle thermoset binders.

With the above features of a particular processing technique in mind, various polymers will be mentioned with regard to each general type of binder class, although it should be noted that the same are only guidelines and different types of polymers or the same type of polymer can also be utilized in different polymer processing techniques so long as a suitable magnet article or product is produced.

One class of suitable binders are the various elastomers. Various elastomers which can be utilized generally in extrusion and calendering polymer processing techniques include various nitrile rubbers, i.e. copolymers of acrylonitrile and a conjugated diene such as butadiene, both saturated and unsaturated, can be utilized wherein the amount of acrylonitrile generally ranges from about 15 to about 55 percent by weight, desirably from about 30 to about 50 percent by weight, more desirably from about 34 to about 48 percent by weight, and preferably from about 36 to about 45 percent by weight, with the diene being the remainder. The amount of saturation is at least 85 percent and preferably at least 90 percent. Another suitable elastomer are the various polyacrylate rubbers made from esters of acrylic acid wherein the ester portion is an aliphatic and desirably an alkyl having from 1 to 20 carbon atoms and preferably from 1 to 5 carbon atoms. Ethyl acrylate is highly preferred having a number average molecular weight of about 20,000. Other elastomers include the various polyepichlorohydrins, various ethylene-propylene-diene monomer rubbers, that is EPDM, the various silicone graph EPDM, chlorosulfonated polyethylenes, thermoplastic elastomers such as thermoplastic polyurethane elastomers, and the like. The above elastomers are well known to the art as well as to the literature as is their method of preparation and the same are also commercially available.

Another group of suitable binders are the various thermoplastics. Such thermoplastics are generally well-suited for use in injection molding, although at times, when they meet the above process criteria with regard to a particular magnet article or end product, they can be utilized with other processing techniques. Examples of thermoplastic compounds include polyethylene, polypropylene, the various polyamides, including the various polyether block amides, the various thermoplastic polyurethanes, the various polyphenylene sulfides, and the like. Such thermoplastic compounds are also well known to the art and to the literature as is their method of preparation and the same are also commercially available. Preferred thermoplastic polymers include polyurethane, polyethylene, polyamide, and blends thereof.

Still another group include the various thermosets. Although the thermosets are generally readily utilized in compression molding, they are not necessarily limited to such a polymer processing technique or method if the processing there of is suitable in other polymer processing techniques. Specific examples of thermosets include polyurethane, epoxy, and the like. For example, suitable epoxies are set forth in U.S. Pat. No. 4,558,077 to Gray which is hereby fully incorporated by references. A suitable epoxy family are the various polyglycidyl ethers of polyphenol alkanes. A preferred epoxy is a tetraglycidyl ether of tetraphenol ethane having the idealized chemical structure:

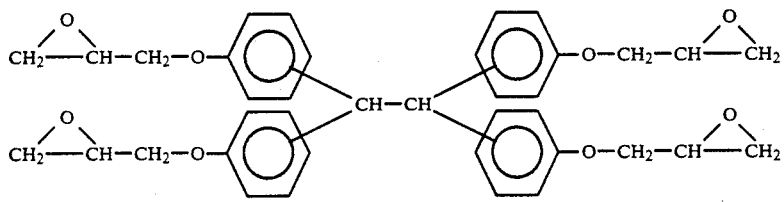

and an epoxide equivalent (grams of resin containing one gram-equivalent of epoxide) of about 150 to 300. In order to cure the epoxy a suitable amount of an imidazole catalyst substituted in the two position with a short chain alkyl or hydroxyalkyl group is entrained in the epoxy resin. The preferred catalyst must be inactive up to about 100° C., but should cure rapidly at higher temperatures. Other aspects of the epoxies are set forth in the incorporated Gray patent. Such thermosets are known to those skilled in the art and to the literature as is their method of preparation and the same are also commercially available. A preferred thermoset is an epoxy.

Still another class of suitable binders are the various reaction injection molding (RIM) compounds. Reaction injecting molding compounds are generally polyurethane systems or in a first component generally containing a catalyst and a separate second component generally containing a catalyst is added to a static mixing head and mixed therein. Subsequently, it is sent to a reaction cavity where generally under slight pressure the end product is molded and the like. Such RIM compounds are also well known to the art and to the literature as is their method of preparation and the same are also commercially available. Examples of specific RIM compounds can be found in any of the recent editions of the *Journal of Polymer Science,* and the like.

An important aspect of the present invention is that during molding or formation of the final product, regardless of whether the binder is a thermoset, a thermoplastic, or an elastomer, an external magnetic field can be applied so that various magnetic particles are generally all oriented in alignment with the magnetic field. Naturally, the magnetic field is applied at a stage in the processing where the thermoplastic, thermoset, etc., is fluid so that the magnetic particles can be oriented with regard to the magnetic field, and before any curing of the binder.

As noted, the antidegradants of the present invention include organic phosphorus type compounds. Suitable types of such compounds can be represented by the formulas

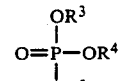 (FORMULA I)

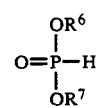 (FORMULA II)

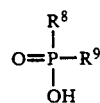 (FORMULA III)

(FORMULA IV)

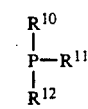

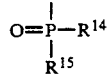 (FORMULA V)

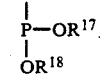 (FORMULA VI)

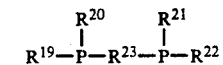 (FORMULA VII)

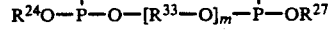 (FORMULA VIII)

(FORMULA IX)

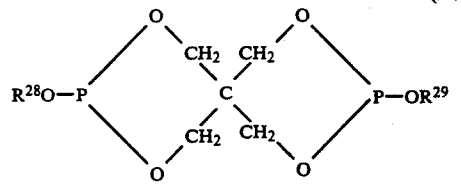

(FORMULA X)

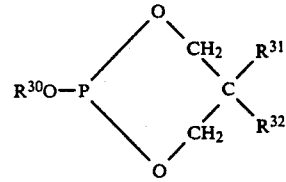

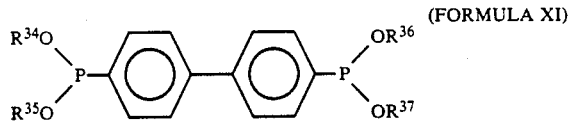

(FORMULA XI)

including any isomers of Formulas II, III, IV, V, VI, VII, VIII, IX, or X; and wherein $R^3$, $R^4$, $R^5$, $R^6$, $R^7$, $R^8$ or $R^9$, independently, is H, or a hydrocarbyl such as an aliphatic, an aromatic, or combinations thereof (e.g. an alkyl substituted aromatic, etc.), and desirably an alkyl, having from 1 to 25 carbon atoms, preferably from 15 to 20 carbon atoms, and preferably 17 or 18 carbon atoms, or further wherein any of $R^8$ or $R^9$ can be an alkoxy having from 1 to 25 carbon atoms; as well as an amine salt thereof, that is an amine salt of any of the preceding $R^1$ through $R^{10}$ groups, with any of Formulae I through X thus being a monoamine salt, a diamine salt, etc. $R^{10}$ through $R^{32}$, independently, can be a hydrocarbyl such as an aliphatic, an aromatic, or combinations thereof, (e.g. an alkyl substituted aromatic, etc.) and preferably an alkyl, generally having from 1 to 20 carbon atoms, desirably from 12 to 20 carbon atoms, and preferably 17 or 18 carbon atoms, or further wherein any of $R^{16}$, $R^{17}$ or $R^{18}$ can be H, or further wherein any of $R^{31}$ or $R^{32}$ can be an alkoxy having from 1 to 25 carbon atoms; as well as an amine salt thereof as explained hereinabove. $R^{33}$ is ethylene or propylene and m is 1 to 100. $R^{34}$, $R^{35}$, $R^{36}$, and $R^{37}$, independently, is hydrogen, or an aliphatic preferably an alkyl having from 1 to 18 carbon atoms, or an aromatic having from 6 to 12 carbon atoms, or combinations thereof (e.g. an alkyl substituted aromatic, etc.). Preferably, it is tertiarybutyl. Preferred organic phosphorus compounds include distearyl phosphate, distearyl pentaerythritol diphosphite, dilauryl phosphate, trilauryl phosphite, distearyl phosphite, ditridecyl phosphite, tetraphenyl dipropyleneglycol diphospite, and trisnonylphenyl phosphite.

Other antidegradants which are suitable to the present invention include aliphatic alcohols, aromatic alcohols, aliphatic substituted aromatic alcohols, or aromatic substituted aliphatic alcohols, having a total of from 8 to 25 carbon atoms, and preferably 12 to 20 carbon atoms with specific examples including octadecanol, dodecanol, and the like. Also included within the definition of alcohols is the polymer polyvinylalcohol generally having a weight average molecular weight of from about 2,000 to about 150,000.

The antidegradants, in addition to boosting or supplementing the oxidation resistance performance of the coating compounds, also help prevent the binder and its degradation products from reacting with the rare earth magnets or magnetic material. That is, whereas the oxidation resistant coatings and/or the corrosion inhibitors generally tend to act by tying up or passivating the surface of the magnetic particles and adhering thereto whereby oxidation thereof is reduced or limited, the antidegradants generally act by reacting with oxygen, and/or any oxidized species such as aldehydes, peroxides, carboxylic acids, and the like. Although the antidegradant can be combined with the passivating agent, that is the oxidation resistant composition and/or the corrosion inhibitor and mixed or blended therewith; it is desirably added as an additional layer or coating residing thereon, and/or is added to the binder composition, or both. In another aspect of the present invention, the antidegradant can be directly applied to the surface of the magnetic particles without utilizing any oxidation resistant coating or corrosion inhibitor, and the like, and generally is added as such in the presence of a binder. However, the preferred embodiment of the present invention relates to the above noted passivating agent(s) located on the surface of the rare earth magnet particles with the antidegradant(s) existing as a separate layer, coating, etc. on the passivating agent(s), and dispersed thereabout as in the binder. The amount of antidegradant based upon the amount of the rare earth magnets or magnet materials is generally up to about 25 percent by volume, and desirably up to about 2 percent by volume. In terms of the binder, the amount of the antidegradant is generally from 1 to about 40 parts by weight, desirably from 1 to about 20 parts by weight, and preferably from about 3 to about 8 parts by weight for every 100 parts by weight of the binder.

It has been found that the antidegradants tend to impart lubricity to the binder and therefore render it more readily processible. The antidegradant is generally added in the form or a solution with a suitable solvent. The type of suitable solvent depends upon the type of antidegradant. Compounds which serve as solvents for the various antidegradants are known to those skilled in the art as well as to the literature and generally include various aliphatic alcohols, aromatic alcohols, aliphatic substituted aromatic alcohols, aromatic substituted aliphatic alcohols; hydrocarbon compounds such as aliphatic or aromatic compounds or combinations thereof such as hexane, toluene, and the like; tetrahydrofuran, water, and the like. When not added in a solvent directly to the magnet material in combination with any oxidation resistant composition and/or corrosion inhibitors contained in the overall composition, the antidegradant is generally incorporated in a binder, as by mixing in a conventional manner in an extruder, a two-roll mill, a Banbury, and the like. The binder-antidegradant mixture can then be applied directly to the magnetic particles and mixed therewith in any conventional mixing device such as a calendar, a two-roll mill, an extruder, a Banbury, and the like.

According to another aspect of the present invention, rare earth magnets or magnetic materials, are generally made into large-size magnets by sintering. That is, particles of a rare earth magnet or magnet material generally in the presence of heat and pressure are sintered in accordance with standard techniques known to the art as well as to the literature, into a much larger article which desirably has a configuration of an end-use product. Inasmuch as the sintered articles contain fused rare earth compounds, the use of a binder is not required. The passivating agent as well as the optional antidegradant set forth hereinabove can be applied to the surface of the sintered rare earth article in any conventional manner, such as by spraying, brushing, dipping, and the like. Utilizing the sintering technique, various magnetic configurations suitable for use in motors, coils, and the like can be made.

According to another aspect of the present invention, magnetic articles having a desired configuration, such as for an end-use, are formed by mixing the rare earth magnet or magnetic materials noted hereinabove with a binder and forming the same into a desired configuration. In order to avoid oxidation and/or corrosion of the rare earth particles, immediately after formation thereof they are blended with a binder. The rare earth magnet/binder blend article, as a whole, can then be coated with the passivating agents of the present invention. The passivating agent as well as the optional antidegradant set forth hereinabove can be applied to the surface of the bonded rare earth article in any conventional manner, such as by spraying, brushing, dipping, and the like.

Another aspect of the present invention relates to plasma treatment of the passivated rare earth magnet particles as well as to treatment of the antidegradants, whether they exist on the coated rare earth particles, in the binder, or both. That is, the plasma treatment is generally applied to coated, encapsulated, etc. rare earth particles containing the oxidation resistant composition and/or the corrosion inhibitor in the form of a highly localized concentration, such as in the form of layers or the like. The plasma treatment can also be applied to the antidegradants located in the rare earth magnet composition, such as in the form of a coating or a localized concentration in the vicinity of the rare earth magnets or materials, located in the binders, or both. Inasmuch as a majority or a substantial amount of the plasma gas exists at room temperature or slightly above, the plasma treatment is generally referred to as a "cold gas" or a "low temperature" plasma.

A plasma is created by utilizing a gas at low pressure in a chamber and exciting the gas into an ionized state by the application of an electrical field. Generally, any gas can be utilized to create a plasma, as for example, oxygen, nitrogen, air, water vapor, helium, argon, neon, methane, and various other hydrocarbon gasses. The pressure utilized to create a plasma is generally very low, as from about 100 torr to about $10^{-6}$ torr, desirably from about 10 to about 0.001 torr, and preferably from about 1 to about 0.1 torr. The electrical field utilized to excite the gas into the plasma state is generally an alternating current with a frequency of from about 10 to about $10^9$ hertz, desirably from about 60 to about 20 megahertz, and optimally from about 13 to about 14 megahertz. Gas plasmas created under the above conditions are highly ionized with highly energetic electrons. Such plasmas generally produce intense emissions of ultraviolet light. While it is not fully understood what types of resulting interactions occur with the passivating agents or antidegradants of the present invention in association with the rare earth magnets or magnetic materials, it is thought that a large number of free radicals are generated by the emission of the intense ultraviolet light which tend to crosslink the passivated surfaces of the coated particles and the like. Inert atmospheres are generally desired, and thus preferred gasses include helium, argon, neon, krypton, xenon, and the like, with argon being preferred.

In operating a plasma chamber, in addition to the above-noted variables, the flow rate of the gas fed to the plasma chamber can vary from about 0 to 1,000 standard cc/min, desirably from about 10 to about 200 standard cc/min, for a period of from about 10 seconds to about 24 hours, and preferably from about 15 minutes to about 2 hours, at a power level of from about 10 to about 5,000 watts, and preferably from about 100 to about 1,000 watts.

The polymer-bonded coated rare earth magnets of the present invention can be utilized wherever oxidation resistance is required as in high temperature operations. Examples of suitable uses include utilization in motors, actuators, loudspeakers, and the like. Very desirable end uses are thus obtained due to the improved magnetic forces generated by the rare earth magnets and the largely improved oxidation resistant properties obtained.

The present invention will be better understood by reference to the following examples.

EXAMPLE 1

A mixture of 19.2 parts of a bisphenol A-epichlorohydrin resin (e.g., Shell Epon 828, Dow DER 331 or similar epoxy resin), 38.5 parts [3(glycidyloxy)propyl]trimethoxysilane and 42.3 parts [3-(amino)propyl]triethoxysilane was dissolved in aqueous methanol to provide a 2 percent solution. A 20 gram sample of finely ground NdFeB magnet alloy was mixed with 20 grams of the solution and blended for 72 hours. The sample was decanted and the treated magnet powder was rinsed and dried. A treated sample exhibited an oxidation rate at 300° C. of 0.24 percent/hour over a period of two hours while an untreated sample oxidized at a rate of 2.02 percent/hour under identical conditions.

EXAMPLE 2

A mixture of 18.7 parts of a bisphenol A-epichlorohydrin resin (e.g. Epon 828, DER 331 or similar epoxy resin), 37.3 parts [3-(glycidyloxy)propyl]trimethoxysilane and 44.0 parts [3-(amino)propyl]triethoxysilane was dissolved in toluene to provide a 50 percent solution. A 15 gram sample of NdFeB magnet alloy was mixed with 1 gram of the solution and blended for 2 minutes. The sample was rinsed and dried. A treated sample exhibited an oxidation rate at 300° C. of 0.0 percent/hour over a period of two hours while an untreated sample oxidized at a rate of 0.98 percent/hour under identical conditions. The treated sample did not show any degradation of intrinsic coercivity or residual induction after exposure at 300° C. for two hours while the intrinsic coercivity of the uncoated control samples decreased by more than 95 percent and the residual induction decreased by 45 percent.

EXAMPLE 3

A mixture of 20 parts of a bisphenol A-epichlorohydrin resin (e.g. Epon 828, DER 331 or similar epoxy resin), 40 parts [3-(glycidyloxy)propyl]trimethoxysilane and 40 parts [3-(amino)propyl]triethoxysilane was dissolved in aqueous methanol to provide a 2 percent solution. A 20 gram sample of finely ground SmCo(1-5) magnet alloy was mixed with 21 grams of the solution and blended for 71 hours. The sample was decanted and the treated magnet powder was rinsed and dried. A treated sample exhibited an oxidation rate at 300° C. of 0.21 percent/hour over a period of two hours while an untreated sample oxidized at a rate of 0.93 percent/hour under identical conditions.

EXAMPLE 4

A mixture of 9.5 parts of a bisphenol A-epichlorohydrin resin (e.g. Epon 828, DER 331 or similar epoxy resin), 10.3 parts of an epoxy novolac resin (e.g. Dow Tactix 485), 38.2 parts of [3-(glycidyloxy)propyl]-trimethoxysilane and 42.0 parts [3-(amino)propyl]triethoxysilane was dissolved in methyl ethyl ketone to provide a 25 percent solution. A 60 gram sample of NdFeB magnet alloy was mixed with 5 grams of the solution and blended for 2 minutes. The sample was then dried. A treated sample oxidized 0.05 percent at 200° C. over a period of 100 hours while an untreated sample oxidized 2.12 percent under identical conditions.

EXAMPLE 5

A mixture of 19.6 parts of a bisphenol A-epichlorohydrin resin (e.g. Epon 828, DER 331 or similar epoxy resin), 39.2 parts [3-(glycidyloxy)propyl]trimethoxysilane and 41.2 parts [3-(amino)propyl]triethoxysilane was dissolved in aqueous methanol to provide a 3 percent solution. A 20 gram sample of finely milled NdFeCoB magnet alloy was mixed with 20 grams of the solution and blended for 70 hours. The sample was decanted and the treated magnet powder was rinsed and dried. A treated sample exhibited an oxidation rate of 300° C. of 0.12 percent/hour over a period of two hours while an untreated sample oxidized at a rate of 1.35 percent/hour under identical conditions.

EXAMPLE 6

A mixture of 34.8 parts of a bisphenol A-epichlorohydrin resin (e.g. Epon 828, DER 331 or similar epoxy resin), 17.4 parts [3-(glycidyloxy)propyl]trimethoxysilane and 47.8 parts [3-(amino)propyl]triethoxysilane was dissolved in toluene to provide a 50 percent solution. A 50 gram sample of NdFeB magnet alloy was mixed with 10 grams of the solution and blended for 2 minutes. The sample was decanted rinsed and dried. A treated sample exhibited an oxidation rate of 300° C. of 0.13 percent/hour over a period of two hours while an untreated sample oxidized at a rate of 2.52 percent/hour under identical conditions.

EXAMPLE 7

A mixture of 19.2 parts of a bisphenol A-epichlorohydrin resin (e.g. Shell Epon 828, Dow DER 331 or similar epoxy resin), 38.5 parts [3-(glycidyloxy)propyl]trimethoxysilane and 42.3 parts [3-(amino)propyl]triethoxysilane was dissolved in aqueous methanol to provide a 4 percent solution. 1200 grams of finely ground NdFeB magnet alloy was mixed with 500 grams of the solution and rinsed and dried. A treated sample exhibited an oxidation rate of 300° C. of 0.145 percent/hour over a period of two hours while an untreated sample oxidized at a rate of 2.06 percent/hour under the same conditions. A 0.75 gram aliquot of a 0.017M NaCl solution was added to 2.5 gram samples of the coated and uncoated alloy and the samples were dried in vacuo at 110° C. The samples were then placed in a closed container containing saturated solutions of $(NH_4)_2SO_4$. The uncoated sample exhibited a weight gain of 5.6 percent after 137 hours while the coated sample showed only a 3.2 percent weight gain after 135 hours.

EXAMPLE 8

A 40 gram sample of the coated powder (Example VII) was blended with 10 grams of 0.05 M $K_2Cr_2O_7$ solution and mixed for 2 hours. The dichromate-treated sample was then decanted and dried in vacuo at 110° C. A 0.75 gram aliquot of a 0.017M NaCl solution was added to a 2.5 gram sample of the alloy and the sample was dried in vacuo at 110° C. The sample was placed in a closed container containing saturated solutions of $(NH_4)_2SO_4$. The sample did not exhibit any weight gain (within experimental error) even after more than 1,100 hours of exposure.

EXAMPLE 9

250 grams of NdFeB alloy was mixed with 50 grams of a 0.5M $K_2Cr_2O_7$ solution for 1 hour and the alloy was then decanted and dried in vacuo at 110° C. A mixture of 19.2 parts of a bisphenol A-epichlorohydrin resin (e.g. Shell Epon 828, Dow DER 331 or similar epoxy resin), 38.5 parts [3-(glycidyloxy)propyl]trimethoxysilane and 42.3 parts [3-(amino)propyl]triethoxysilane was dissolved in aqueous methanol to provide a 5.5 percent solution. 40 grams of the dichromate treated NdFeB magnet alloy was mixed with 18 grams of the solution and blended for 64.5 hours. The sample was decanted and the treated magnet powder was dried in vacuo. A 0.75 gram aliquot of a 0.086M NaCl solution was added to a 2.5 gram sample of the coated alloy and the same was dried in vacuo at 110° C. The sample was then placed in a closed container containing saturated solutions of $(NH_4)_2SO_4$. The sample did not exhibit any weight gain (within experimental error) after 1,400 hours while an uncoated sample showed a 7.9 percent increase in weight after 43 hours, a 19 percent weight gain after 114 hours and a 24 percent weight gain after 306 hours.

EXAMPLE 10

A mixture of 19.2 parts of a bisphenol A-epichlorohydrin resin (e.g. Shell Epon 828, Dow DER 331 or similar epoxy resin), 38.5 parts [3-(glycidyloxy)propyl]trimethoxysilane and 42.3 parts [3-(amino)propyl]triethoxysilane was dissolved in a methanol / 0.05M $K_2CrO_4$ (92.8) solution to provide a 5 percent solution. 40 grams of finely ground NdFeB magnet alloy was mixed with 20 grams of the solution and blended for 69 hours. The sample was decanted and the treated magnet powder was dried. A 0.75 gram aliquot of a 0.086M NaCl solution was added to a 2.5 gram sample of the coated alloy and the sample was dried in vacuo at 110° C. The sample was then placed in a closed container containing saturated solutions of $(NH_4)_2SO_4$. After 207 hours, the treated sample had not gained any weight (within experimental error) while an uncoated sample had shown a 22.6 percent weight gain after 210.5 hours. After 497 hours, the treated sample had gained 3.98 percent in weight while an uncoated sample had shown a 24.6 percent weight gain after 498.5 hours.

EXAMPLE 11

A mixture of 30 parts of an ethylene/vinyl acetate copolymer (25 percent vinyl acetate content), 35 parts [3-(glycidyloxy)propyl]trimethoxysilane and 35 parts [3-(amino)propyl]triethoxysilane was dissolved in a methyl ethyl ketone-toluene blend (18 parts MEK:72 parts toluene) to provide a 10 percent solution. 30 grams of finely ground NdFeB magnet alloy was mixed with 5 grams of the solution and blended for one hour. The sample was decanted and dried in vacuo for two hours at 80° C. A treated sample exhibited an oxidation rate at 300° C. of 0.607 percent/hour over a period of two hours while an untreated sample oxidized at a rate of 2.51 percent/hour under the same conditions. A 0.75 gram aliquot of a 0.017M NaCl solution was added to a 2.5 gram sample of the coated alloy and dried in vacuo at 110° C. The sample was then placed in a closed container containing saturated solutions of $(NH_4)_2SO_4$. The coated sample exhibited a weight gain of 5.2 percent after 168 hours while uncoated samples showed weight gains of 4.80 percent and 6.00 percent after 161 hours.

EXAMPLE 12

A mixture of 50 parts of a bisphenol A-epichlorohydrin resin (e.g. Epon 828, DER 331 or similar epoxy resin), and 50 parts [3-(glycidyloxy)propyl]trimethoxysilane was dissolved in methyl ethyl ketone to provide a 10 percent solution. A 40 gram sample of NdFeB magnet alloy was mixed with 10 grams of the solution and blended for 2 minutes. The sample was decanted and dried in vacuo at 95° C. A treated sample exhibited an oxidation rate at 300° C. of 0.881 percent/hour over a period of two hours while an uncoated sample oxidized at a rate of 1.43 percent/hour under similar conditions.

EXAMPLE 13

A mixture of 50 parts of [3-(amino)propyl]-triethoxysilane and 50 parts [3-(glycidyloxy)propyl]trimethoxysilane was dissolved in a methyl ethyl ketone to provide a 10 percent solution. A 40 gram sample of NdFeB magnet alloy was mixed with 10 grams of the solution and blended for two minutes. The sample was decanted and dried in vacuo at 95° C. A treated sample exhibited an oxidation rate at 300° C. of 0.071 percent/hour over a period of two hours while an uncoated sample oxidized at a rate of 1.43 percent/hour under similar conditions.

EXAMPLE 14

A mixture of 50 parts of a bisphenol A-epichlorohydrin resin (e.g. Epon 828, DER 331 or similar epoxy resin), and 50 parts [3-(amino)propyl]triethoxysilane was dissolved in methyl ethyl ketone to provide a 10 percent solution. A 40 gram sample of NdFeB magnet alloy was mixed with 10 grams of the solution and blended for two minutes. The sample was then decanted and dried in vacuo at 95° C. A treated sample exhibited an oxidation rate at 300° C. of 0.084 percent/hour over a period of two hours while an uncoated sample oxidized at a rate of 1.43 percent/hour under similar conditions.

EXAMPLE 15

A mixture of 50 parts of a bisphenol A-epichlorohydrin resin (e.g. Epon 828, DER 331 or similar epoxy resin), and 50 parts [3-(amino)propyl]triethoxysilane was dissolved in aqueous methanol to provide a 5.9 percent solution. A 40 gram sample of NdFeB magnet alloy was mixed with 17 grams of the solution and blended for 73 hours. The sample was decanted and dried in vacuo at 92° C. A treated sample exhibited an oxidation rate at 300° C. of 0.053 percent/hour over a period of two hours while an uncoated sample oxidized at a rate of 2.36 percent/hour under similar conditions.

EXAMPLE 16

A mixture of 50 parts of a bisphenol A-epichlorohydrin resin (e.g. Epon 828, DER 331 or similar epoxy resin), and 50 parts [3-(glycidyloxy)propyl]trimethoxysilane was dissolved in aqueous methanol to provide a 5.9 percent solution. A 40 gram sample of NdFeB magnet alloy was mixed with 17 grams of the solution and blended for 73 hours. The sample was decanted and dried in vacuo at 92° C. A treated sample exhibited an oxidation rate at 300° C. of 0.290 percent/hour over a period of two hours while an uncoated sample oxidized at a rate of 2.36 percent/hour under similar conditions.

EXAMPLE 17

A mixture of 50 parts of [3-(glycidyloxy)propyl]-trimethoxysilane and 50 parts [3-(amino)propyl]triethoxysilane was dissolved in aqueous methanol to provide a 5.9 percent solution. A 40 gram sample of NdFeB magnet alloy was mixed with 17 grams of the solution and blended for 73 hours. The sample was decanted and dried in vacuo at 92° C. A treated sample exhibited an oxidation rate of 300° C. of 0.162 percent/hour over a period of two hours while an uncoated sample oxidized at a rate of 2.36 percent/hour under similar conditions.

EXAMPLE 18

[3-(amino)propyl]triethoxysilane was dissolved in aqueous methanol to provide a 5 percent solution. A 40 gram sample of NdFeB magnet alloy was mixed with 20 grams of the solution and blended for 50 hours. The sample was decanted, rinsed with isopropanol, and dried in vacuo at 110° C. A treated sample exhibited an oxidation rate of 300° C. of 2.84 percent/hour over a period of two hours while an uncoated sample oxidized at a rate of 2.98 percent/hour under similar conditions.

EXAMPLE 19

A mixture of 19.2 parts of a bisphenol A-epichlorohydrin resin (e.g., Shell Epon 828, Dow DER 331 or similar epoxy resin), 38.5 parts [3-(glycidyloxy)propyl]trimethoxysilane and 42.3 parts [3-(amino)propyl]triethoxysilane was dissolved in a methanol/0.05M $K_2CrO_4$ (84:16) solution to provide a 5 percent solution. 40 grams of finely ground NdFeB magnet alloy was mixed with 20 grams of the solution and blended for 68.5 hours. The sample was decanted and the treated magnet powder was dried. A 0.75 gram aliquot of a 0.086M NaCl solution was added to a 2.5 gram sample of the coated alloy and the sample was dried in vacuo at 110° C. The sample was then placed in a closed container containing saturated solutions of $(NH_4)_2SO_4$. After 319.5 hours, the treated sample had not gained any weight (within experimental error).

As apparent from the above examples, it is evident that vastly improved properties, in excess of 4-fold factor and often in excess of a 10- and even a 100-fold factor, were achieved utilizing the oxidation resistant compositions of the present invention.

Examples 20 through 57 generally relate to a rare earth powder coated with a passivating agent with various coated particles being bonded by a binder.

EXAMPLE 20

A kilogram of NdFeB alloy powder was divided into 2 equal portions. One portion (500 grams) of NdFeB alloy was mixed with 100 mL of $H_3PO_4$-acidified $K_2Cr_2O_7$ solution (0.10M) for one hour and the alloy was then decanted and dried under nitrogen at 60° C. and in vacuo at 110° C. The treated powder was then incorporated into a binder by milling (Milling procedure A). The remaining 500 grams of untreated powder was similarly milled into another portion of the same binder.

EXAMPLE 21

A kilogram of NdFeB alloy powder was divided into 2 equal portions. One portion (500 grams) of NdFeB alloy was mixed with 100 mL of $H_3PO_4$-acidified $K_2Cr_2O_7$ solution (0.10M) for one hour and the alloy was then decanted and dried under nitrogen at 60° C. and in vacuo at 110° C. A mixture of 19.2 parts of a bisphenol A-epichlorohydrin resin (e.g., Shell Epon 828, Dow DER 331 or similar epoxy resin), 38.5 parts [3-(glycidyloxy)propyl]trimethoxysilane and 42.3 parts [3-(amino)propyl]-trimethoxysilane was dissolved in aqueous methanol to provide a 4.8 percent solution. 500 grams of the dichromate treated NdFeB magnet alloy was mixed with 210 grams of the solution and blended for 72 hours. The sample was decanted and the treated magnet powder was dried under nitrogen and in vacuo. Seventy-five grams of toluene containing 5 grams of distearyl pentaerythritol diphosphite was added to the coated powder and blended for one hour. The slurry was then filtered and dried as above. The treated powder was then incorporated into a binder by milling (Milling procedure A). The remaining 500 grams of untreated powder was similarly milled into another portion of the same binder.

EXAMPLE 22

A kilogram of NdFeB alloy powder was divided into 2 equal portions. One portion (500 grams) of NdFeB alloy was mixed with 100 mL of $H_3PO_4$-acidified $K_2Cr_2O_7$ solution (0.10M) for one hour and the alloy was then decanted and dried under nitrogen at 60° C. and in vacuo at 110° C. A mixture of 19.2 parts of a bisphenol A-epichlorohydrin resin (e.g., Shell Epon 828, Dow DER 331 or similar epoxy resin), 38.5 parts [3-(glycidyloxy)propyl]trimethoxysilane and 42.3 parts [3-(amino)propyl]-trimethoxysilane was dissolved in aqueous methanol to provide a 4.8 percent solution. 500 grams of the dichromate treated NdFeB magnet alloy was mixed with 210 grams of the solution and blended for 72 hours. The sample was decanted and the treated magnet powder was dried under nitrogen and in vacuo. Two hundred and fifty milliliters of a 0.10M solution of dilauryl phosphate (in water) was added to the coated powder and blended for one hour. The slurry was then filtered and dried as above. The treated powder was then incorporated into a binder by milling (Milling procedure A). The remaining 500 grams of untreated powder was similarly milled into another portion of the same binder.

EXAMPLE 23

A kilogram of NdFeB alloy powder was divided into 2 equal portions. One portion (500 grams) of NdFeB alloy was mixed with 100 mL of $H_3PO_4$-acidified $K_2Cr_2O_7$ solution (0.10M) for one hour and the alloy was then decanted and dried under nitrogen at 60° C. and in vacuo at 110° C. A mixture of 19.2 parts of a bisphenol A-epichlorohydrin resin (e.g., Shell Epon 828, Dow DER 33 or similar epoxy resin), 38.5 parts [3-(glycidyloxy)propyl]trimethoxysilane and 42.3 parts [3-(amino)propyl]-trimethoxysilane was dissolved in aqueous methanol to provide a 4.8 percent solution. 500 grams of the dichromate treated NdFeB magnet alloy was mixed with 210 grams of the solution and blended for 72 hours. The sample was decanted and the treated magnet powder was dried under nitrogen and in vacuo. Two hundred and fifty milliliters of a 0.10M solution of 1-octadecanol (in ethanol) were added to the coated powder and blended for one hour. The slurry was then filtered and dried as above. The treated powder was then incorporated into a binder by milling (Milling procedure A). The remaining 500 grams of untreated powder was similarly milled into another portion of the same binder.

EXAMPLE 24

A kilogram of NdFeB alloy powder was divided into 2 equal portions. One portion (500 grams) of NdFeB alloy was mixed with 100 mL of $H_3PO_4$-acidified $K_2Cr_2O_7$ solution (0.10M) for one hour and the alloy was then decanted and dried under nitrogen at 60° C. and in vacuo at 110° C. A mixture of 19.2 parts of a bisphenol A-epichlorohydrin resin (e.g., Shell Epon 828, Dow DER 331 or similar epoxy resin), 38.5 parts [3-(glycidyloxy)propyl]trimethoxysilane and 42.3 parts [3-(amino)propyl]-trimethoxysilane was dissolved in aqueous methanol to provide a 4.8 percent solution. 500 grams of the dichromate treated NdFeB magnet alloy was mixed with 210 grams of the solution and blended for 72 hours. The sample was decanted and the treated magnet powder was dried under nitrogen and in vacuo. Two hundred and fifty milliliters of a 0.10M solution of distearyl phosphate (in water) were added to the coated powder and blended for one hour. The slurry was then filtered and dried as above. The treated powder was then incorporated into a binder by milling (Milling procedure A). The remaining 500 grams of untreated powder was similarly milled into another portion of the same binder.

EXAMPLE 25

A kilogram of NdFeB alloy powder was divided into 2 equal portions. A mixture of 19.2 parts of a bisphenol A-epichlorohydrin resin (e.g., Shell Epon 828, Dow DER 331 or similar epoxy resin), 38.5 parts [3-(glycidyloxy)propyl]trimethoxysilane and 42.3 parts [3-(amino)propyl]trimethoxysilane was dissolved in aqueous methanol to provide a 4.8 percent solution. 500 grams of the dichromate treated NdFeB magnet alloy was mixed with 210 grams of the solution and blended for 72 hours. The sample was decanted and the treated magnet powder was dried under nitrogen and in vacuo. Two hundred and fifty milliliters of a 0.10M solution of 1-octadeconal (in ethanol) were added to the coated powder and blended for one hour. The slurry was then filtered and dried as above. The treated powder was then incorporated into a binder by milling (Milling procedure A). The remaining 500 grams of untreated powder was similarly milled into another portion of the same binder.

EXAMPLE 26

A kilogram of NdFeB alloy powder was divided into 2 equal portions. 500 grams of NdFeB alloy was mixed with 100 mL of $H_3PO_4$-acidified $K_2Cr_2O_7$ solution (0.10M) for one hour and the alloy was then decanted and dried under nitrogen at 60° C. and in vacuo at 110° C. A mixture of 19.2 parts of a bisphenol A-epichlorohydrin resin (e.g., Shell Epon 828, Dow DER 331 or similar epoxy resin), 38.5 parts [3-(glycidyloxy)-propyl]trimethoxysilane and 42.3 parts [3-(amino)-propyl]trimethoxysilane was dissolved in aqueous methanol to provide a 4.8 percent solution. 500 grams of the dichromate treated NdFeB magnet alloy was mixed with 210 grams of the solution and blended for 72 hours. The sample was decanted and the treated magnet powder was dried under nitrogen and in vacuo. The treated powder was then incorporated into a binder containing 5 phr distearyl pentaerythritol diphosphite by milling procedure B. The remaining 500 grams of untreated powder was similarly milled into a binder without any additives.

EXAMPLE 27

A kilogram of NdFeB alloy powder was divided into 2 equal portions. 500 grams of NdFeB alloy was mixed with 100 mL of $H_3PO_4$-acidified $K_2Cr_2O_7$ solution (0.10M) for one hour and the alloy was then decanted and dried under nitrogen at 60° C. and in vacuo at 110° C. A mixture of 19.2 parts of a bisphenol A-epichlorohydrin resin (e.g., Shell Epon 828, Dow DER 331 or similar epoxy resin), 38.5 parts [3-(glycidyloxy)propyl]trimethoxysilane and 42.3 parts [3-(amino)propyl]trimethoxysilane was dissolved in aqueous methanol to provide a 4.8 percent solution. 500 grams of the dichromate treated NdFeB magnet alloy was mixed with 210 grams of the solution and blended for 72 hours. The sample was decanted and the treated magnet powder was dried under nitrogen and in vacuo. Seventy-five grams of toluene containing 5 grams of distearyl pentaerythritol diphosphite was added to the coated powder and blended for one hour. The slurry was then filtered and dried as above. The treated powder was then incorporated into a binder containing 5 phr of distearyl pentaerythritol diphosphite by milling procedure B. The remaining 500 grams of untreated powder was similarly milled into a binder without any additives.

EXAMPLE 28

A kilogram of NdFeB alloy powder was divided into 2 equal portions. One portion of uncoated NdFeB alloy powder was incorporated into a binder containing 5 phr of the reaction product of distearyl phosphate and laurylamine by milling procedure B. The remaining 500 grams of untreated powder was similarly milled into a binder without any additives.

EXAMPLE 29

A kilogram of NdFeB alloy powder was divided into 2 equal portions. One portion of uncoated NdFeB alloy powder was incorporated into a binder containing 4 phr of 1-dodecanol by milling procedure B. The remaining 500 grams of untreated powder was similarly milled into a binder without any additives.

EXAMPLE 30

A kilogram of NdFeB alloy powder was divided into 2 equal portions. One portion of uncoated NdFeB alloy powder was incorporated into a binder containing 5 phr of 1-octadecanol by milling procedure B. The remaining 500 grams of untreated powder was similarly milled into a binder without any additives.

EXAMPLE 31

A kilogram of NdFeB alloy powder was divided into 2 equal portions. One portion of uncoated NdFeB alloy powder was incorporated into a binder containing 2.5 phr of stearic acid by milling procedure B. The remaining 500 grams of untreated powder was similarly milled into a binder without any additives.

EXAMPLE 32

A kilogram of NdFeB alloy powder was divided into 2 equal portions. One portion of uncoated NdFeB alloy powder was incorporated into a binder containing 5 phr of distearyl pentaerythritol diphosphite by milling procedure B. The remaining 500 grams of untreated powder was similarly milled into a binder without any additives.

EXAMPLE 33

A kilogram of NdFeB alloy powder was divided into 2 equal portions. One portion of uncoated NdFeB alloy powder was incorporated into a binder containing 2.5 phr of distearyl pentaerythritol diphosphite by milling procedure B. The remaining 500 grams of untreated powder was similarly milled into a binder without any additives.

EXAMPLES 34–40

A kilogram of NdFeB alloy powder was divided into 2 equal portions. A mixture of 19.2 parts of a bisphenol A-epichlorohydrin resin (e.g., Shell Epon 828, Dow DER 331 or similar epoxy resin), 38.5 parts [3-(glycidyloxy)propyl]trimethoxysilane and 42.3 parts [3-(amino)propyl]trimethoxysilane was dissolved in aqueous methanol to provide a 4.8 percent solution. 500 grams of the dichromate treated NdFeB magnet alloy was mixed with 210 grams of the solution and blended for 72 hours. The sample was decanted and the treated magnet powder was dried under nitrogen and in vacuo. The treated powder was then incorporated into a binder by milling procedure B. The remaining 500 grams of untreated powder was similarly milled into a binder without any additives.

EXAMPLES 41–46

A kilogram of NdFeB alloy powder was divided into 2 equal portions. 500 grams of NdFeB alloy was mixed with 100 mL of $H_3PO_4$-acidified $K_2Cr_2O_7$ solution (0.10M) for one hour and the alloy was then decanted and dried under nitrogen at 60° C. and in vacuo at 110° C. A mixture of 19.2 parts of a bisphenol A-epichlorohydrin resin (e.g., Shell Epon 828, Dow DER 331 or similar epoxy resin), 38.5 parts [3-(glycidyloxy)propyl]trimethoxysilane and 42.3 parts [3-(amino)propyl]trimethoxysilane was dissolved in aqueous methanol to provide a 4.8 percent solution. 500 grams of the dichromate treated NdFeB magnet alloy was mixed with 210 grams of the solution and blended for 72 hours. The sample was decanted and the treated magnet powder was dried under nitrogen and in vacuo. Seventy-five grams of toluene containing 5 grams of distearyl pentaerythritol diphosphite was added to the coated powder and blended for one hour. The slurry was then filtered and dried as above. The treated powder was then incorporated into a binder containing 5 phr of distearyl pentaerythritol diphosphite by milling procedure B. The remaining 500 grams of untreated powder was similarly milled into a binder without any additives.

EXAMPLES 47–53

A kilogram of NdFeB alloy powder was divided into 2 equal portions. 500 grams of NdFeB alloy was mixed with 100 mL of $H_3PO_4$-acidified $K_2Cr_2O_7$ solution (0.10M) for one hour and the alloy was then decanted and dried under nitrogen at 60° C. and in vacuo at 110° C. A mixture of 19.2 parts of a bisphenol A-epichlorohydrin resin (e.g., Shell Epon 828, Dow DER 331 or similar epoxy resin), 38.5 parts [3-(glycidyloxy)propyl]trimethoxysilane and 42.3 parts [3-(amino)propyl]trimethoxysilane was dissolved in aqueous methanol to provide a 4.8 percent solution. 500 grams of the dichromate treated NdFeB magnet alloy was mixed with 210 grams of the solution and blended for 72 hours. The sample was decanted and the treated magnet powder was dried under nitrogen and in vacuo. Seventy-five grams of toluene containing 5 grams of distearyl pentaerythritol diphosphite was added to the coated powder and blended for one hour. The slurry was then filtered and dried as above. The treated powder was then incorporated into a binder containing 5 phr of distearyl pentaerythritol diphosphite by milling procedure B. The remaining 500 grams of untreated powder was similarly milled into a binder without any additives.

EXAMPLE 54

A kilogram of NdFeB alloy powder was divided into 2 equal portions. 500 grams of NdFeB alloy was mixed with 100 mL of $H_3PO_4$-acidified $K_2Cr_2O_7$ solution (0.10M) for one hour and the alloy was then decanted and dried under nitrogen at 60° C. and in vacuo at 110° C. A mixture of 19.2 parts of a bisphenol A-epichlorohydrin resin (e.g., Shell Epon 828, Dow DER 331 or similar epoxy resin), 38.5 parts [3-(glycidyloxy)propyl]trimethoxysilane and 42.3 parts [3-(amino)propyl]trimethoxysilane lane was dissolved in aqueous methanol to provide a 4.8 percent solution. 500 grams of the dichromate treated NdFeB magnet alloy was mixed with 210 grams of the solution and blended for 72 hours. The sample was decanted and the treated magnet powder was dried under nitrogen and in vacuo. Fifty grams of treated powder was then blended with 1.1 grams of binder (consisting of 10 parts of Epon 1031 and 0.5 parts of 2-ethyl-4-methylimidazole). Fifteen grams of the alloy-binder mixture was compressed in a 1" mold at 9,000 psi for one minute. The resulting compact was then cured in a forced-air oven for 1-½ hours at 150° C. Bonded magnet compacts were also prepared by the same method but using fifteen gram portions of the untreated and uncoated powder.

EXAMPLE 55

A kilogram of NdFeB alloy powder was divided into 2 equal portions. 500 grams of NdFeB alloy was mixed with 100 mL of $H_3PO_4$-acidified $K_2Cr_2O_7$ solution (0.10M) for one hour and the alloy was then decanted and dried under nitrogen at 60° C. and in vacuo at 110° C. A mixture of 19.2 parts of a bisphenol A-epichlorohydrin resin (e.g., Shell Epon 828, Dow DER 331 or similar epoxy resin), 38.5 parts [3-(glycidyloxy)propyl]trimethoxysilane and 42.3 parts [3-(amino)propyl]trimethoxysilane was dissolved in aqueous methanol to provide a 4.8 percent solution. 500 grams of the dichromate treated NdFeB magnet alloy was mixed with 210 grams of the solution and blended for 72 hours. The sample was decanted and the treated magnet powder was dried under nitrogen and in vacuo. Seventy-five grams of toluene containing 5 grams of distearyl pentaerythritol diphosphite was added to the coated powder and blended for one hour. The slurry was then filtered and dried as above. Fifty grams of treated powder was then blended with 1.1 grams of binder (consisting of 10 parts of Epon 1031 and 0.5 parts of 2-ethyl-4-methylimidazole). Fifteen grams of the alloy-binder mixture was compressed in a 1" mold at 9,000 psi for one minute. The resulting compact was then cured in a forced-air oven for 1-½ hours at 150° C. Bonded magnet compacts were also prepared by the same method but using fifteen gram portions of the untreated and uncoated powder.

EXAMPLE 56

A kilogram of NdFeB alloy powder was divided into 2 equal portions. 500 grams of NdFeB alloy was mixed with 100 mL of $H_3PO_4$-acidified $K_2Cr_2O_7$ solution (0.10M) for one hour and the alloy was then decanted and dried under nitrogen at 60° C. and in vacuo at 110° C. A mixture of 19.2 parts of a bisphenol A-epichlorohydrin resin (e.g., Shell Epon 828, Dow DER 331 or similar epoxy resin), 38.5 parts [3-(glycidyloxy)propyl]trimethoxysilane and 42.3 parts [3-(amino)propyl]trimethoxysilane was dissolved in aqueous methanol to provide a 4.8 percent solution. 500 grams of the dichromate treated NdFeB magnet alloy was mixed with 210 grams of the solution and blended for 72 hours. The sample was decanted and the treated magnet powder was dried under nitrogen and in vacuo. The coated powder was then added to 100 mL of $H_3PO_4$ solution (0.10M) and mixed for ½ hour. The slurry was then filtered and dried as above. Fifty grams of treated powder was then blended with 1.1 grams of binder (consisting of 10 parts of Epon 1031 and 0.5 parts of 2-ethyl-4-methylimidazole). Fifteen grams of the alloy-binder mixture was compressed in a 1" mold at 9,000 psi for one minute. The resulting compact was then cured in a forced-air oven for 1-½ hours at 150° C. Bonded magnet compacts were also prepared by the same method but using fifteen gram portions of the untreated and uncoated powder.

EXAMPLE 57

500 grams of NdFeB alloy was mixed with 100 mL of $H_3PO_4$-acidified $K_2Cr_2O_7$ solution (0.10M) for 1 hour and the alloy was then decanted and dried under nitrogen at 60° C. and in vacuo at 110° C. A mixture of 19.2 parts of a bisphenol A-epichlorohydrin resin (e.g. Shell Epon 828, Dow DER 331 or similar epoxy resin), 38.5 parts [3-(glycidyloxy)propyl]trimethoxysilane and 42.3 parts [3-(amino)propyl]tri-ethoxysilane was dissolved in aqueous methanol to provide a 4.8 percent solution. 500 grams of the dichromate-treated NdFeB magnet alloy was mixed with 210 grams of the solution and blended for 72 hours. The sample was decanted and the coated magnet powder was dried under nitrogen and in vacuo. The 100 grams of the coated powder was further treated in a plasma reactor (International Plasma Corporation, Series 2000 Plasma Processing Reactor Center). The powder was exposed to an argon plasma for 20 minutes (500 watts, 100 standard $cm^3$/min) and then removed from the reactor. A 0.75 gram aliquots of a 0.086M NaCl solution was added to two samples of the coated alloy (2.5 grams each), with and without plasma treatment, and the samples were dried in vacuo at 110° C. The samples were then placed into a closed chamber containing saturated solutions of $(NH_4)_2SO_4$. After 500 hours, neither sample exhibited any gain in weight. After 1000 hours, the coated sample without plasma treatment had gained 0.79 percent in weight while the sample which was coated and plasma-treated did not show any signs of corrosion or weight gain. After 3,500 hours, the coated sample which was plasma-treated still had not shown any weight gain, while the coated sample without plasma treatment had increased 3.20 percent in weight. By comparison, an uncoated and untreated sample gained 3.57 percent after only 27 hours exposure to the same NaCl solution and 24.60 percent after 383.5 hours.

MILLING PROCEDURE A

An elastomer such as Zetpol 1020 is banded on a 4" mill while maintaining a temperature of approximately 38° C. The magnet powder is added gradually until a good blend is achieved. Milling is continued, allowing for a slight temperature increase of the sample due to shear, for a total of 11 minutes. The milled sample is then removed, cut to size (for a 0.200"×3.0"×6.0" mold), and allowed to cool. The cut samples are then placed into mold.

MILLING PROCEDURE B

An elastomer such as Zetpol 1020 is banded on a 6" mill while maintaining a temperature of approximately 38° C. Each component is added gradually to allow for good mixing. After all additives have been milled into the binder, the mill temperature is allowed to rise to approximately 143° C. and the same is cut and blended for a good mix. The mill is cooled back to approximately 38-40° C. and the sample is sheeted off. A portion of the binder is banded on a 4" mill, again maintaining a temperature of approximately 38° C. The magnet powder is added gradually until a good blend is achieved. Milling is continued, allowing for a slight temperature increase of the same due to shear, for a total of 11 minutes. The milled sample is then removed, cut to size (for a 0.200"×3.0"×6.0" mold), and allowed to cool. The cut samples are then placed into mold.

Examples 20-56 were tested and the results are set forth in Table I. The test procedure for air aging involved preparing ½ inch diameter disks from the 3"×3"×0.2" plaques and aging the same in a circulating air oven in 10-cc beakers for the time and temperatures indicted. All temperatures are degrees Celsius. Generally, about 25 disks were aged for each composition. Several of such disks were retained as unaged controls in a sealed vial. With regard to the remaining disks, weight gain for each disk was measured. The aged disks were also measured with regard to their magnetic properties.

The test procedure for the salt test utilized three disks. The disks were initially weighed. They were subsequently immersed in a 5 percent by weight sodium chloride solution for ten minutes. The disks were then dried with paper towel and inserted into a 30-cc beaker. The disks were then placed in a humidity chamber at 81 percent absolute humidity at 72° F. The humidity was maintained by a saturated $(NH_4)_2SO_4$ solution. The disks were then removed at the indicated time. Samples were dried utilizing a vacuum and the weight gain recorded.

In the following examples, the code numbers for the additives are as follows. The coating code also follows and refers to the coating as prepared in the corresponding examples.

| Additives (phr) | Coatings |
|---|---|
| 1  5.0 phr Weston 618 (distearyl pentaerythritol disphospite) | Coating A = Ex 1 |
| 2  5 phr (laurylamine distearyl phosphate) | Coating B = Ex 26 |
| 3  4 phr 1-dodecanol | Coating C = Ex 21 |
| 4  5 phr 1-octadecanol | Coating D = Ex 56 |
| 5  2.5 phr stearic acid | Coating E = Ex 22 |
| 6  2.5 phr Weston 618 | Coating F = Ex 23 |
| 7  3 phr Hytrel 630HS | Coating G = Ex 24 |
| 8  4 phr Hytrel 10MS | Caoting H = Ex 25 |
| 9  1 phr NBC bis[dibutyl dithiocarbamate] nickel (II) | |
| 10  1 phr Cyanol 425 | |

-continued

| Additives (phr) | Coatings |
|---|---|
| 11  0.2 phr Weston 619[1] + 0.2 phr Ultranol 276[2] + 0.3 phr Ultranol 626[3] + 0.3 phr Irganox 1010[4] + 1 phr AC617A[5] | |
| 12  1 phr Cyanox 425[6] + 1 phr NBC + 2 phr Struktol WB16[7] + 1 phr AC617A | |
| 13  5 phr 2-ethyl-4-methyl imidazole | |

[1]Weston 619: Weston 618 + ~1% wt. triisopropanol amine
[2]Ultranox 276: Octadecyl 3-(3,5-di-t-butyl-4 hydroxyphenyl) propionate
[3]Ultranox 626: Bis(2,4-di-t-butylphenyl) pentaerythritol diphosphite
[4]Irganox 1010: Tetrakis [methylene (3,5-di-tert-butyl-4-hydroxy-hydrocinnamate)] methane
[5]AC617A: powdered low molecular weight polyethylene (a processing lubricant)
[6]Cyanox 425:

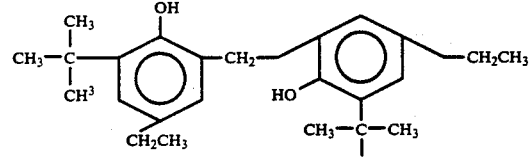

[7]WB16: A mixture of fatty acid soaps, predominantly Ca.

The polymer code is as follows:

Zetpol 1020 is an acrylonitrile rubber manufactured by Nippon Zeon, and has an acrylonitrile content of approximately 44 percent by weight and a Mooney viscosity of approximately 75.

Estane 5707 is a thermoplastic polyester urethane manufactured by The BFGoodrich Company and has a glass transition temperature of approximately 20° C.

Hytrel 4056 is a thermoplastic polyester elastomer manufactured by Du Pont and has a glass transition temperature of approximately −70° C.

Hycar 1000x132 is a nitrile rubber manufactured by The BFGoodrich Company and has an acrylonitrile content of approximately 51 percent by weight, and a Mooney viscosity of approximately 55.

Hypalon 45 is a chlorosulfonated polyethylene manufactured by DuPont containing about 24 percent by weight of chlorine therein.

Royaltherm 1411 is a silicone grafted EPDM manufactured by Uniroyal and has a Mooney viscosity of approximately 35, whereas Royaltherm 1711 has a Mooney viscosity of approximately 80.

Nordel 6077 is an EPDM manufactured by DuPont and has a glass transition temperature of approximately −50° F.

Barex 210 is a 1,3-Butadiene polymer with methyl 2-propenoate and 2-propenenitrile graft.

Hycar 4001 is an acrylic ester copolymer manufactured by The BFGoodrich Company and has a Mooney viscosity of from about 40 to about 60.

Hydrin 400 is a polyepichlorohydrin manufactured by The BFGoodrich Company and has a Mooney viscosity of from about 55 to about 90.

Rilsan BMNOP 40TL is a plasticized nylon 11 manufactured by Atochem, Inc.

Epon 1031 is an aromatic tetraglycidyl ether of tetraphenol ethane manufactured by Shell Chemical Company.

TABLE I

| | | | (Absolute Weight Gain) | | | | | Salt Test | (Magnetic Data) | | | | | |
|---|---|---|---|---|---|---|---|---|---|---|---|---|---|---|
| | | | 1000 hrs. | | 2000 hrs. | | | 1000 hrs. | | | | | | |
| | | | | | | | | | | | | 1000 hrs/125° | | |
| Example | Polymer | Powder | 70° | 100° | 125° | 70° | 100° | | Br | % Diff. | HC | % Diff. | Hci | % Diff. |
| 20 | Zetpol 1020 | H₂Cr₂O₇ | 0.572 | 0.962 | 1.033 | 0.683 | 1.036 | 0.336 | 4486 | −7.27 | 2310 | −19.78 | 6322 | −43.88 |
| | Zetpol 1020 | uncoated | 0.554 | 1.047 | 1.107 | 0.725 | 1.111 | 0.324 | 4561 | −1.26 | 2343 | −16.54 | 6263 | −45.24 |
| 21 | Zetpol 1020 | Coating C | 0.019 | −0.131 | −0.111 | 0.019 | −0.166 | 0.474 | 4318 | −0.32 | 2570 | −5.76 | 10477 | −12.62 |
| | Zetpol 1020 | uncoated | 0.326 | 0.664 | 0.801 | 0.531 | 0.901 | 0.495 | 4942 | −3.57 | 2572 | −15.45 | 6892 | −36.67 |
| 22 | Zetpol 1020 | Coating E | 0.048 | 0.245 | 0.187 | 0.079 | 0.226 | 0.214 | 4214 | −8.07 | 2474 | −13.07 | 10032 | −16.02 |
| | Zetpol 1020 | uncoated | 0.326 | 0.664 | 0.801 | 0.531 | 0.901 | 0.495 | 4942 | −3.57 | 2572 | −15.45 | 6892 | −36.67 |
| 23 | Zetpol 1020 | Coating F | −0.078 | −1.403 | −1.340 | −0.170 | −1.370 | 0.337 | 3760 | −6.20 | 2285 | −10.81 | 10304 | −13.85 |
| | Zetpol 1020 | uncoated | 0.326 | 0.664 | 0.801 | 0.531 | 0.901 | 0.495 | 4942 | −3.57 | 2572 | −15.45 | 6892 | −36.67 |
| 24 | Zetpol 1020 | Coating G | 0.030 | 0.044 | 0.074 | 0.067 | 0.004 | 0.227 | 3982 | −4.35 | 2410 | −8.22 | 10570 | −10.05 |
| | Zetpol 1020 | uncoated | 0.326 | 0.664 | 0.801 | 0.531 | 0.901 | 0.495 | 4942 | −3.57 | 2572 | −15.45 | 6892 | −36.67 |
| 25 | Zetpol 1020 | Coating H | −0.123 | −2.771 | −2.063 | −0.274 | −2.934 | 0.329 | 3553 | −2.74 | 2156 | −6.95 | 9633 | −11.18 |
| | Zetpol 1020 | uncoated | 0.326 | 0.664 | 0.801 | 0.531 | 0.901 | 0.495 | 4942 | −3.57 | 2572 | −15.45 | 6892 | −36.67 |
| 26 | Zetpol 1020¹ | Coating B | 0.140 | 0.363 | 0.410 | 0.121 | 0.340 | 1.654 | 4552 | −6.61 | 2607 | −13.65 | 10480 | −15.97 |
| | Zetpol 1020¹ | uncoated | 0.554 | 1.047 | 1.107 | 0.725 | 1.111 | 0.324 | 4650 | −2.86 | 2354 | −17.43 | 6103 | −44.20 |
| 27 | Zetpol 1020¹ | Coating C | 0.168 | 0.388 | 0.438 | 0.206 | 0.434 | 1.568 | 4438 | −1.92 | 2418 | −13.13 | 8490 | −28.78 |
| | Zetpol 1020¹ | uncoated | 0.554 | 1.047 | 1.107 | 0.725 | 1.111 | 0.324 | 4650 | −2.86 | 2354 | −17.43 | 6103 | −44.20 |
| 28 | Zetpol 1020² | uncoated | 0.265 | 0.599 | 0.660 | 0.321 | 0.611 | 0.729 | 4568 | −4.33 | 2536 | −15.21 | 8810 | −29.20 |
| | Zetpol 1020 | uncoated | 0.554 | 1.047 | 1.107 | 0.725 | 1.111 | 0.324 | 4650 | −2.86 | 2354 | −17.43 | 6103 | −44.20 |
| 29 | Zetpol 1020³ | uncoated | 0.106 | 0.305 | 0.475 | 0.231 | 0.579 | 0.401 | 4814 | −5.03 | 2594 | −14.64 | 7976 | −27.42 |
| | Zetpol 1020 | uncoated | 0.326 | 0.664 | 0.801 | 0.531 | 0.901 | 0.495 | 4942 | −3.57 | 2572 | −15.45 | 6892 | −36.67 |
| 30 | Zetpol 1020⁴ | uncoated | 0.070 | 0.242 | 0.304 | 0.213 | 0.325 | 0.332 | 4851 | −5.31 | 2715 | −13.00 | 9201 | −20.51 |
| | Zetpol 1020 | uncoated | 0.326 | 0.664 | 0.801 | 0.531 | 0.901 | 0.495 | 4942 | −3.57 | 2572 | −15.45 | 6892 | −36.67 |
| 31 | Zetpol 1020⁵ | uncoated | 0.185 | 0.353 | 0.494 | 0.432 | 0.571 | 0.637 | 4845 | −3.14 | 2672 | −12.36 | 8309 | −26.60 |
| | Zetpol 1020 | uncoated | 0.307 | 0.494 | 0.694 | 0.527 | 0.806 | 0.566 | 4832 | −4.94 | 2586 | −16.03 | 7030 | −37.00 |
| 32 | Zetpol 1020¹ | uncoated | 0.157 | 0.244 | 0.391 | 0.228 | 0.442 | 1.208 | 4933 | −2.24 | 2731 | −11.22 | 8372 | −25.55 |
| | Zetpol 1020 | uncoated | 0.384 | 0.636 | 0.768 | 0.621 | 0.930 | 0.477 | 4818 | −4.80 | 2478 | −17.64 | 6061 | −43.60 |
| 33 | Zetpol 1020³ | uncoated | 0.316 | 0.519 | 0.125 | 0.471 | 0.552 | 0.855 | 4266 | −5.03 | 2223 | −15.95 | 7999 | −31.77 |
| | Estane 5707⁶ | uncoated | 0.238 | 0.500 | 0.206 | 0.458 | 0.624 | 0.750 | 4689 | 0.73 | 2341 | −13.49 | 7327 | −37.67 |
| 34 | Estane 5707 | Coating A | −0.055 | −0.054 | 0.051 | −0.064 | −0.017 | 1.557 | 3678 | −2.29 | 2431 | −4.71 | 12043 | −3.57 |
| | Hytrel 4056⁷,⁸ | uncoated | −0.047 | −0.024 | 0.049 | −0.018 | −0.006 | 2.813 | 3399 | −7.82 | 2268 | −9.17 | 11909 | −3.59 |
| 35 | Hytrel 4056⁷,⁸ | Coating A | −0.088 | −0.132 | 0.250 | −0.144 | −0.142 | 1.330 | 3603 | −3.47 | 2377 | −5.86 | 11859 | −5.55 |
| | Hycar 1000X132⁹,¹⁰ | uncoated | −0.117 | −0.183 | 0.204 | −0.179 | −0.101 | 2.080 | 3429 | −5.72 | 2301 | −8.05 | 12186 | −1.11 |
| 36 | Hycar 1000X132⁹,¹⁰ | Coating A | −0.038 | −0.030 | −1.500 | −0.022 | −0.022 | 0.796 | 3433 | −7.36 | 2341 | −10.80 | 12404 | −1.59 |
| | Hypalon 45 | uncoated | −0.019 | −0.385 | −1.980 | −0.218 | −0.872 | 1.070 | 2868 | −10.90 | powder | powder | powder | powder |
| 37 | Hypalon 45 | Coating A | −0.027 | −0.064 | −0.089 | −0.072 | −0.075 | 1.318 | 3659 | −2.11 | 2451 | −3.50 | 12170 | −1.19 |
| | Royaltherm 1411/1711¹¹ (50.0:50.0) | | | | | | | | | | | | | |
| | Royaltherm 1411/1711¹¹ (50.0:50.0) | uncoated | −0.041 | −0.044 | 0.054 | −0.035 | −0.052 | 3.413 | 3436 | −14.90 | 2308 | −15.50 | 11960 | −4.40 |
| 38 | Nordel 607¹¹ | Coating A | −0.006 | 0.006 | −0.891 | −0.023 | −0.005 | 1.178 | 3881 | 3.36 | 2591 | 2.01 | 12459 | 1.35 |
| | Nordel 607¹¹ | uncoated | 0.018 | 0.033 | −0.763 | 0.006 | 0.017 | 1.577 | 3281 | −19.20 | 2238 | −17.50 | 12194 | −3.44 |
| 39 | Estane 5707 | Coating A | −0.099 | −0.115 | −0.641 | −0.118 | −0.092 | 0.623 | 3329 | −5.72 | 2197 | −6.47 | 11279 | −5.55 |
| | Estane 5707 | uncoated | −0.041 | −0.012 | −0.653 | −0.030 | 0.037 | 1.329 | 3292 | −16.30 | 2129 | −19.08 | 10404 | −15.85 |
| 40 | Barex 210¹²/Hycar 1000X132¹² (20.0:80.0) | Coating A | 0.198 | 0.509 | 0.914 | 0.460 | 1.008 | 0.649 | 4485 | −3.57 | 2291 | −16.78 | 6293 | −41.73 |
| | Barex 210¹²/Hycar 1000X132¹² (20.0:80.0) | uncoated | 0.351 | 0.756 | 1.407 | 0.715 | 1.015 | 0.641 | 4481 | −12.89 | 2175 | −28.71 | 5647 | −51.81 |
| 41 | Estane 5707¹ | Coating C | 0.201 | 0.197 | −0.218 | 0.294 | 0.341 | 0.782 | 4515 | −2.40 | 2506 | −7.08 | 10052 | −15.61 |
| | Estane 5707¹ | uncoated | 0.316 | 0.519 | 0.125 | 0.471 | 0.552 | 0.855 | 4266 | −6.04 | 2223 | −15.95 | 7999 | −31.77 |

TABLE I-continued

| | | | (Absolute Weight Gain) | | | | | | | Salt Test | | | | (Magnetic Data) | | | |
|---|---|---|---|---|---|---|---|---|---|---|---|---|---|---|---|---|---|
| | | | 1000 hrs. | | | 2000 hrs. | | | | | | | | | | | |
| Example | Polymer | Powder | 70° | 100° | 125° | 70° | 100° | 1000 hrs. | Br | % Diff. | HC | % Diff. | Hci | % Diff. |
| 42 | Hycar 4001[1] | Coating C | −0.359 | −0.752 | −0.683 | −0.369 | −0.713 | 0.450 | 4333 | −3.78 | 2590 | −4.67 | 11944 | −0.84 |
| | Hycar 4001[1] | uncoated | −0.029 | −0.118 | −0.859 | 0.022 | −0.645 | 1.391 | 4417 | −7.56 | 2578 | −9.67 | 11789 | −0.94 |
| 43 | Hydrin 400[1] | Coating C | −0.224 | −0.604 | −0.832 | −0.213 | −0.542 | 27.355 | 4485 | 1.49 | 2644 | 0.15 | 11877 | −0.55 |
| | Hydrin 400[1] | uncoated | −0.114 | −1.609 | −3.567 | −0.565 | −1.525 | 40.421 | powder | powder | powder | powder | powder | powder |
| 44 | Nordel 6077[1] | Coating C | −0.151 | −0.801 | −0.509 | −0.154 | −0.676 | 0.740 | 4578 | −1.25 | 2719 | −2.47 | 12043 | −0.29 |
| | Nordel 6077[1] | uncoated | 0.036 | −0.375 | −0.431 | 0.162 | −0.456 | 2.657 | 4452 | −12.03 | 2657 | −12.25 | 11970 | −0.43 |
| 45 | Rilsan BMNOP40TL[1] | Coating C | −0.167 | −0.683 | −0.749 | −0.298 | −0.667 | 0.535 | 4717 | 0.60 | 2762 | −0.65 | 12011 | 0.10 |
| | Rilsan BMNOP40TL[1] | uncoated | −0.064 | −0.272 | −0.177 | −0.067 | −0.217 | 0.832 | 4968 | −2.68 | 2778 | −605 | 11440 | −4.31 |
| 46 | Hycar 4001/Hydrin 400[1] (46.9:53.1) | Coating C | −0.243 | −0.560 | −0.554 | −0.258 | −0.511 | 16.863 | 4505 | −2.04 | 2621 | −4.10 | 11620 | −2.36 |
| | Hycar 4001/Hydrin 400[1] (46.9:53.1) | uncoated | −0.180 | −2.194 | −1.805 | −0.525 | −0.248 | 34.671 | 4232 | −10.79 | 2498 | −11.89 | 11841 | −0.84 |
| 47 | Estane 5707[1] | Coating C | 0.201 | 0.197 | −0.218 | 0.294 | 0.341 | 0.782 | 4515 | −2.40 | 2506 | −7.08 | 10052 | −15.61 |
| | Estane 5707 | uncoated | 0.238 | 0.500 | 0.206 | 0.458 | 0.624 | 0.750 | 4689 | 0.73 | 2341 | −13.49 | 7327 | −37.67 |
| 48 | Hydrin 400[1] | Coating C | −0.224 | −0.604 | −0.832 | −0.213 | −0.542 | 27.355 | | | | | | |
| | Hydrin 400 | uncoated | NS | NS | NS | NS | NS | 40.421 | | | | | | |
| 49 | Nordel 6077[1] | Coating C | −0.151 | −0.801 | −0.509 | −0.154 | −0.676 | 0.740 | | | | | | |
| | Nordel 6077 | uncoated | 0.512 | −0.222 | 0.191 | −0.010 | −0.093 | 0.765 | | | | | | |
| 50 | Rilsan BMNOP40TL[1] | Coating C | −0.167 | −0.683 | −0.749 | −0.298 | −0.667 | 0.535 | | | | | | |
| | Rilsan BMNOP40TL | uncoated | −0.044 | −0.222 | −0.172 | −0.061 | −0.131 | 1.363 | | | | | | |
| 51 | Hycar 4000[1]/Hydrin 400[1] (46.9:53.1) | Coating C | −0.243 | −0.560 | −0.554 | −0.258 | −0.511 | 16.863 | | | | | | |
| | Hycar 4000[1]/Hydrin 400[1] (46.9:53.1) | uncoated | 0.012 | −0.084 | −0.419 | 0.063 | −0.006 | 22.697 | | | | | | |
| 52 | Zetpol 1020[1] | Coating C | −0.256 | −0.624 | −0.493 | −0.350 | −0.599 | 0.644 | | | | | | |
| | Zetpol 1020[1] | uncoated | 0.077 | 0.133 | 0.385 | 0.092 | 0.165 | 0.731 | | | | | | |
| 53 | Zetpol 1020[1] | Coating C | −0.256 | −0.624 | −0.493 | −0.350 | −0.599 | 0.644 | | | | | | |
| | Zetpol 1020[1] | uncoated | 0.472 | 0.832 | 1.252 | 0.704 | 1.055 | 0.803 | | | | | | |

| | | | | | | | | | | | 2000 hrs 100° | | | |
|---|---|---|---|---|---|---|---|---|---|---|---|---|---|---|
| 26 | Zetpol 1020 | Coating B | | | | | | | 4552 | −6.60 | 2645 | −12.41 | 11094 | −11.05 |
| | Zetpol 1020[1] | uncoated | | | | | | | 4596 | −3.99 | 2352 | −17.50 | 6556 | −40.06 |
| 27 | Zetpol 1020[1] | Coating C | | | | | | | 4614 | 1.97 | 2528 | −9.15 | 9443 | −20.79 |
| | Zetpol 1020 | uncoated | | | | | | | 4596 | −3.99 | 2352 | −17.50 | 6556 | −40.06 |
| 28 | Zetpol 1020[2] | Coating C | | | | | | | 4661 | −2.39 | 2626 | −12.21 | 9874 | −20.65 |
| | Zetpol 1020 | uncoated | | | | | | | 4596 | −3.99 | 2352 | −17.50 | 6556 | −40.06 |
| 29 | Zetpol 1020[3] | Coating C | | | | | | | 4596 | −5.45 | 2555 | −15.94 | 8061 | −26.65 |
| | Zetpol 1020 | uncoated | | | | | | | 4793 | −5.82 | 2431 | −18.09 | 8470 | −26.70 |
| 30 | Zetpol 1020[4] | Coating C | | | | | | | 4851 | | | | | |
| | Zetpol 1020 | uncoated | | | | | | | — | — | — | — | — | — |
| 31 | Zetpol 1020[5] | Coating C | | | | | | | 4793 | −4.18 | 2662 | −12.70 | 8958 | −20.80 |
| | Zetpol 1020 | uncoated | | | | | | | 4633 | −8.85 | 2500 | −18.83 | 7658 | −31.30 |
| 32 | Zetpol 1020[1] | Coating C | | | | | | | 4883 | −3.23 | 2725 | −11.41 | 9097 | −19.12 |
| | Zetpol 1020 | uncoated | | | | | | | 4865 | −3.87 | 2496 | −17.03 | 6752 | −37.20 |
| 33 | Estane 5707[6] | Coating C | | | | | | | — | — | — | — | — | — |
| | Estane 5707 | uncoated | | | | | | | — | — | — | — | — | — |
| 34 | Hytrel 4056[7,8] | Coating A | | | | | | | 3759 | −0.12 | 2532 | −0.79 | 12375 | −0.91 |
| | Hytrel 4056[7,8] | uncoated | | | | | | | 3680 | −0.17 | 2484 | −0.51 | 12316 | −0.29 |
| 35 | Hycar 1000X1329[9,10] | Coating A | | | | | | | 3594 | −3.71 | 2433 | −3.67 | 12273 | −2.25 |
| | Hycar 1000X1329[9,10] | uncoated | | | | | | | 3508 | −5.23 | 2383 | −4.76 | 12287 | −0.30 |

TABLE I-continued

| | | (Absolute Weight Gain) | | | | | | Salt Test | | | | (Magnetic Data) | | | |
|---|---|---|---|---|---|---|---|---|---|---|---|---|---|---|---|
| | | 1000 hrs. | | 2000 hrs. | | 1000 hrs. | | | | | | | | | |
| Example | Polymer | Powder | 70° | 100° | 125° | 70° | 100° | | Br | % Diff. | HC | % Diff. | Hci | % Diff. |
| 36 | Hypalon 45 | Coating A | | | | | | | 3932 | 2.02 | 2667 | 1.64 | 12678 | 0.58 |
| | Hypalon 45 | uncoated | | | | | | | 2868 | −24.40 | 1998 | −22.10 | 12246 | −1.08 |
| 37 | Royalthem 1411/1711[11] (50.0:50.0) | Coating A | | | | | | | 3669 | −1.85 | 2485 | −2.17 | 12271 | −0.37 |
| | Royalthem 1411/1711[11] (50.0:50.0) | uncoated | | | | | | | 3722 | −7.78 | 2527 | −7.44 | 12400 | −0.88 |
| 38 | Nordel 6077[11] | Coating A | | | | | | | 4016 | 6.95 | 2709 | 6.65 | 12606 | 2.55 |
| | Nordel 6077[11] | uncoated | | | | | | | 3887 | −4.31 | 2633 | −2.91 | 12611 | −0.14 |
| 39 | Estane 5707 | Coating A | | | | | | | 3811 | 7.93 | 2543 | 8.26 | 11843 | 2.53 |
| | Estane 5707 | uncoated | | | | | | | 3357 | −14.65 | 2239 | −14.90 | 11316 | −8.48 |
| 40 | Barex 210[12]/Hycar 1000X132[12] (20.0:80.0) | Coating A | | | | | | | 4314 | −7.25 | 2240 | −18.63 | 6629 | −38.62 |
| | Barex 210[12]/Hycar 1000X132[12] (20.0:80.0) | uncoated | | | | | | | 4506 | −12.40 | 2333 | −23.53 | 7237 | −38.24 |
| 41 | Estane 5707[1] | Coating C | | | | | | | | | | | | |
| | Estane 5707[1] | uncoated | | | | | | | | | | | | |
| 42 | Hycar 4001[1] | Coating C | | | | | | | | | | | | |
| | Hycar 4001[1] | uncoated | | | | | | | | | | | | |
| 43 | Hydrin 400[1] | Coating C | | | | | | | | | | | | |
| | Hydrin 400[1] | uncoated | | | | | | | | | | | | |
| 44 | Nordel 6077[1] | Coating C | | | | | | | | | | | | |
| | Nordel 6077[1] | uncoated | | | | | | | | | | | | |
| 45 | Rilsan BMNOP40TL[1] | Coating C | | | | | | | | | | | | |
| | Rilsan BMNOP40TL[1] | uncoated | | | | | | | | | | | | |
| 46 | Hycar 4001/Hydrin 400[1] (46.9:53.1) | Coating C | | | | | | | | | | | | |
| | Hycar 4001/Hydrin 400[1] (46.9:53.1) | uncoated | | | | | | | | | | | | |
| 47 | Estane 5707[1] | Coating C | | | | | | 1000 hrs/Salt Exp. | | | | | | |
| | Estane 5707 | uncoated | | | | | | | | | | | | |
| 26 | Zetpol 1020[1] | Coating B | | | | | | | | | | | | |
| 27 | Zetpol 1020[1] | uncoated | | | | | | | | | | | | |
| | Zetpol 1020[1] | Coating C | | | | | | | | | | | | |
| 28 | Zetpol 1020[2] | uncoated | | | | | | | | | | | | |
| 29 | Zetpol 1020[3] | uncoated | | | | | | | | | | | | |
| 30 | Zetpol 1020[4] | uncoated | | | | | | | | | | | | |
| 31 | Zetpol 1020[5] | uncoated | | | | | | | | | | | | |
| 32 | Zetpol 1020[1] | uncoated | | | | | | | | | | | | |
| 33 | Estane 5707[6] | uncoated | | | | | | | 4177 | −8.00 | 2456 | −7.15 | 11566 | −1.35 |
| | Estane 5707 | uncoated | | | | | | | 4893 | 5.11 | 2820 | 4.21 | 11529 | −1.92 |
| 34 | Hytrel 4056[7,8] | Coating A | | | | | | | 3476 | −7.64 | 2367 | −7.23 | 11983 | −4.05 |
| | Hytrel 4056[7,8] | uncoated | | | | | | | 3153 | −14.48 | 2171 | −13.06 | 12058 | −2.38 |

TABLE I-continued

|  |  | (Absolute Weight Gain) | | | | | Salt Test | | | (Magnetic Data) | | | | | |
|---|---|---|---|---|---|---|---|---|---|---|---|---|---|---|---|
|  |  | 1000 hrs. | | 2000 hrs. | | | 1000 hrs. | | | | | | | | |
| Example | Polymer | 70° | 100° | 125° | 70° | 100° | 1000 hrs. | Br | % Diff. | HC | % Diff. | Hci | % Diff. | | |
| 35 | Hycar 1000X132[9,10] | | | | | | | Coating A | 3534 | −5.32 | 2415 | −4.36 | 12363 | −1.53 |
|  | Hycar 1000X132[9,10] | | | | | | | uncoated | 3388 | −8.48 | 2313 | −7.56 | 12097 | −1.84 |
| 36 | Hypalon 45 | | | | | | | Coating A | 3697 | −4.07 | 2528 | −3.66 | 12585 | −0.16 |
|  | Hypalon 45 | | | | | | | uncoated | 3371 | −11.10 | 2276 | −11.20 | 11934 | −3.60 |
| 37 | Royaltherm 1411/1711[11] (50.0:50.0) | | | | | | | Coating A | 3665 | −1.95 | 2491 | −1.93 | 12441 | 0.01 |
|  | Royaltherm 1411/1711[11] (50.0:50.0) | | | | | | | uncoated | 3278 | −18.80 | 2446 | −17.70 | 11887 | −4.98 |
| 38 | Nordel 6077[11] | | | | | | | Coating A | 3659 | −2.56 | 2500 | −1.57 | 12417 | 1.01 |
|  | Nordel 6077[11] | | | | | | | uncoated | 3540 | −12.85 | 2431 | −10.40 | 12480 | −1.18 |
| 39 | Estane 5707 | | | | | | | Coating A | 3615 | 2.38 | 2416 | 2.85 | 11598 | 0.41 |
|  | Estane 5707 | | | | | | | uncoated | 3433 | −12.71 | 2299 | −12.62 | 11350 | −8.20 |
| 40 | Barex 210[12]/Hycar 1000X132[12] (20.0:80.0) | | | | | | | Coating A | — | — | — | — | — | — |
|  | Barex 210[12]/Hycar 1000X132[12] (20.0:80.0) | | | | | | | uncoated | — | — | — | — | — | — |
| 41 | Estane 5707[1] | | | | | | | Coating C | 4627 | 0.02 | 2694 | −0.11 | 11856 | −0.47 |
|  | Estane 5707[1] | | | | | | | uncoated | 4177 | −8.00 | 2456 | −7.15 | 11566 | −1.35 |
| 42 | Hycar 4001[1] | | | | | | | Coating C | −2.49 | 2663 | 11999 | −0.38 | | |
|  | Hycar 4001[1] | | | | | | | uncoated | 4595 | −3.83 | 2755 | −3.47 | 11923 | 0.18 |
| 43 | Hydrin 400[1] | | | | | | | Coating C | NS | NS | NS | NS | NS | NS |
|  | Hydrin 400[1] | | | | | | | uncoated | powder | powder | powder | powder | powder | powder |
| 44 | Nordel 6077[1] | | | | | | | Coating C | 4548 | −1.90 | 2763 | −0.90 | 12094 | 0.13 |
|  | Nordel 6077[1] | | | | | | | uncoated | 4194 | −17.13 | 2576 | −14.93 | 12073 | 0.42 |
| 45 | Rilsan BMNOP40TL[1] | | | | | | | Coating C | 4632 | −1.22 | 2749 | −1.12 | 11982 | −0.14 |
|  | Rilsan BMNOP40TL[1] | | | | | | | uncoated | 4952 | −3.00 | 2888 | −2.33 | 11861 | −0.79 |
| 46 | Hycar 4001/Hydrin 400[1] (46.9:53.1) | | | | | | | Coating C | NS | NS | NS | NS | NS | NS |
|  | Hycar 4001/Hydrin 400[1] (46.9:53.1) | | | | | | | uncoated | NS | NS | NS | NS | NS | NS |
| 47 | Estane 5707[1] | | | | | | | Coating C | 4627 | 0.02 | 2694 | −0.11 | 11856 | −0.47 |
|  | Estane 5707 | | | | | | | uncoated | 4893 | 5.11 | 2820 | 4.21 | 11529 | −1.92 |
|  |  | | | | | | | | | | 1000 hrs/125° | | | | |
| 48 | Hydrin 400[1] | | | | | | | Coating C | 4485 | 1.49 | 2644 | 0.15 | 11877 | −0.55 |
|  | Hydrin 400 | | | | | | | uncoated | powder | powder | powder | powder | powder | powder |
| 49 | Nordel 6077[1] | | | | | | | Coating C | 4578 | −1.25 | 2719 | −2.47 | 12043 | −0.29 |
|  | Nordel 6077 | | | | | | | uncoated | 4737 | −6.88 | 2740 | −10.69 | 11738 | −2.75 |
| 50 | Rilsan BMNOP40TL[1] | | | | | | | Coating C | 4717 | 0.60 | 2762 | −0.65 | 12011 | 0.10 |
|  | Rilsan BMNOP40TL | | | | | | | uncoated | 4956 | −2.94 | 2723 | −7.32 | 11335 | −4.90 |
| 51 | Hycar 4001/Hydrin 400[1] (46.9:53.1) | | | | | | | Coating C | 4505 | −2.04 | 2621 | −4.10 | 11620 | −2.36 |
|  | Hycar 4001/Hydrin 400[1] (46.9:53.1) | | | | | | | uncoated | 4378 | −7.58 | 2532 | −10.56 | 11718 | −1.38 |
| 52 | Zetpol 1020[1] | | | | | | | Coating C | 4459 | −0.89 | 2617 | −4.49 | 11513 | −4.91 |
|  | Zetpol 1020[1] | | | | | | | uncoated | 4879 | −4.63 | 2692 | −10.33 | 10660 | −10.29 |
| 53 | Zetpol 1020[1] | | | | | | | Coating C | 4459 | −0.89 | 2617 | −4.49 | 11513 | −4.91 |
|  | Zetpol 1020[1] | | | | | | | uncoated | 4678 | −5.48 | 2153 | −25.06 | 5597 | −51.77 |
|  |  | | | | | | | | | | 1000 hrs/175° | | | | |
| 54 | Epon 1031[16] | | | | | | | Coating B | 4412 | −2.05 | 3593 | −10.36 | 14600 | −2.45 |

TABLE I-continued

| | | | (Absolute Weight Gain) | | | | Salt Test | | | (Magnetic Data) | | | |
|---|---|---|---|---|---|---|---|---|---|---|---|---|---|
| | | | 1000 hrs. | | 2000 hrs. | | 1000 hrs. | | | | | | |
| Example | Polymer | Powder | 70° | 100° | 125° | 70° | 100° | 100° | Br | % Diff. | HC | % Diff. | Hci | % Diff. |
| | Epon 1031[16] | uncoated | | | | | | | 4472 | −6.98 | 3226 | −25.22 | 13402 | −11.66 |
| 55 | Epon 1031[16] | Coating C | | | | | | | 4759 | −0.27 | 4200 | −3.12 | 15993 | 1.60 |
| | Epon 1031[16] | uncoated | | | | | | | 4568 | −6.41 | 3319 | −24.22 | 13638 | −9.96 |
| 56 | Epon 1031[16] | Coating D | | | | | | | 4385 | −2.33 | 3595 | −10.33 | 14615 | −2.26 |
| | Epon 1031[16] | uncoated | | | | | | | 4472 | −6.98 | 3226 | −25.22 | 13402 | −11.66 |
| | | | | | | | | | | | | 2000 hrs/150° | | |
| 54 | Epon 1031[16] | Coating B | | | | | | | 4465 | −0.15 | 3835 | −4.29 | 14924 | −0.84 |
| 55 | Epon 1031[16] | uncoated | | | | | | | 4772 | −1.35 | 4037 | −6.94 | 14960 | −1.16 |
| | Epon 1031[16] | Coating C | | | | | | | 4756 | 0.12 | 4262 | −1.55 | 15899 | 0.86 |
| | Epon 1031[16] | uncoated | | | | | | | 4820 | −1.40 | 4064 | −6.97 | 15035 | −0.56 |
| 56 | Epon 1031[16] | Coating D | | | | | | | 4454 | −0.35 | 3833 | −3.71 | 14931 | 0.17 |
| | Epon 1031[16] | uncoated | | | | | | | 4772 | −1.35 | 4037 | −6.94 | 14960 | −1.16 |
| | | | | | | | | | | | | 1000 hrs/Salt Exp. | | |
| 48 | Hydrin 400[1] | Coating C | | | | | | | NS | NS | NS | NS | NS | NS |
| | Hydrin 400 | uncoated | | | | | | | NS | NS | NS | NS | NS | NS |
| 49 | Nordel 6077[1] | Coating C | | | | | | | 4548 | −1.90 | 2763 | −0.90 | 12094 | 0.13 |
| | Nordel 6077 | uncoated | | | | | | | 4976 | −2.18 | 3014 | −1.76 | 12091 | 0.17 |
| 50 | Rilsan BMNOP40TL[1] | Coating C | | | | | | | 4632 | −1.22 | 2749 | −1.12 | 11982 | −0.14 |
| | Rilsan BMNOP40TL | uncoated | | | | | | | 4759 | −6.80 | 2762 | −5.99 | 11863 | −0.48 |
| 51 | Hycar 4000[1]/Hydrin 400[1] (46.9:53.1) | Coating C | | | | | | | NS | NS | NS | NS | NS | NS |
| | Hycar 4000[1]/Hydrin 400[1] (46.9:53.1) | uncoated | | | | | | | NS | NS | NS | NS | NS | NS |
| 52 | Zetpol 1020[1] | Coating C | | | | | | | 4307 | −4.27 | 2615 | −4.56 | 12062 | −0.38 |
| | Zetpol 1020[1] | uncoated | | | | | | | 4852 | −5.16 | 2857 | −4.83 | 11899 | 0.13 |
| 53 | Zetpol 1020[1] | Coating C | | | | | | | 4307 | −4.27 | 2615 | −4.56 | 12062 | −0.38 |
| | Zetpol 1020[1] | uncoated | | | | | | | 4712 | −4.79 | 2724 | −5.19 | 11389 | −1.87 |
| | | | | | | | | | | | | 2000 hrs/175° | | |
| 54 | Epon 1031[16] | Coating B | | | | | | | 4256 | −5.51 | 3187 | −20.49 | 13913 | −7.03 |
| | Epon 1031[16] | uncoated | | | | | | | 4107 | −14.58 | 2480 | −42.51 | 10753 | −29.13 |
| 55 | Epon 1031[16] | Coating C | | | | | | | 4720 | −1.08 | 4015 | −7.39 | 15682 | −0.38 |
| | Epon 1031[16] | uncoated | | | | | | | 4178 | −14.40 | 2557 | −41.60 | 10982 | −27.49 |
| 56 | Epon 1031[16] | Coating D | | | | | | | 4251 | −5.31 | 3244 | −19.08 | 13915 | −6.94 |
| | Epon 1031[16] | uncoated | | | | | | | 4107 | −14.58 | 2480 | −42.51 | 10753 | −29.13 |

NS = No Sample
Powder = Sample Disintegrated

As apparent from Table I, the bonded, coated rare earth magnets of the present invention generally showed much improved results with regard to aging, salt or corrosion resistance as well as magnetic properties in comparison to the control, i.e. the uncoated rare earth magnet particles, for each example.

As is further apparent from the above data, generally improved results were obtained when an organic phosphorus compound of the present invention or an organic alcohol was coated directly on the rare earth magnet in the presence of a binder. As apparent from the above data, various different types of binders, that is thermoplastic, elastomer, and the like, yielded improved results.

FIG. 1 illustrates the efficacy of the invention. Samples of four coated powders and one sample of uncoated powder were weighted out (2.5 grams of each powder) and combined with 0.75 gram aliquots of 0.086M NaCl solution. The samples were dried in vacuo at 110° C. and placed into a closed chamber containing saturated solutions of $(NH_4)_2SO_4$. The samples were monitored periodically (usually daily) for weight changes and signs of corrosion. The four coated powders shown in FIG. 1 are:

A) Oxidation resistant coating only (prepared as described in Example 7);
B) Oxidation resistant coating+corrosion inhibitor (prepared as described in Example 8);
C) Oxidation resistant coating+corrosion inhibitor (prepared as described in Example 19); and
D) Oxidation resistant coating+corrosion inhibitor+Ar plasma treatment (prepared as described inn Example 57).

The graph depicts oxidation resistance values for various examples and as apparent therefrom, all were much better than uncoated magnet materials.

According to another aspect of the present invention, the rare earth magnet or magnetic materials of the present invention as set forth hereinabove, and thus is fully incorporated by reference, i.e. an element having an atomic number of from 57 to 71, and the like, can be formed, assembled, fabricated, manufactured, produced, etc. as an end product or article, or as any element or component thereof which is substantially free of a binder, i.e. within the interior portion thereof, and thus is generally called a "fully dense" rare earth magnet. Such fully dense magnets generally contain low or nonexistent amounts of binders such as 10 or 15 percent or less, desirably 5 percent or less, more desirably 2 percent or less, and preferably 0.5 percent or less by volume of binder based upon the total volume of the fully dense magnet. Such fully dense magnets can be made in any conventional manner and such magnets are also well known to the art and to the literature with the principal types of preparation, fabrication, manufacturing, etc., including sintering, alignment and sintering, compression, rotary forging and die-upset, as well as various variations thereof. Such fully dense magnets can be utilized as an end product or article such as a motor magnet, e.g., a vehicle starting motor, an alternator magnet, a servo motor magnet, a loud speaker magnet, voice coil motor magnet, a retarder magnet, a stepping motor magnet, an actuator, a generator magnet, sensor magnets, and the like, or any number of elements or components thereof which generally can be assembled together to form such a magnet end article or product.

Such elements or components are generally an agglomeration, combination, etc. of rare earth magnet particles, with the elements or components naturally being larger than the individual particles and having a minimum average particle size of at least 200 or 300 microns, and more generally at least 700 microns, but generally at least one-quarter inch or at least one inch, and even larger up to even a foot or several feet, depending upon the size of the various end components or elements. Such elements, components, articles, or products which constitute the fully dense rare earth magnet are then coated with a passivating material and/or antidegradant as more fully described hereinbelow.

The production, fabrication, manufacture, etc., of fully dense rare earth magnets, as noted above, is known to the art and to the literature and, hence, any type of specific process or method thereof can be utilized.

One such method of making the fully dense rare earth magnets or magnetic materials of the present invention is by sintering as noted above. When such fully dense magnets are made by sintering, the magnet particles or material, which are generally of a very fine particle size, i.e., generally less than 10 microns, are loaded into a compression die with pressure subsequently being applied thereto to form a compact powder. The compact powder is then placed into a high temperature oven and heat-aged in a conventional manner, known to the art and to the literature, in a defined way, i.e., utilizing specific temperature-time cycles. Although some shrinkage does occur upon heat-aging, the density and the magnetic properties improve significantly upon sintering. Through careful control of sintering conditions, specific magnetic phases can be grown preferentially over various non-magnetic phases further improving the magnetic properties of the sintered composition. Generally, any of the magnet or magnetic materials known to the art and to the literature including those set forth hereinabove can be utilized with specific examples including $SmCo_5$, $Sm_2Co_7$, $Sm_2Co_{17}$, Nd-Fe-B alloys, various alloys of Nd-Fe-B containing small amounts of various metal additives known to the art and to the literature such as palladium, gallium, colbalt, aluminum, carbon, etc., alloys of Nd-Fe-N, alloys of Sm-Co-N, and the like. Further description of the preparation of the sintered fully dense rare earth magnets is as set forth in the article "Rare Earth-Cobalt Magnets: An Overview and a Survey of Commercially Available Types," pp. 5–30, K. J. Strnat, University of Dayton, Dayton, Ohio, 1976, which was published with regard to the Proceedings of the Second International Workshop on Rare Earth-Cobalt Permanent Magnets and Their Application, Jun. 8-11, 1976, Dayton, Ohio. Another method or manner is that which is set forth in the article "Overview of Rare-Earth Magnet Processing Technology," pp. 233-247, M. A. Bohlmann, I G Technologies, Inc., Valparaiso, Ind., 1987, which was published in proceedings of the Ninth International Workshop on Rare-Earth Magnets and Their Applications, Aug. 31 through Sep. 2, 1987, Bad Soden, Federal Republic of Germany. These articles are hereby fully incorporated by reference with regard to the various methods and manner of preparing sintered rare earth magnet compositions.

The alignment and sintering process of making fully dense rare earth magnets is generally the same as the sintering process, except that during the powder compacting formation step, the key step of applying an external magnetic field during depressing of the compact powder is utilized. The magnetic field which is applied can be axial or perpendicular to the direction of the applied pressure. The magnetic field will thus align the magnetic particles in a preferred orientation and lead to anisotropic, but improved, magnetic properties. In order to promote or enhance alignment of the magnetic particles, a fluidized bed can be utilized wherein the gas is inert such as nitrogen, argon, and the like. Once the particles have been aligned by the magnetic field, they can thus be compacted utilizing a plunger or the like. The remainder of the sintering operation is essentially that described hereinabove. The aligned and sintering process of making a fully dense magnet or magnetic material can generally utilize all of the rare earth-type magnets or materials noted hereinabove with specific examples once again including $SmCo_5$, $Sm_2Co_7$, $Sm_2Co_{17}$, Nd-Fe-B alloys, various alloys of Nd-Fe-B containing small amounts of various metal additives known to the art and to the literature such as palladium, gallium, colbalt, aluminum, carbon, etc., alloys of Nd-Fe-N, alloys of Sm-Co-N, and the like. The alignment and sintering process can be made according to any method to the art and to the literature including that set forth in the above noted articles "Overview of Rare-Earth Magnet Processing Technology" and "Rare Earth-Cobalt Magnets: An Overview and a Survey of Commercially Available Types," which are hereby fully incorporated by reference.

In addition to the sintering process or the alignment and sintering process, large particle size components, structure, articles of unitary or solid form, i.e., fully dense magnets or magnetic materials can also be made according to a compression method which is well known to the art and to the literature. Such compressed magnets are formed utilizing a combination of heat and pressure to produce high density magnets without sintering. Such a process is commercially known under the name "MAGNEQUENCH" to produce "MQ2 Magnets." In such a process, a magnetic ribbon, generally created by a rapidly quenched process which is also known to the art and to the literature, is crushed into a coarse powder and subsequently pressed in a die under heat and pressure. Incomplete but significant densification of the magnetic material rapidly occurs and, hence, is an economical process by which to make magnets which retain some porosity therein. The details of the compression method are set forth in various U.S. Pat. Nos. such as 4,778,542, 4,792,367, 4,842,656, 4,844,754, 4,851,058, 4,867,809, 4,881,985, 4,902,361, 4,921,551, and 4,920,009, which are hereby fully incorporated by reference with regard to all aspects thereof concerning the compression method.

A variation of the compressed magnet process to produce fully dense magnets is the die-upset method wherein the crushed ribbon powder is compressed in a die under pressure and heat. An important difference is that at a critical point in the pressure/heat cycle, a lateral shear force is applied to the magnet material in the die in addition to the compressive force. A special die is utilized to allow the shear to be applied under such conditions. The application of such shear leads to flow within the magnet material and creates within said magnetic material a lamellar anisotropic microstructure. The anisotropic microstructure yields a fully dense anisotropic-type magnet having improved magnetic properties. Magnets produced by the die-upset process can be ground into a powder which retains its anisotropic character. The die-upset method is well known to the art and to the literature. Examples of suitable methods of preparation are set forth in the following articles "Processing of Neodymium-Iron-Boron Melt-Spun Ribbons to Fully Dense Magnets," R. W. Lee, E. G. Brewer, N. A. Schaffel, General Motors Research Laboratories, Warren, Mich., Apr. 10, 1985; "Hot-Pressed Neodymium-Iron-Boron Magnets," R. W. Lee, Physics Department, General Motors Research Laboratories, Warren, Mich., published Feb. 4, 1985, Applied Physics Letter 46 (790); Applied Physics Letter 55, J. J. Croat, J. F. Herbst, R. W. Lee, and F. E. Pinkerton, 1984; and Applied Physics Letter 44, J. J. Croat, J. F. Herbst, R. W. Lee, and F. E. Pinkerton, 1984; U.S. Pat. Nos. 4,920,009 and 4,859,410, all of which are hereby incorporated by reference.

Since, as noted, such fully dense or large size rare earth magnets or magnetic materials are desirably formed in the size of various elements or components of a product, or in the form of the actual end article or product, generally there is no need for a polymeric binder to bind the various particles together. In other words, the large articles, structures, shapes of the fully dense magnets or materials are free of, or do not contain, any binders. Rather, in accordance with the present invention and as noted hereinabove, a passivated rare earth composition is generally applied to the surface of the fully dense magnet in a manner which is also described herein above and the same being fully incorporated by reference. Briefly, the passivating agent is dissolved in one or more solvents well known to the art and to the literature such as water and/or alcohols having from 1 to 8 carbon atoms such as methanol, ethanol, etc. The fully dense rare earth magnetic is immersed in the solvent, being immersed therein for long periods of time as for example in excess of 25, 50 or even 75 hours, and subsequently removed therefrom. The passivating agent generally cures upon the surface of the fully dense magnetic and thus forms a protective coating, generally during immersion as well as upon evaporation of the solvent. Optionally, but desirably, antidegradants are also applied to the surface of the fully dense magnets in a manner which is also described hereinabove and the same being fully incorporated by reference. Briefly, the procedure is the same as with regard to the passivating agent and hence the various antidegradants are dissolved in small amounts in a suitable solvent well known to the literature and to the art such as various aliphatic or aromatic alcohols, water, and the like, with the fully dense rare earth magnetic, that is the article, product, component, element, etc., being immersed therein for long periods of time as for example in excess of 25, 50 or even 75 hours, and subsequently removed therefrom. The passivating agents are those set forth hereinabove, such as the oxidation resistant-type materials, the corrosion inhibitor-type materials, or combinations thereof, and thus are hereby fully incorporated by reference and will not be repeated. Similarly, the type of passivating agents are the same as set forth hereinabove, are thus fully incorporated by reference, and are not repeated. Inasmuch as a localized concentration, or a thin coating, or the like, is applied to the surface of the fully dense magnets, the total amount of passivating agent as well as the antidegradant is generally much less than that utilized to coat the individual, smaller, fine-sized particles noted and described hereinabove. The actual thickness of the coating will generally vary with the application environment. For example, where little or no mechanical abuse is encountered, a very thick coating can be utilized. On the other hand, should mechanical abuse or a strong corrosive environment be encountered, thicker coatings can be utilized as well as multiple layers in various combinations with abrasive coatings, antidegradants, and the like. As a general rule of thumb, the thickness of the passivating agent can generally be from about 0.1 to about 200 mils, and desirably from about 0.5 to about 50 mils. The amount of the antidegradant can also generally exist in a film in a thickness of from about 0.1 to about 200 mils and desirably from about 0.5 to about 50 mils. In terms of volume of the coating thickness, the amount of passivating agent can generally range from about 1 percent to about 30 percent by volume, desirably from about 3 percent to about 25 percent by volume, and often from about 10 percent to about 20 percent by volume, based upon the total volume of the fully dense magnet product, article, element, component, etc. With regard to the amount of the antidegradant, the amount thereof can generally range from about 1 percent to about 30 percent by volume, desirably from about 3 percent to about 25 percent by volume, and often from about 10 percent to about 20 percent by volume, based upon the total volume of the fully dense magnet product, article, element, component, etc. As will be appreciated by one skilled in the art, the thickness of the passivating agent and/or the antidegradant can vary widely depending upon the environment in which the magnet is utilized, both with regard to corrosive attack, mechanical application, and the like.

As noted above, localized concentrations, layers, laminates, etc., of the passivating agent and the antidegradant can be formed on the fully dense magnet article or product, element, or component, and thus many combinations or order of such numerous types of protective coatings exist. Moreover, mixtures of the antidegradant and passivating agent, including different amounts thereof, can also be utilized in various concentrations in any particular layer. It should thus be apparent to one skilled in the art that the coating arrangement of the present invention can vary broadly and is not limited to a specific embodiment. Thus, numerous permutations and different types of layer configurations, laminates, mixtures, etc., can be utilized, although generally the protective coating is simply one or more layers of passivaging agent, one or more layers of a mixture containing the passivating agent and the antidegradant, or one or more layers of the antidegradant coated upon one or more layers of the passivating agent.

When a coating layer or film is applied, as well as a localized concentration of the passivating agent and/or the antidegradant, the surface of the fully dense magnet particle is generally totally covered, protected, or encapsulated by either the passivating agent or any component thereof, the antidegradant, or both. Preferably, the entire fully dense magnetic particle is covered by a passivating agent generally in at least a single monomolecular layer about the component, element, or article or product of the fully dense magnet structure.

The invention will be better understood by reference to the following examples which serve to more fully describe, but not limit, the present invention. In the following examples, Magnequench ® was obtained from General Motors Corporation and the same is made according to a compression process.

EXAMPLE 58

A NdFeB magnet (Magnequench ® II, 32 mm × 18 mm × 6 mm) was cut in half, yielding two equal segments sized 16 mm × 18 mm × 6 mm. One segment was set aside while the other was immersed in 100 mL of $H_3PO_4$-acidified $K_2Cr_2O_7$ solution (0.10M) for 2 hours and dried under nitrogen at 60° C. and in vacuo at 110° C. A mixture of 19.2 parts of a bisphenol A-epichlorohydrin resin (e.g. Shell Epon 828, Dow DER 331 or similar epoxy resin), 38.5 parts [3-(glycidyloxy)-propyl]trimethoxysilane and 42.3 parts [3-(amino)-propyl]triethoxysilane was dissolved in aqueous methanol to provide a 4.8 percent solution. The dichromate treated NdFeB magnet segment was immersed in 100 grams of the solution for 72 hours. The sample was removed and was dried under nitrogen and in vacuo. Both the coated and uncoated segments were aged at 125° C. for 200 hours. The uncoated sample decreased 5.0 percent in coercivity (Hc) while the coated sample showed a loss of 1.6 percent.

EXAMPLE 59

A NdFeB magnet (Magnequench ® II, 32 mm × 18 mm × 6 mm) was cut in half, yielding two equal segments sized 16 mm × 18 mm × 6 mm. One segment was set aside while the other was immersed in 100 mL of $H_3PO_4$-acidified $K_2Cr_2O_7$ solution (0.10M) for 30 hours and dried under nitrogen at 60° C. and in vacuo at 110° C. A mixture of 19.2 parts of a bisphenol A-epichlorohydrin resin (e.g. Shell Epon 828, Dow DER 331 or similar epoxy resin), 38.5 parts [3-(glycidyloxy)-propyl]trimethoxysilane and 42.3 parts [3-(amino)-propyl]triethoxysilane was dissolved in aqueous methanol to provide a 50 percent solution. The dichromate treated NdFeB magnet segment was immersed in 100 grams of the solution. The sample was removed and was dried under nitrogen and in vacuo. Seventy-five grams of toluene containing 5 grams of distearyl pentaerythritol diphosphite was prepared and the coated segment was immersed in the solution for one hour. The sample was removed and again dried under nitrogen and in vacuo. Both the coated and uncoated segments were aged at 175° C. for 500 hours. The uncoated sample decreased 6.2 percent in residual induction (Br), while the coated sample exhibited no measurable loss in Br.

While in accordance with the Patent Statutes, the best mode and preferred embodiment have been set forth, the scope of the invention is not limited thereto, but rather by the scope of the attached claims.

What is claimed is:

1. An essentially binder-free rare earth magnet, comprising:
   a fully dense sinter-free rare earth magnet, the surface of said rare earth magnet passivated by a coating of a passivating agent, said passivating agent being an (A) oxidation-resistant composition, or an (B) corrosion inhibitor, or mixtures of (A) and (B), or layers of (A) and (B) in any order.

2. An essentially binder-free rare earth magnet according to claim 1, wherein
   said (A) oxidation resistant composition comprises a (Ay) ternary composition, or a (Ax) binary composition, or mixtures thereof,
   said (Ay) ternary composition comprising
   1) an amino containing silane,
   2) an epoxy silane, and 3) an epoxy resin,
said (Ay1) amino containing silane being an aminosilane or a polyaminosilane having the formula

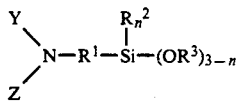

wherein said $R^1$ group has from 1 to 30 carbon atoms, wherein said $R^1$ group is an aliphatic group, an aromatic group, or combinations thereof, wherein n is 1 or 0, wherein $R^2$ and $R^3$, independently, is an aliphatic group, an aromatic group, or combinations thereof having from 1 to 20 carbon atoms, wherein Y and Z independently is a hydrogen atom, an aminoalkyl group, a polyaminoalkyl group, an aryl group, an alkylalkoxysilane group, or an aminoalkylalkoxysilane group wherein said alkyl group has from 1 to 12 carbon atoms and said alkoxy group has from 1 to 6 carbon atoms, wherein said (Ay2) epoxy silane compound has the formula

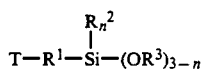

wherein said $R^1$ group has from 1 to 30 carbon atoms, wherein said $R^1$ group is an aliphatic group, an aromatic group, or combinations thereof, wherein n is 1 or 0, wherein $R^2$ and $R^3$, independently, is an aliphatic group, an aromatic group, or combinations thereof having from 1 to 20 carbon atoms, and wherein T is an epoxycyclohexyl group, a glycidoxy group, or an alkyl derivative thereof,
wherein the amount of said (Ay1) amino containing silane and said (Ay2) epoxy silane in said coating composition each, independently, being from about 5 to about 70 parts by weight per 100 parts by weight of said Ay composition, and wherein the amount of said (Ay3) epoxy compound being from about 5 parts to about 90 parts by weight per every 100 parts by weight of said (Ay) coating composition,
said (Ax) binary oxidation resistant coating comprising;
1) an amino containing silane, and
2) an epoxy silane or an epoxy resin, said (Ax1) amino containing silane being an amino silane or a polyaminosilane having the same formula as said (Ay1) amino containing silane wherein said $R^1$, $R^2$, $R^3$, Y, and Z, independently, are as set forth in said (Ay1) formula and wherein n is 0 or 1, and
wherein (Ax2) epoxy silane has the same formula of said (Ay2) epoxy silane, wherein said $R^1$, $R^2$, $R^3$, and T, independently, are as set forth in said (Ay2) formula and wherein n is 0 or 1, and
wherein the amount of said (Ax1) amino containing silane is from about 20 parts to about 80 parts by weight based upon the total weight of said (Ax1) amino containing silane and said (Ax2) epoxy silane or said epoxy resin, and wherein the amount of said (Ax2) epoxy silane or said epoxy resin is from about 80 parts to about 20 parts by weight based upon the total weight of said (Ax2) epoxy silane or said epoxy resin and said (Ax1) amino containing silane.

3. An essentially binder-free rare earth magnet according to claim 2, wherein said corrosion inhibitor is an oxymetallate, or a zinc salt, or combinations thereof, wherein said oxymetallate inhibitor is various phosphates, various molybdates, various polymolybdates, various chromates, various dichromates, various silicates, or combinations thereof, wherein said $R^1$ of said (Ay1) and said (Ax1) amino-containing silane compound, independently, is an aliphatic group having from 1 to 20 carbon atoms, an aromatic or an alkyl substituted aromatic group having from 6 to 30 carbon atoms, and wherein $R^2$ and $R^3$ of said (Ay1) and said (Ax1) amino-containing silane, and said (Ay2) and said (Ax2) epoxy silane, independently, is an aliphatic having from 1 to 11 carbon atoms.

4. An essentially binder-free rare earth magnet according to claim 3, wherein said $R^1$ of said (Ay1) and said (Ax1)) amino-containing silane compound and said (Ay2) and said (Ax2) epoxy silane compound, independently, is an alkyl group containing 3 or 4 carbon atoms, an aromatic group or an alkyl substituted aromatic group containing from 7 to 9 carbon atoms, wherein $R^2$ and $R^3$ of said (Ay1) and said (Ax1) amino-containing silane compound and said (Ay2) and said (Ax2) epoxy silane compound, independently, is an alkyl group having 1 or 2 carbon atoms, wherein Y group of said (Ay1) and said (Ax1) contains at least one secondary or primary amine moiety,
wherein the amount of said (Ay1) amino-containing silane is from about 20 to about 60 parts by weight,
wherein the amount of said (Ay2) epoxy silane is from about 10 parts to about 55 parts by weight, and wherein the amount of said (Ay3) epoxy resin is from about 10 parts to about 50 parts by weight, and
wherein the amount of said (Ax1) amino-containing silane is from about 30 to about 70 parts by weight, and wherein the amount of said (Ax2) epoxy silane or said epoxy resin is from about 70 parts to about 30 parts by weight.

5. An essentially binder-free rare earth magnet according to claim 4, wherein said (Ay1) and said (Ax1) amino-containing silane compound is 4-aminobutyltriethoxysilane, (aminoethylaminomethyl)phenethyltrimethoxysilane, N-(2-aminoethyl)-3-aminopropylmethyldimethoxysilane, 3-aminopropyltriethoxysilane, 3-aminopropyltrimethoxysilane, N-2-aminoethyl-3-aminopropyltrimethoxysilane, N-2-aminoethyl-3-aminopropyltris(2-ethylhexoxy)silane, 6-(aminohexylaminopropyl)trimethoxysilane, 3-aminophenyltrimethoxysilane, 3-aminopropylmethyldiethoxysilane, bis[3-(trimethoxysilyl)propyl]ethylenediamine, n-phenylaminopropyltrimethoxysilane, trimethoxysilylpropyldiethylenetriamine, ω-aminoundecyltrimethoxysilane, bis[3-(triethoxysilyl)propyl]amine, dimethoxymethylsilylpropyl (polyethyleneimine), or trimethoxysilylpropyl(polyethylenimine),
wherein said (Ay2) and said (Ax2) epoxy silane is (3-glycidoxypropyl)methyldiethoxysilane, (3-glycidoxypropyl)trimethoxysilane, 2-(3,4-epoxycyclohexyl)ethylmethyldimethoxysilane, 2-(3,4-epoxycyclohexyl)ethyltrimethoxysilane, or [2-(3,4-epoxy-4-methylcyclohexyl)propyl]methyldiethoxy silane, and wherein said (Ay3) and said (Ax2)

epoxy is the reaction product of bisphenol A and epichlorohydrin,
wherein the amount of said (Ay1) amino-containing silane is from about 35 to about 50 parts by weight, wherein the amount of said (Ay2) epoxy silane is from about 15 to about 40 parts by weight, and wherein the amount of said (Ay3) epoxy resin is from about 20 to about 40 parts by weight,
and wherein said oxymetallate is $M_2CrO_4$ or $M_2Cr_2O_7$ where M is H, Li, Na, or K.

6. An essentially binder-free rare earth magnet according to claim 5, wherein said (Ay1) and said (Ax1) amino containing silane, independently, is 3-aminopropyltriethoxysilane, 3-aminopropyltrimethoxysilane, or N-2-aminoethyl-3-aminopropyltrimethoxysilane, wherein said (Ay2) and said (Ax2) epoxy silane is 3-glycidoxypropyl)methyldiethoxysilane or 3-glycidoxypropyl)trimethoxysilane, and wherein said (Ax2) epoxy is the reaction product of bisphenol A and epichlorohydrin, and wherein said binder is a nitrile rubber, an acrylate, an epoxy or combinations thereof.

7. An essentially binder-free rare earth magnet according to claim 1, wherein said rare earth magnet material is an alloy of neodymium or praseodymium in combination with iron and boron, an alloy of samarium and cobalt, an alloy of neodymium, iron, boron and cobalt, an alloy of neodymium, iron, and nitrogen, or an alloy of samarium, cobalt and nitrogen.

8. An essentially binder-free rare earth magnet according to claim 4, wherein said rare earth magnet material is an alloy of neodymium or praseodymium in combination with iron and boron, an alloy of samarium and cobalt, an alloy of neodymium, iron, boron and cobalt, an alloy of neodymium, iron, and nitrogen, or an alloy of samarium, cobalt and nitrogen.

9. An essentially binder-free rare earth magnet according to claim 6, wherein said rare earth magnet material is an alloy of neodymium or praseodymium in combination with iron and boron, an alloy of samarium and cobalt, an alloy of neodymium, iron, boron and cobalt, an alloy of neodymium, iron, and nitrogen, or an alloy of samarium, cobalt and nitrogen.

10. An essentially binder-free rare earth magnet according to claim 1, wherein the amount of said passivating agent is 30 percent or less by volume based upon the total volume of said fully dense rare earth magnet.

11. An essentially binder-free rare earth magnet according to claim 5, wherein the amount of said passivating agent is 25 percent or less by volume based upon the total volume of said fully dense rare earth magnet.

12. An essentially binder-free rare earth magnet according to claim 9, wherein the amount of said passivating agent is 20 percent or less by volume based upon the total volume of said fully dense rare earth magnet.

13. An essentially binder-free rare earth magnet according to claim 1, wherein said fully dense rare earth magnet contains less than 5 percent by volume of a binder.

14. An essentially binder-free rare earth magnet according to claim 3, wherein said fully dense rare earth magnet contains less than 2 percent by volume of a binder.

15. An essentially binder-free rare earth magnet according to claim 6, wherein said fully dense rare earth magnet contains less than 1 percent by volume of a binder.

16. An essentially binder-free rare earth magnet according to claim 9, wherein said fully dense rare earth magnet contains less than 1 percent by volume of a binder.

17. An essentially binder-free rare earth magnet according to claim 1, wherein said fully dense rare earth magnet is a sinter free an aligned and sintered magnet, a compressed magnet, or a die-upset magnet.

18. An essentially binder-free rare earth magnet according to claim 5, wherein said fully dense rare earth magnet is a sinter free an aligned and sintered magnet, a compressed magnet, or a die-upset magnet.

19. An essentially binder-free rare earth magnet according to claim 9, wherein said fully dense rare earth magnet is a sinter free or a die-upset magnet.

20. An essentially binder-free rare earth magnet according to claim 1, including an antidegradant coating, said antidegradant coating existing as at least one separate layer, or admixed with said passivating coating, said passivating layer existing as at least one layer, said antidegradant having the formula

(FORMULA I)

(FORMULA II)

(FORMULA III)

(FORMULA IV)

(FORMULA V)

(FORMULA VI)

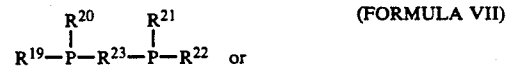

(FORMULA VII)

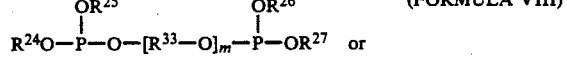

(FORMULA VIII)

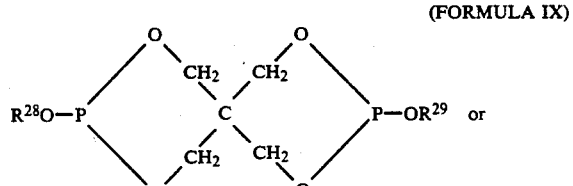

(FORMULA IX)

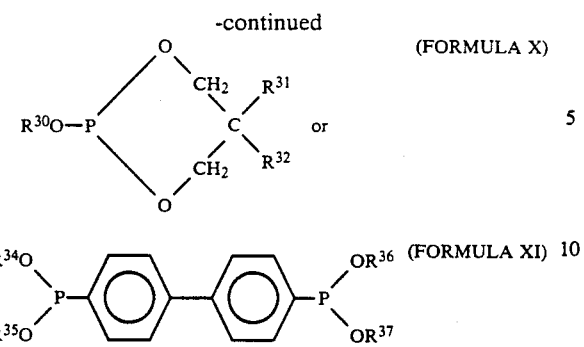
(FORMULA X)

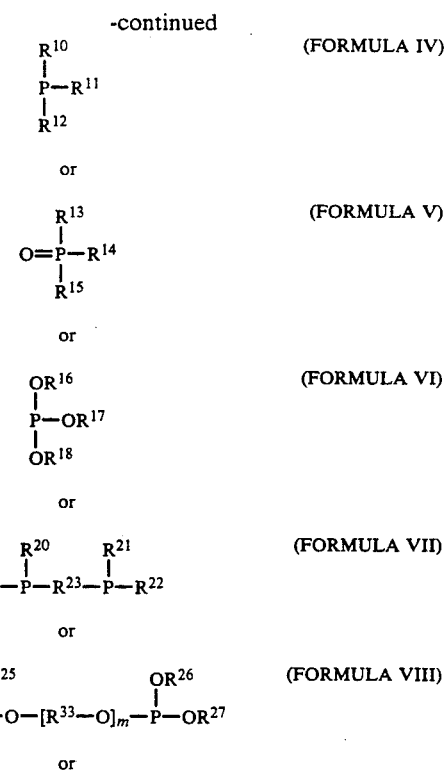

including any isomer of Formulas II, III, IV, V, VI, VII, VIII, IX, X, or XI, and wherein $R^3$ through $R^9$, independently, is H, or an aliphatic group, an aromatic group, or combinations thereof, having from 1 to 25 carbon atoms, or wherein $R^8$ or $R^9$ is an alkoxy group having from 1 to 25 carbon atoms; or wherein $R^{10}$ through $R^{32}$, independently, is an aliphatic group, an aromatic group, or combinations thereof, having from 1 to 20 carbon atoms, or wherein $R^{16}$, $R^{17}$, or $R^{18}$ is H, or wherein $R^{31}$ or $R^{32}$ is an alkoxy group having from 1 to 25 carbon atoms; or an aromatic group having from 6 to 12 carbon atoms, or combinations thereof, where $R^{33}$ is ethylene or propylene; where $R^{34}$, $R^{35}$, $R^{36}$, and $R^{37}$, independently, is hydrogen or an aliphatic group having from 1 to 18 carbon atoms, or an aromatic group having from 6 to 12 carbon atoms, or combinations thereof, and m is 1 to 100, or said antidegradant is a monoamine or polyamine salt of the phosphorous compounds of Formula I through Formula X, an aliphatic alcohol, an aromatic alcohol, an aliphatic substituted aromatic alcohol, an aromatic substituted aliphatic alcohol, or combinations thereof, wherein said alcohols have from 8 to 25 carbon atoms, or polyvinylalcohol.

21. An essentially binder-free rare earth magnet according to claim 4, including an antidegradant coating, said antidegradant coating existing as at least one separate layer, or admixed with said passivating coating, said passivating layer existing as at least one layer, said antidegradant having the formula

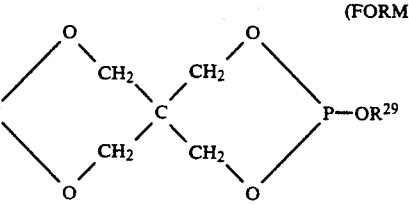
(FORMULA I)

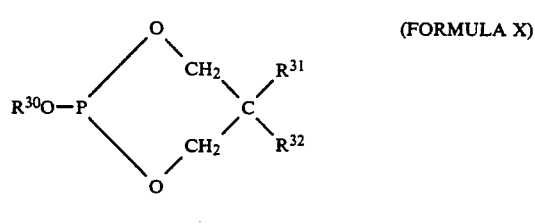
(FORMULA II)

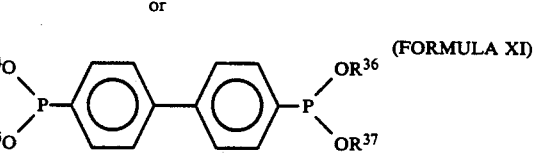
(FORMULA III)

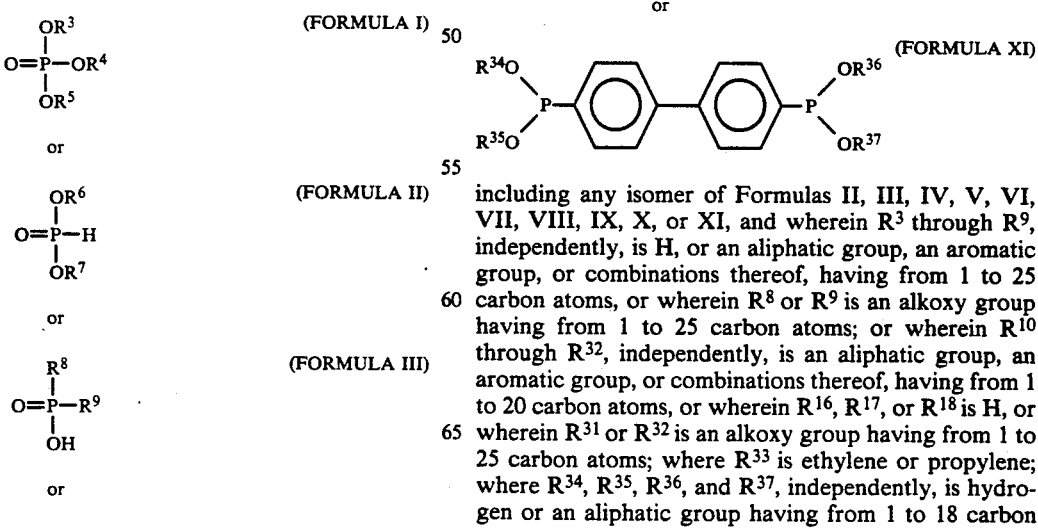

including any isomer of Formulas II, III, IV, V, VI, VII, VIII, IX, X, or XI, and wherein $R^3$ through $R^9$, independently, is H, or an aliphatic group, an aromatic group, or combinations thereof, having from 1 to 25 carbon atoms, or wherein $R^8$ or $R^9$ is an alkoxy group having from 1 to 25 carbon atoms; or wherein $R^{10}$ through $R^{32}$, independently, is an aliphatic group, an aromatic group, or combinations thereof, having from 1 to 20 carbon atoms, or wherein $R^{16}$, $R^{17}$, or $R^{18}$ is H, or wherein $R^{31}$ or $R^{32}$ is an alkoxy group having from 1 to 25 carbon atoms; where $R^{33}$ is ethylene or propylene; where $R^{34}$, $R^{35}$, $R^{36}$, and $R^{37}$, independently, is hydrogen or an aliphatic group having from 1 to 18 carbon atoms, or an aromatic group having from 6 to 12 carbon atoms, or combinations thereof, and m is 1 to 100, or said antidegradant is a monoamine or polyamine salt of the phosphorous compounds of Formulas I through X, an aliphatic alcohol, an aromatic alcohol, an aliphatic substituted aromatic alcohol, an aromatic substituted aliphatic alcohol, or combinations thereof, wherein said alcohols have from 8 to 25 carbon atoms, or polyvinylalcohol.

22. An essentially binder-free rare earth magnet according to claim 6, including at least one antidegradant coating, said antidegradant coating existing as at least one separate layer, or admixed with said passivating agent coating, and said passivating layer existing as at least one layer, and wherein said antidegradant is distearyl pentaerythritol diphosphite, dilauryl phosphate, trilauryl phosphite, distearyl phosphite, di-tridecyl phosphite, tetraphenyl dipropyleneglycol diphospite, or trisnonylphenyl phosphite, dodecanol, octadecanol, polyvinyl alcohol, and combinations thereof.

23. An essentially binder-free rare earth magnet according to claim 8, including at least one antidegradant coating, said antidegradant coating existing as at least one separate layer, or admixed with said passivating agent coating, said passivating layer existing as at least one layer, and wherein said antidegradant is distearyl pentaerythritol diphosphite, dilauryl phosphate, trilauryl phosphite, distearyl phosphite, di-tridecyl phosphite, tetraphenyl dipropyleneglycol diphospite, or trisnonylphenyl phosphite, dodecanol, octadecanol, polyvinyl alcohol, and combinations thereof.

24. An essentially binder-free rare earth magnet according to claim 11, including at least one antidegradant coating, said antidegradant coating existing as at least one separate layer, or admixed with said passivating agent coating, said passivating layer existing as at least one layer, and wherein said antidegradant is distearyl pentaerythritol diphosphite, dilauryl phosphate, trilauryl phosphite, distearyl phosphite, di-tridecyl phosphite, tetraphenyl dipropyleneglycol diphospite, or trisnonylphenyl phosphite, dodecanol, octadecanol, polyvinyl alcohol, and combinations thereof.

25. An essentially binder-free rare earth magnet according to claim 14, including an antidegradant coating, said antidegradant coating existing as at least one separate layer, or admixed with said passivating coating, said passivating layer existing as at least one layer, said antidegradent having the formula

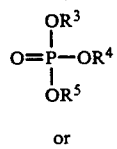
(FORMULA I)

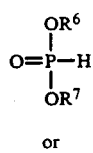
(FORMULA II)

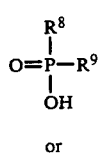
(FORMULA III)

(FORMULA IV)

(FORMULA V)

(FORMULA VI)

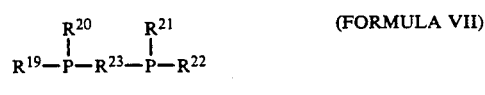
(FORMULA VII)

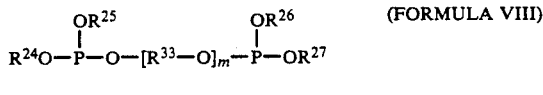
(FORMULA VIII)

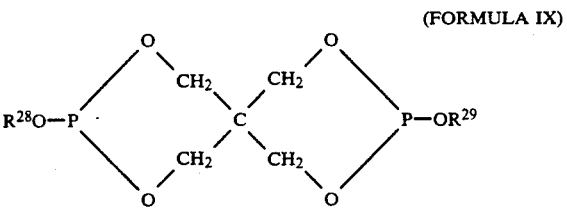
(FORMULA IX)

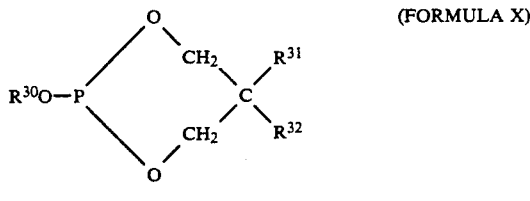
(FORMULA X)

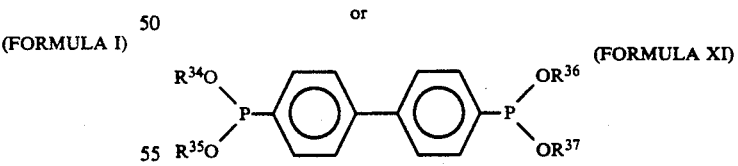
(FORMULA XI)

including any isomer of Formulas II, III, IV, V, VI, VII, VIII, IX, X, or XI, and wherein $R^3$ through $R^9$, independently, is H, or an aliphatic group, an aromatic group, or combinations thereof, having from 1 to 25 carbon atoms, or wherein $R^8$ and $R^9$ is an alkoxy group having from 1 to 25 carbon atoms; or wherein $R^{10}$ through $R^{32}$, independently, is an aliphatic group, an aromatic group, or combinations thereof, having from 1 to 20 carbon atoms, or wherein $R^{16}$, $R^{17}$, or $R^{18}$ is H, or wherein $R^{31}$ or $R^{32}$ is an alkoxy group having from 1 to 25 carbon atoms; where $R^{33}$ is ethylene or propylene; where $R^{34}$, $R^{35}$, $R^{36}$, and $R^{37}$, independently, is hydrogen or an aliphatic group having from 1 to 18 carbon atoms, or an aromatic group having from 6 to 12 carbon atoms, or combinations thereof, and m is 1 to 100, or said antidegradant is a monoamine or polyamine salt of the phosphorous compounds of Formulas I through X, an aliphatic alcohol, an aromatic alcohol, an aliphatic substituted aromatic alcohol, an aromatic substituted aliphatic alcohol, or combinations theroef, wherein said alcohols have from 8 to 25 carbon atoms, or polyvinylalcohol.

26. An essentially binder-free rare earth magnet according to claim 17, including an antidegradant coating, said antidegradant coating existing as at least one separate layer, or admixed with said passivating coating, and said passivating layer existing as at least one layer, said antidegradant having the formula

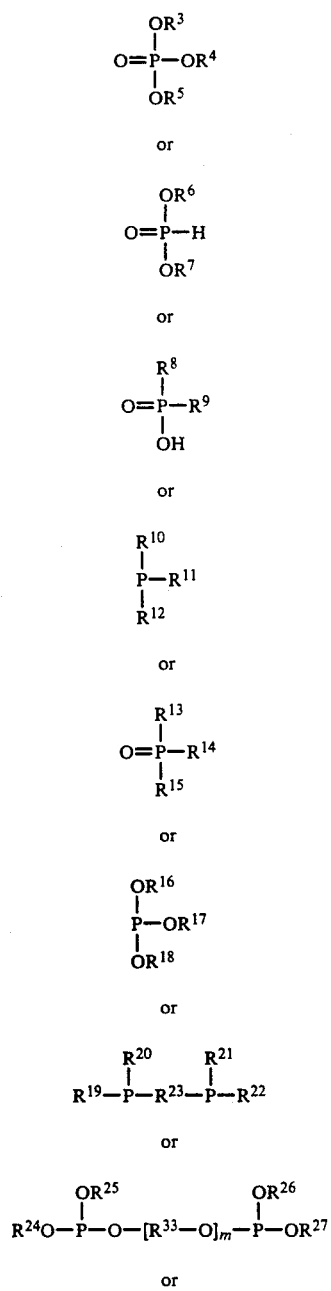

(FORMULA I)

(FORMULA II)

(FORMULA III)

(FORMULA IV)

(FORMULA V)

(FORMULA VI)

(FORMULA VII)

(FORMULA VIII)

or

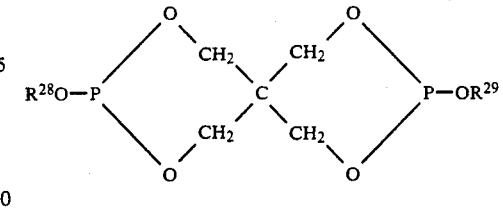

(FORMULA IX)

or

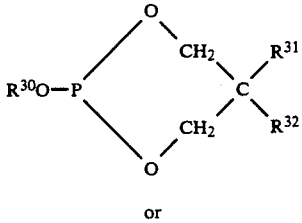

(FORMULA X)

or

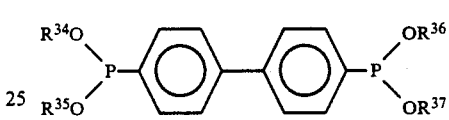

(FORMULA XI)

including any isomer of Formulas II, III, IV, V, VI, VII, VIII, IX, X, or XI, and wherein $R^3$ through $R^9$, independently, is H, or an aliphatic group, an aromatic group, or combinations thereof, having from 1 to 25 carbon atoms, or wherein $R^8$ or $R^9$ is an alkoxy group having from 1 to 25 carbon atoms; or wherein $R^{10}$ through $R^{32}$, independently, is an aliphatic group, an aromatic group, or combinations thereof, having from 1 to 20 carbon atoms, or wherein $R^{16}$, $R^{17}$, or $R^{18}$ is H, or wherein $R^{31}$ or $R^{32}$ is an alkoxy group having from 1 to 25 carbon atoms; where $R^{33}$ is ethylene or propylene; where $R^{34}$, $R^{35}$, $R^{36}$, and $R^{37}$, independently, is hydrogen or an aliphatic group having from 1 to 18 carbon atoms, or an aromatic group having from 6 to 12 carbon atoms, or combinations thereof, and m is 1 to 100, or said antidegradant is a monoamine or polyamine salt of the phosphorous compounds of Formulas I through X, an aliphatic alcohol, an aromatic alcohol, an aliphatic substituted aromatic alcohol, an aromatic substituted aliphatic alcohol, or combinations thereof, wherein said alcohols have from 8 to 25 carbon atoms, or polyvinylalcohol.

27. An essentially binder-free rare earth magnet according to claim 9, including at least one antidegradant coating, said antidegradant coating existing as at least one separate layer, or admixed with said passivating agent coating, said passivating layer existing as at least one layer, and wherein said antidegradant is distearyl pentaerythritol diphosphite, dilauryl phosphate, trilauryl phosphite, distearyl phosphite, di-tridecyl phosphite, tetraphenyl dipropyleneglycol diphospite, or trisnonylphenyl phosphite, dodecanol, octadecanol, polyvinyl alcohol, and combinations thereof.

28. An essentially binder-free rare earth magnet according to claim 20, wherein said antidegradant is in the form of a layer coating said passivating agent, and wherein said rare earth magnet material is an alloy of neodymium or praseodymium in combination with iron and boron, an alloy of samarium and cobalt, an alloy of neodymium, iron, boron and cobalt, an alloy of neodymium, iron, and nitrogen, or an alloy of samarium, cobalt and nitrogen, and wherein the amount of said antidegradant is 30 percent or less by volume based upon the total volume of said fully dense rare earth magnet.

29. An essentially binder-free rare earth magnet according to claim 23, wherein said antidegradant is in the form of a layer coating said passivating agent, and wherein the amount of said antidegradant is less than 25 percent by volume based upon the total volume of said fully dense rare earth magnet.

30. An essentially binder-free rare earth magnet according to claim 27, wherein said antidegradant is in the form of a layer coating said passivating agent, and wherein the amount of said antidegradant is from about 10 percent to about 20 percent by volume based upon the total volume of said fully dense rare earth magnet.

31. An essentially binder-free rare earth magnet according to claim 20, wherein the amount of said antidegradant is 30 percent or less by volume based upon the total volume of said fully dense rare earth magnet.

32. An essentially binder-free rare earth magnet according to claim 21, wherein the amount of said antidegradant is less than 25 percent by volume based upon the total volume of said fully dense rare earth magnet.

33. An essentially binder-free rare earth magnet according to claim 22, wherein the amount of said antidegradant is less than 25 percent by volume based upon the total volume of said fully dense rare earth magnet.

34. An essentially binder-free rare earth magnet according to claim 23, wherein the amount of said antidegradant is less than 25 percent by volume based upon the total volume of said fully dense rare earth magnet.

35. An essentially binder-free rare earth magnet according to claim 24, wherein the amount of said antidegradant is less than 25 percent by volume based upon the total volume of said fully dense rare earth magnet.

36. An essentially binder-free rare earth magnet according to claim 25, wherein the amount of said antidegradant is less than 25 percent by volume based upon the total volume of said fully dense rare earth magnet.

37. An essentially binder-free rare earth magnet according to claim 26, wherein the amount of said antidegradant is less than 25 percent by volume based upon the total volume of said fully dense rare earth magnet.

38. An essentially binder-free rare earth magnet according to claim 27, wherein the amount of said antidegradant is from about 10 percent to about 20 percent by volume based upon the total volume of said fully dense rare earth magnet.

39. A rare earth magnet, comprising:
a fully dense rare earth magnet, the surface of said fully dense rare earth magnet coated by 1) one or more layers of a passivating agent, or 2) one or more layers of an antidegradant, or 3) one or more layers containing a mixture of said passivating agent and said antidegradant, or any combination of said 1), 2) or said 3) layer(s), in any order,
said passivating agent being an (A) oxidation-resistant composition, or an (B) corrosion inhibitor, or mixtures of (A) and (B), or layers of (A) and (B) in any order.

40. A rare earth magnet according to claim 39, wherein said (A) oxidation resistant composition comprises a (Ay) ternary composition, or a (Ax) binary composition, or mixtures thereof,
said (Ay) ternary composition comprising
1) an amino containing silane,
2) an epoxy silane, and
3) an epoxy resin,
said (Ay1) amino containing silane being an aminosilane or a polyaminosilane having the formula

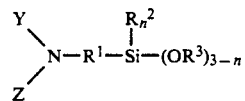

wherein said $R^1$ group has from 1 to 30 carbon atoms, wherein said $R^1$ group is an aliphatic group, an aromatic group, or combinations thereof, wherein n is 1 or 0, wherein $R^2$ and $R^3$, independently, is an aliphatic group, an aromatic group, or combinations thereof having from 1 to 20 carbon atoms, wherein Y and Z independently is a hydrogen atom, an aminoalkyl group, a polyaminoalkyl group, an aryl group, an alkylalkoxysilane group, or an aminoalkylalkoxysilane group wherein said alkyl group has from 1 to 12 carbon atoms and said alkoxy group has from 1 to 6 carbon atoms, wherein said (Ay2) epoxy silane compound has the formula

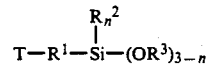

wherein said $R^1$ group has from 1 to 30 carbon atoms, wherein said $R^1$ group is an aliphatic group, an aromatic group, or combinations thereof, wherein n is 1 or 0, wherein $R^2$ and $R^3$, independently, is an aliphatic group, an aromatic group, or combinations thereof having from 1 to 20 carbon atoms, and wherein T is an epoxycyclohexyl group, a glycidoxy group, or an alkyl derivative thereof,
wherein the amount of said (Ay1) amino containing silane and said (Ay2) epoxy silane in said coating composition each, independently, being from about 5 to about 70 parts by weight per 100 parts by weight of said Ay composition, and wherein the amount of said (Ay3) epoxy compound being from about 5 parts to about 90 parts by weight per every 100 parts by weight of said (Ay) coating composition,
said (Ax) binary oxidation resistant coating comprising;
1) an amino containing silane, and
2) an epoxy silane or an epoxy resin, said (Ax1) amino containing silane being an amino silane or a polyaminosilane having the same formula as said (Ay1) amino containing silane wherein said $R^1$, $R^2$, $R^3$, Y, and Z, independently, are as set forth in said (Ay1) formula and wherein n is 0 or 1, and
wherein (Ax2) epoxy silane has the same formula of said (Ay2) epoxy silane, wherein said $R^1$, $R^2$, $R^3$, and T, independently, are as set forth in said (Ay2) formula and wherein n is 0 or 1, and
wherein the amount of said (Ax1) amino containing silane is from about 20 parts to about 80 parts by weight based upon the total weight of said (Ax1) amino containing silane and said (Ax2) epoxy silane or said epoxy resin, and wherein the amount of said (Ax2) epoxy silane or said epoxy resin is from about 80 parts to about 20 parts by weight based upon the total weight of said (Ax2) epoxy silane or said epoxy resin and said (Ax1) amino containing silane, and wherein said corrosion inhibitor is an oxymetallate, or a zinc salt, or combinations thereof, wherein said oxymetallate inhibitor is a phosphate, a molybdate, a polymolybdate, a chromate, a dichromate, a silicate, or combinations thereof.

41. A rare earth magnet according to claim 40, wherein said $R^1$ of said (Ay1) and said (Ax1) amino-containing silane compound, independently, is an aliphatic group having from 1 to 20 carbon atoms, an aromatic group or an alkyl substituted aromatic group having from 6 to 30 carbon atoms, and wherein $R^2$ and $R^3$ of said (Ay1) and said (Ax1) amino-containing silane, and said (Ay2) and said (Ax2) epoxy silane, independently, is an aliphatic group having from 1 to 11 carbon atoms, and wherein said antidegradant is a compound having the formula

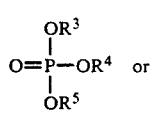 (FORMULA I)

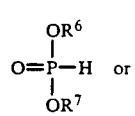 (FORMULA II)

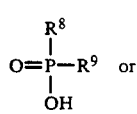 (FORMULA III)

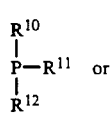 (FORMULA IV)

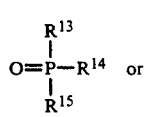 (FORMULA V)

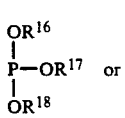 (FORMULA VI)

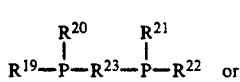 (FORMULA VII)

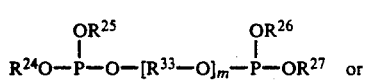 (FORMULA VIII)

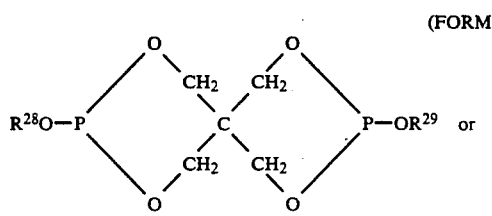 (FORMULA IX)

-continued

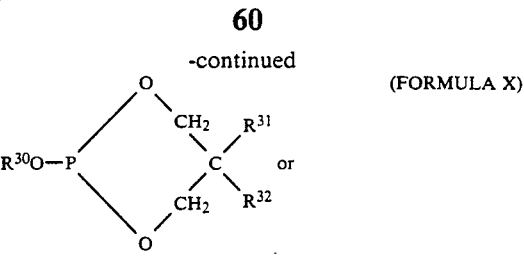 (FORMULA X)

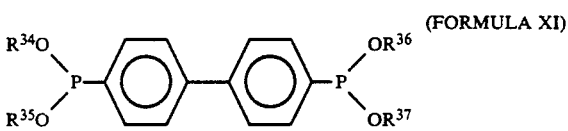 (FORMULA XI)

including any isomer of Formulas II, III, IV, V, VI, VII, VIII, IX, X, or XI, and wherein $R^3$ through $R^9$, independently, is H, or an aliphatic group, an aromatic group, or combinations thereof, having from 1 to 25 carbon atoms, or wherein $R^8$ or $R^9$ is an alkoxy having from 1 to 25 carbon atoms; or wherein $R^{10}$ through $R^{32}$, independently, is an aliphatic group, an aromatic group, or combinations thereof, having from 1 to 20 carbon atoms, or wherein $R^{16}$, $R^{17}$, or $R^{18}$ is H, or wherein $R^{31}$ or $R^{32}$ is an alkoxy group having from 1 to 25 carbon atoms; where $R^{33}$ is ethylene or propylene; where $R^{34}$, $R^{35}$, $R^{36}$, and $R^{37}$, independently, is hydrogen or an aliphatic group having from 1 to 18 carbon atoms, or an aromatic group having from 6 to 12 carbon atoms, or combinations thereof, and m is 1 to 100, or said antidegradant is a monoamine or poly amine salt of a phosphorous compound of Formula I through X, an aliphatic alcohol, an aromatic alcohol, an aliphatic substituted aromatic alcohol, an aromatic substituted aliphatic alcohol, or combinations thereof, wherein said alcohols have from 8 to 25 carbon atoms, or polyvinylalcohol.

42. A rare earth magnet according to claim 41, wherein said $R^1$ of said (Ay1) and said (Ax1) amino-containing silane compound and said (Ay2) and said (Ax2) epoxy silane compound, independently, is an alkyl group containing 3 or 4 carbon atoms, an aromatic group or an alkyl substituted aromatic group containing from 7 to 9 carbon atoms, wherein $R^2$ and $R^3$ of said (Ay1) and said (Ax1) amino-containing silane compound and said (Ay2) and said (Ax2) epoxy silane compound, independently, is an alkyl group having 1 or 2 carbon atoms, wherein Y group of said (Ay1) and said (Ax1) contains at least one secondary or primary amine moiety, wherein the amount of said (Ay1) amino-containing silane is from about 20 to about 60 parts by weight, wherein the amount of said (Ay2) epoxy silane is from about 10 parts to about 55 parts by weight, and wherein the amount of said (Ay3) epoxy resin is from about 10 parts to about 50 parts by weight, and wherein the amount of said (Ax1) amino-containing silane is from about 30 to about 70 parts by weight, and wherein the amount of said (Ax2) epoxy silane or said epoxy resin is from about 70 parts to about 30 parts by weight.

43. A rare earth magnet according to claim 42, wherein said (Ay1) and said (Ax1) amino-containing silane compound is 4-aminobutyltriethoxysilane, (aminoethylaminomethyl)phenethyltrimethoxysilane, N-(2-aminoethyl)-3-aminopropylmethyldimethoxysilane, 3-aminopropyltriethoxysilane, 3-aminopropyltrimethoxysilane, N-2-aminoethyl-3-aminopropyltrimethoxysilane, N-2-aminoethyl-3-aminopropyltris(2-ethylhexoxy)silane, 6-(aminohexylaminopropyl)trimethoxysilane, 3-aminophenyltrimethoxysilane, 3-aminopropylmethyldiethoxysilane, bis[3-(trimethoxysilyl)-propyl]ethylenediamine, n-phenylaminopropyltrimethoxysilane, trimethoxysilylpropyldiethylenetriamine, ω-aminoundecyltrimethoxysilane, bis[3-(triethoxysilyl)-propyl]amine, dimethoxymethylsilylpropyl (polyethyleneimine), or trimethoxysilylpropyl(polyethylenimine), wherein said (Ay2) and said (Ax2) epoxy silane is (3-glycidoxypropyl)methyldiethoxysilane, (3-glycidoxypropyl)trimethoxysilane, 2-(3,4-epoxycyclohexyl)ethylmethyldimethoxysilane, 2-(3,4-epoxycyclohexyl)ethyltrimethoxysilane, or [2-(3,4-epoxy-4-methylcyclohexyl)propyl]methyldiethoxy silane, and wherein said (Ay3) and said (Ax2) epoxy is the reaction product of bisphenol A and epichlorohydrin, wherein the amount of said (Ay1) amino-containing silane is from about 35 to about 50 parts by weight, wherein the amount of said (Ay2) epoxy silane is from about 15 to about 40 parts by weight, and wherein the amount of said (Ay3) epoxy resin is from about 20 to about 40 parts by weight, and wherein said oxymetallate is $M_2CrO_4$ or $M_2Cr_2O_7$ where M is H, Li, Na, or K, and wherein said antidegradant distearyl pentaerythritol diphosphite, dilauryl phosphate, trilauryl phosphite, distearyl phosphite, ditridecyl phosphite, tetraphenyl dipropyleneglycol diphospite, or tris-nonylphenyl phosphite, dodecanol, octadecanol, polyvinyl alcohol, and combinations thereof.

44. A rare earth magnet according to claim 43, wherein said (Ay1) and said (Ax1) amino containing silane, independently, is 3-aminopropyltriethoxysilane, 3-aminopropyltrimethoxysilane, or N-2-aminoethyl-3-aminopropyltrimethoxysilane, wherein said (Ay2) and said (Ax2) epoxy silane is 3-glycidoxypropyl)methyldiethoxysilane or 3-glycidoxypropyl)trimethcxysilane, and wherein said (Ax2) epoxy is the reaction product of bisphenol A and epichlorohydrin, and wherein said binder is a nitrile rubber, an acrylate, an epoxy or combinations thereof.

45. A rare earth magnet according to claim 39, wherein the amount of said passivating agent is 30 percent or less by volume based upon the total volume of said fully dense rare earth magnet, and wherein the amount of said antidegradant is 30 percent or less by volume based upon a total volume of said fully dense rare earth magnet.

46. A rare earth magnet according to claim 41, wherein the amount of said passivating agent is 30 percent or less by volume based upon the total volume of said fully dense rare earth magnet, and wherein the amount of said antidegradant is 30 percent or less by volume based upon a total volume of said fully dense rare earth magnet.

47. A rare earth magnet according to claim 42, wherein the amount of said passivating agent is 25 percent or less by volume based upon the total volume of said fully dense rare earth magnet, and wherein the amount of said antidegradant is 25 percent or less by volume based upon a total volume of said fully dense rare earth magnet.

48. A rare earth magnet according to claim 43, wherein the amount of said passivating agent is 20 percent or less by volume based upon the total volume of said fully dense rare earth magnet, and wherein the amount of said antidegradant is 20 percent or less by volume based upon a total volume of said fully dense rare earth magnet.

49. A rare earth magnet according to claim 44, wherein the amount of said passivating agent is from about 10 to about 20 percent or less by volume based upon the total volume of said fully dense rare earth magnet, and wherein the amount of said antidegradant is from about 10 to about 20 percent or less by volume based upon a total volume of said fully dense rare earth magnet.

50. A rare earth magnet according to claim 39, wherein said rare earth magnet material is an alloy of neodymium or praseodymium in combination with iron and boron, an alloy of samarium and cobalt, and alloy of neodymium, iron, boron and cobalt, an alloy of neodymium, iron, and nitrogen, or an alloy of samarium, cobalt and nitrogen.

51. A rare earth magnet according to claim 42, wherein said rare earth magnet material is an alloy of neodymium or praseodymium in combination with iron and boron, an alloy of samarium and cobalt, an alloy of neodymium, iron, boron and cobalt, an alloy of neodymium, iron, and nitrogen, or an alloy of samarium, cobalt and nitrogen.

52. A rare earth magnet according to claim 44, wherein said rare earth magnet material is an alloy of neodymium or praseodymium in combination with iron and boron, an alloy of samarium and cobalt, an alloy of neodymium, iron, boron and cobalt, an alloy of neodymium, iron, and nitrogen, or an alloy of samarium, cobalt and nitrogen.

53. A rare earth magnet according to claim 45, wherein said rare earth magnet material is an alloy of neodymium or praseodymium in combination with iron and boron, an alloy of samarium and cobalt, an alloy of neodymium, iron, boron and cobalt, an alloy of neodymium, iron, and nitrogen, or an alloy of samarium, cobalt and nitrogen.

54. A rare earth magnet according to claim 48, wherein said rare earth magnet material is an alloy of neodymium or praseodymium in combination with iron and boron, an alloy of samarium and cobalt, an alloy of neodymium, iron, boron and cobalt, an alloy of neodymium, iron, and nitrogen, or an alloy of samarium, cobalt and nitrogen.

55. A rare earth magnet according to claim 49, wherein said rare earth magnet material is an alloy of neodymium or praseodymium in combination with iron and boron, an alloy of samarium and cobalt, an alloy of neodymium, iron, boron and cobalt, an alloy of neodymium, iron, and nitrogen, or an alloy of samarium, cobalt and nitrogen.

56. A rare earth magnet according to claim 39, wherein said fully dense rare earth magnet is a sintered magnet, an aligned and sintered magnet, a compressed magnet, or a die-upset magnet.

57. A rare earth magnet according to claim 43, wherein said fully dense rare earth magnet is a sintered and aligned magnet, or a die-upset magnet.

58. A rare earth magnet according to claim 47, wherein said fully dense rare earth magnet is a sintered magnet, an aligned and sintered magnet, a compressed magnet, or a die-upset magnet.

59. A rare earth magnet according to claim 54, wherein said fully dense rare earth magnet is a sintered and aligned magnet, or a die-upset magnet.

60. A rare earth magnet according to claim 39, wherein said surface of said fully dense magnet is coated by one or more layers of said passivating agent, and wherein said one or more passivating layers is coated with one or more layers of said antidegradant.

61. A rare earth magnet according to claim 44, wherein said surface of said fully dense magnet is coated by one or more layers of said passivating agent, and wherein said one or more passivating layers is coated with one or more layers of said antidegradant.

62. A rare earth magnet according to claim 48, wherein said surface of said fully dense magnet is coated by one or more layers of said passivating agent, and wherein said one or more passivating layers is coated with one or more layers of said antidegradant.

63. A rare earth magnet according to claim 50, wherein said surface of said fully dense magnet is coated by one or more layers of said passivating agent, and wherein said one or more passivating layers is coated with one or more layers of said antidegradant.

64. A rare earth magnet according to claim 41, wherein said surface of said fully dense magnet is coated by one or more layers of said passivating agent, and wherein said one or more passivating layers is coated with one or more layers of said antidegradant.

65. A rare earth magnet according to claim 55, wherein said surface of said fully dense magnet is coated by one or more layers of said passivating agent, and wherein said one or more passivating layers is coated with one or more layers of said antidegradant.

66. A rare earth magnet composition, comprising: particles of at least one rare earth magnet material, an antidegradant, said antidegradant coating said at least one rare earth magnet material, wherein said antidegradant is an organic phosphorus compound having the formula,

(FORMULA I)

(FORMULA IV)

(FORMULA V)

(FORMULA VI)

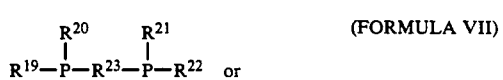

(FORMULA VII)

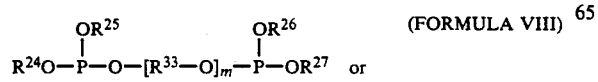

(FORMULA VIII)

-continued

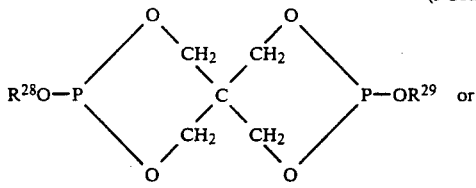

(FORMULA IX)

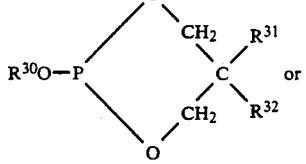

(FORMULA X)

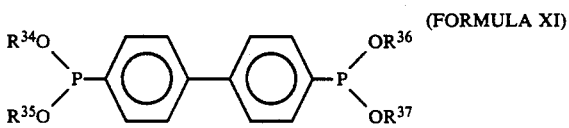

(FORMULA XI)

including any isomer of Formulas IV, V, VI, VII, VIII, IX, X, or XI, and wherein $R^3$ through $R^5$, independently, is an aliphatic group, an aromatic group, or combinations thereof, having from 1 to 25 carbon atoms, or wherein $R^{10}$ through $R^{32}$, independently, is an aliphatic group, an aromatic group, or combinations thereof, having from 1 to 20 carbon atoms, or wherein $R^{31}$ or $R^{32}$ is an alkoxy group having from 1 to 25 carbon atoms; where $R^{33}$ is ethylene or propylene; where $R^{34}$, $R^{35}$, $R^{36}$, and $R^{37}$, independently, an aliphatic group having from 1 to 18 carbon atoms, or an aromatic group having from 6 to 12 carbon atoms, or combinations thereof, and m is 1 to 100, or a monoamine or polyamine salt of the phosphorous compounds of Formulas I and IV through X, or an alcohol having 8 to 25 carbon atoms, or a polyvinyl alcohol, and an effective amount of a binder adhering said coated particles of said at least one rare earth magnetic material together.

67. A rare earth magnet composition according to claim 66, wherein the amount of said antidegradant is up to about 25 percent by volume based upon the volume of said rare earth magnetic material and said antidegradant.

68. A rare earth magnet composition according to claim 67, wherein said binder is a thermoset polymer, a thermoplastic polymer, an elastomer, a reaction injection molded binder, or combinations thereof.

69. A rare earth magnet composition according to claim 67, wherein said antidegradant is a compound having the formula

(FORMULA I)

(FORMULA IV)

-continued

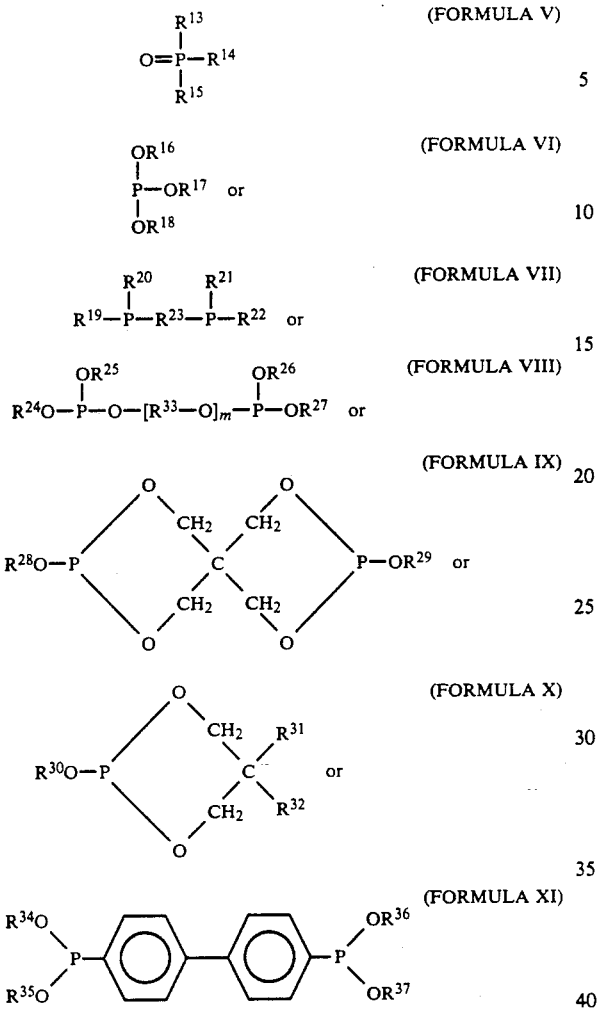

including any isomer of Formulas IV, V, VI, VII, VIII, IX, X, or XI, and wherein $R^3$ through $R^5$, independently, is an aliphatic, an aromatic, or combinations thereof, having from 1 to 25 carbon atoms, or wherein $R^{10}$ through $R^{32}$, independently, is an aliphatic, an aromatic, or combinations thereof, having from 1 to 20 carbon atoms, or wherein $R^{31}$ or $R^{32}$ is an alkoxy having from 1 to 25 carbon atoms; or an amine salt thereof; wherein $R^{33}$ is ethylene or propylene; where $R^{34}$, $R^{35}$, $R^{36}$, and $R^{37}$, independently, an aliphatic having from 1 to 18 carbon atoms, or an aromatic having from 6 to 12 carbon atoms, or combinations thereof, and m is 1 to 100, or said antidegradant is an aliphatic alcohol, an aromatic alcohol, an aliphatic substituted aromatic alcohol, an aromatic substituted aliphatic alcohol, or combinations thereof, having from 8 to 25 carbon atoms, or polyvinylalcohol.

70. A rare earth magnet composition according to claim 68, wherein the particle size of said rare earth material is from about 1 to about 700 microns, and wherein said antidegradant is a compound having the formula

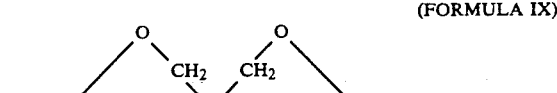
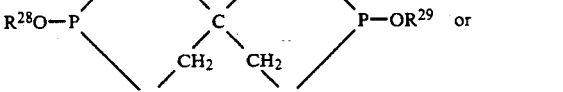
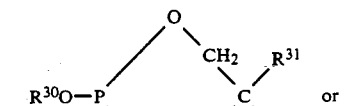
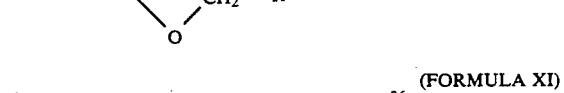
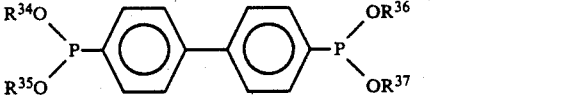
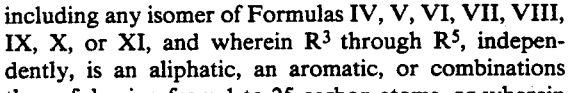
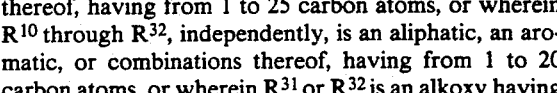
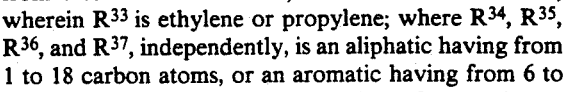
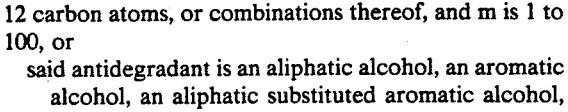
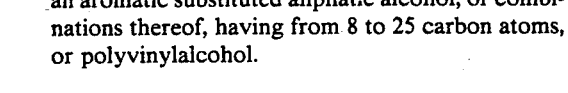

including any isomer of Formulas IV, V, VI, VII, VIII, IX, X, or XI, and wherein $R^3$ through $R^5$, independently, is an aliphatic, an aromatic, or combinations thereof, having from 1 to 25 carbon atoms, or wherein $R^{10}$ through $R^{32}$, independently, is an aliphatic, an aromatic, or combinations thereof, having from 1 to 20 carbon atoms, or wherein $R^{31}$ or $R^{32}$ is an alkoxy having from 1 to 25 carbon atoms; or an amine salt thereof; wherein $R^{33}$ is ethylene or propylene; where $R^{34}$, $R^{35}$, $R^{36}$, and $R^{37}$, independently, is an aliphatic having from 1 to 18 carbon atoms, or an aromatic having from 6 to 12 carbon atoms, or combinations thereof, and m is 1 to 100, or said antidegradant is an aliphatic alcohol, an aromatic alcohol, an aliphatic substituted aromatic alcohol, an aromatic substituted aliphatic alcohol, or combinations thereof, having from 8 to 25 carbon atoms, or polyvinylalcohol.

71. A rare earth magnet composition according to claim 69, wherein said antidegradant, is distearyl pentaerythritol diphosphite, trilauryl phosphite, tetraphenyl dipropyleneglycol diphospite, or trisnonylphenyl phosphite, dodecanol, octadecanol, polyvinyl alcohol, and combinations thereof.

72. A rare earth magnet composition according to claim 70, wherein said antidegradant is distearyl pentaerythritol diphosphite, trilauryl phosphite, tetraphenyl dipropyleneglycol diphospite, or trisnonylphenyl phosphite, dodecanol, octadecanol, polyvinyl alcohol, and combinations thereof.

73. A rare earth magnet composition according to claim 66, wherein said rare earth material is an alloy of neodymium or praseodymium in combination with iron and boron, an alloy of samarium and cobalt, an alloy of neodymium, iron, boron and cobalt, an alloy of neodymium, iron, and nitrogen, or an alloy of samarium, cobalt and nitrogen.

74. A rare earth magnet composition according to claim 68, wherein said rare earth material is an alloy of neodymium or praseodymium in combination with iron and boron, an alloy of samarium and cobalt, an alloy of neodymium, iron, boron and cobalt, an alloy of neodymium, iron, and nitrogen, or an alloy of samarium, cobalt and nitrogen.

75. A rare earth magnet composition according to claim 69, wherein said rare earth material is an alloy of neodymium or praseodymium in combination with iron and boron, an alloy of samarium and cobalt, an alloy of neodymium, iron, boron and cobalt, an alloy of neodymium, iron, and nitrogen, or an alloy of samarium, cobalt and nitrogen.

76. A rare earth magnet composition according to claim 70, wherein said rare earth material is an alloy of neodymium or praseodymium in combination with iron and boron, an alloy of samarium and cobalt, an alloy of neodymium, iron, boron and cobalt, an alloy of neodymium, iron, and nitrogen, or an alloy of samarium, cobalt and nitrogen.

77. A rare earth magnet composition according to claim 71, wherein said rare earth material is an alloy of neodymium or praseodymium in combination with iron and boron, an alloy of samarium and cobalt, an alloy of neodymium, iron, boron and cobalt, an alloy of neodymium, iron, and nitrogen, or an alloy of samarium, cobalt and nitrogen.

78. A rare earth magnet composition according to claim 72, wherein said rare earth material is an alloy of neodymium or praseodymium in combination with iron and boron, an alloy of samarium and cobalt, an alloy of neodymium, iron, boron and cobalt, an alloy of neodymium, iron, and nitrogen, or an alloy of samarium, cobalt and nitrogen.

* * * * *